(12) United States Patent
Wang et al.

(10) Patent No.: US 12,060,483 B2
(45) Date of Patent: Aug. 13, 2024

(54) SEMI-INTERPENETRATING AND CROSSLINKED POLYMERS AND MEMBRANES THEREOF

(71) Applicant: Twelve Benefit Corporation, Berkeley, CA (US)

(72) Inventors: Lihui Wang, Berkeley, CA (US); Ziyang Huo, Moraga, CA (US); Chengtian Shen, Irvine, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 192 days.

(21) Appl. No.: 17/451,630

(22) Filed: Oct. 20, 2021

(65) Prior Publication Data

US 2022/0119636 A1    Apr. 21, 2022

Related U.S. Application Data

(60) Provisional application No. 63/093,790, filed on Oct. 20, 2020.

(51) Int. Cl.
*C08L 65/00*    (2006.01)
*C08G 61/02*    (2006.01)
(Continued)

(52) U.S. Cl.
CPC .............. *C08L 65/00* (2013.01); *C08G 61/02* (2013.01); *C25B 9/23* (2021.01); *C25B 13/08* (2013.01); *C08G 2261/132* (2013.01); *C08G 2261/143* (2013.01); *C08G 2261/146* (2013.01); *C08G 2261/164* (2013.01); *C08G 2261/17* (2013.01);
(Continued)

(58) Field of Classification Search
CPC ........ C08L 65/00; C08L 2312/00; C25B 9/23; C25B 9/08; C08G 61/02; C08G 2261/132; C08G 2261/143; C08G 2261/146; C08G 2261/164; C08G 2261/17;
(Continued)

(56) References Cited

U.S. PATENT DOCUMENTS 4,042,496 A   8/1977   Tsushima et al.
4,089,758 A   5/1978   McAloon
(Continued)

FOREIGN PATENT DOCUMENTS

CN   101981744 A   2/2011
CN   102308028 A   1/2012
(Continued)

OTHER PUBLICATIONS

Adabi, et al., "High-performing Commercial Fe—N—C Cathode Electrocatalyst for Anion-exchange Membrane Fuel Cells," Nature Energy, 2021, pp. 1-10.
(Continued)

*Primary Examiner* — Shane Fang
(74) *Attorney, Agent, or Firm* — Weaver Austin Villeneuve & Sampson LLP

(57) ABSTRACT

Provided are compositions including a core moiety and a plurality of polymeric units, in which at least one of these can include an ionizable moiety or an ionic moiety. The core moiety may be a multivalent core moiety, trivalent core moiety, tetravalent core moiety, pentavalent core moiety, or multivalent arylene moiety. Materials, electrochemical cells, and methods using such compositions are also described.

14 Claims, 9 Drawing Sheets

(51) Int. Cl.
  *C25B 9/23* (2021.01)
  *C25B 13/08* (2006.01)
(52) U.S. Cl.
  CPC ............. *C08G 2261/312* (2013.01); *C08G 2261/3142* (2013.01); *C08G 2261/45* (2013.01); *C08G 2270/00* (2013.01); *C08L 2312/00* (2013.01)
(58) Field of Classification Search
  CPC ...... C08G 2261/312; C08G 2261/3142; C08G 2261/45; C08G 2270/00
  See application file for complete search history.

(56) References Cited

U.S. PATENT DOCUMENTS

| | | |
|---|---|---|
| 4,116,889 A | 9/1978 | Chlanda et al. |
| 4,176,215 A | 11/1979 | Molnar et al. |
| 4,253,900 A | 3/1981 | Dege et al. |
| 4,355,116 A | 10/1982 | Lee et al. |
| 4,609,440 A | 9/1986 | Frese, Jr. et al. |
| 4,766,161 A | 8/1988 | Chlanda et al. |
| 4,828,941 A | 5/1989 | Sterzel |
| 4,921,586 A | 5/1990 | Molter |
| 5,039,389 A | 8/1991 | McMichael |
| 5,601,937 A | 2/1997 | Isenberg |
| 5,992,008 A | 11/1999 | Kindler |
| 6,358,651 B1 | 3/2002 | Chen et al. |
| 7,605,293 B2 | 10/2009 | Olah et al. |
| 7,608,356 B2 | 10/2009 | Risen, Jr. et al. |
| 7,704,369 B2 | 4/2010 | Olah et al. |
| 7,883,817 B2 | 2/2011 | Hori et al. |
| 8,131,859 B2 | 3/2012 | Fujii et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,652,104 B2 | 2/2014 | Goral et al. |
| 8,652,704 B2 | 2/2014 | Sano et al. |
| 8,658,016 B2 | 2/2014 | Lakkaraju et al. |
| 8,721,866 B2 | 5/2014 | Sivasankar et al. |
| 8,845,875 B2 | 9/2014 | Teamey et al. |
| 8,845,878 B2 | 9/2014 | Cole et al. |
| 8,956,990 B2 | 2/2015 | Masel et al. |
| 9,012,345 B2 | 4/2015 | Masel et al. |
| 9,145,615 B2 | 9/2015 | Zhai et al. |
| 9,181,625 B2 | 11/2015 | Masel et al. |
| 9,193,593 B2 | 11/2015 | Masel et al. |
| 9,370,773 B2 | 6/2016 | Masel et al. |
| 9,464,359 B2 | 10/2016 | Masel et al. |
| 9,481,939 B2 | 11/2016 | Masel et al. |
| 9,555,367 B2 | 1/2017 | Masel et al. |
| 9,566,574 B2 | 2/2017 | Masel et al. |
| 9,580,824 B2 | 2/2017 | Masel et al. |
| 10,822,709 B2 | 11/2020 | Kuhl et al. |
| 10,975,480 B2 | 4/2021 | Masel |
| 10,975,481 B2 | 4/2021 | Guo et al. |
| 11,124,886 B2 | 9/2021 | Kuhl et al. |
| 11,512,403 B2 | 11/2022 | Kuhl et al. |
| 11,680,328 B2 | 6/2023 | Huo et al. |
| 2003/0059658 A1 | 3/2003 | Kohler et al. |
| 2005/0147859 A1 | 7/2005 | Kiefer et al. |
| 2005/0239912 A1 | 10/2005 | Arcella et al. |
| 2006/0016685 A1 | 1/2006 | Hawkins et al. |
| 2008/0283411 A1 | 11/2008 | Eastman et al. |
| 2008/0318093 A1 | 12/2008 | Lee et al. |
| 2009/0014336 A1 | 1/2009 | Olah et al. |
| 2009/0117436 A1 | 5/2009 | Choi et al. |
| 2009/0155102 A1 | 6/2009 | Park et al. |
| 2010/0137457 A1 | 6/2010 | Kaplan |
| 2010/0159347 A1 | 6/2010 | Choi et al. |
| 2010/0273087 A1 | 10/2010 | Choi et al. |
| 2010/0324256 A1 | 12/2010 | Ooms et al. |
| 2011/0166241 A1* | 7/2011 | Choi .............. C08L 65/00 521/27 |
| 2012/0171583 A1 | 7/2012 | Bocarsly et al. |
| 2012/0252091 A1 | 10/2012 | Rasmussen et al. |
| 2012/0328942 A1 | 12/2012 | Thomas-Alyea et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0027303 A1 | 1/2014 | Cole et al. |
| 2014/0034506 A1 | 2/2014 | Teamey et al. |
| 2014/0093799 A1 | 4/2014 | Masel et al. |
| 2014/0151240 A1 | 6/2014 | Bedell et al. |
| 2014/0206894 A1 | 7/2014 | Cole et al. |
| 2014/0206896 A1 | 7/2014 | Sivasankar et al. |
| 2015/0010804 A1 | 1/2015 | Laramie et al. |
| 2015/0030888 A1 | 1/2015 | Popat et al. |
| 2015/0064602 A1 | 3/2015 | Lee et al. |
| 2015/0232999 A1 | 8/2015 | Busskamp et al. |
| 2015/0329979 A1 | 11/2015 | Reytier et al. |
| 2016/0107154 A1 | 4/2016 | Masel et al. |
| 2016/0161869 A1 | 6/2016 | Avneri et al. |
| 2017/0037522 A1 | 2/2017 | Kaczur et al. |
| 2017/0183789 A1 | 6/2017 | Matthews et al. |
| 2017/0321333 A1 | 11/2017 | Kuhl et al. |
| 2017/0321334 A1 | 11/2017 | Kuhl et al. |
| 2017/0327655 A1* | 11/2017 | Choi .............. C08L 81/00 |
| 2017/0328239 A1 | 11/2017 | Fleischer et al. |
| 2017/0355811 A1* | 12/2017 | Bae .............. C09D 165/00 |
| 2018/0057950 A1 | 3/2018 | Co et al. |
| 2018/0086985 A1 | 3/2018 | Von Olshausen et al. |
| 2018/0194632 A1 | 7/2018 | Jakobsson et al. |
| 2018/0257057 A1 | 9/2018 | Motoshige et al. |
| 2018/0264429 A1 | 9/2018 | Sugano et al. |
| 2018/0265440 A1 | 9/2018 | Kudo et al. |
| 2019/0032228 A1 | 1/2019 | Krause et al. |
| 2019/0036143 A1 | 1/2019 | Yan et al. |
| 2019/0062931 A1 | 2/2019 | Stark et al. |
| 2019/0093241 A1 | 3/2019 | Baldauf et al. |
| 2019/0127865 A1 | 5/2019 | Li et al. |
| 2019/0134570 A1 | 5/2019 | Pintauro et al. |
| 2019/0226103 A1 | 7/2019 | Kuhl et al. |
| 2019/0233350 A1 | 8/2019 | Sankaranarayanan et al. |
| 2019/0359894 A1 | 11/2019 | Heidel et al. |
| 2020/0095124 A1 | 3/2020 | Rueger |
| 2020/0240023 A1 | 7/2020 | Cave et al. |
| 2020/0308718 A1 | 10/2020 | Patru et al. |
| 2020/0376479 A1 | 12/2020 | Masel |
| 2021/0002775 A1 | 1/2021 | Matsumoto et al. |
| 2021/0047743 A1 | 2/2021 | Goetheer et al. |
| 2021/0164116 A1 | 6/2021 | Kuhl et al. |
| 2021/0207275 A1 | 7/2021 | Huo et al. |
| 2021/0381116 A1 | 12/2021 | Kashi et al. |
| 2021/0387139 A1 | 12/2021 | Voskian et al. |
| 2021/0395908 A1 | 12/2021 | Kuhl et al. |
| 2022/0119641 A1 | 4/2022 | Wang et al. |
| 2022/0136119 A1 | 5/2022 | Flanders et al. |
| 2022/0153656 A1 | 5/2022 | Flanders et al. |
| 2023/0175088 A1 | 6/2023 | Cintron et al. |
| 2023/0175146 A1 | 6/2023 | Kashi et al. |
| 2023/0202840 A1 | 6/2023 | Flanders et al. |
| 2023/0265568 A1 | 8/2023 | Kuhl et al. |
| 2023/0415104 A1 | 12/2023 | Huo et al. |

FOREIGN PATENT DOCUMENTS

| | | |
|---|---|---|
| CN | 102978653 A | 3/2013 |
| CN | 106148992 A | 11/2016 |
| CN | 106463743 A | 2/2017 |
| CN | 109921060 A | 6/2019 |
| DE | 102015201132 A1 | 7/2016 |
| DE | 102015214592 A1 | 2/2017 |
| DE | 102016207420 A1 | 10/2017 |
| EP | 3378968 A1 | 9/2018 |
| EP | 3434810 A1 | 1/2019 |
| EP | 3626861 A1 | 3/2020 |
| EP | 3670700 A1 | 6/2020 |
| GB | 1269841 A | 4/1972 |
| JP | H06145379 A | 5/1994 |
| JP | 2009540130 A | 11/2009 |
| JP | 2010526214 A | 7/2010 |
| JP | 2015054994 A | 3/2015 |
| JP | 2015056315 A | 3/2015 |

(56) References Cited

FOREIGN PATENT DOCUMENTS

| | | |
|---|---|---|
| JP | 2015513615 A | 5/2015 |
| JP | 2015513616 A | 5/2015 |
| JP | 2016538420 A | 12/2016 |
| JP | 2017048442 A | 3/2017 |
| JP | 2017053013 A | 3/2017 |
| JP | 2017527701 A | 9/2017 |
| KR | 100962903 B1 | 6/2010 |
| WO | WO-2007041872 A1 | 4/2007 |
| WO | WO-2008124538 A1 | 10/2008 |
| WO | WO-2011108546 A1 | 9/2011 |
| WO | WO-2012006240 A1 | 1/2012 |
| WO | WO-2013006710 A2 | 1/2013 |
| WO | WO-2013016447 A2 | 1/2013 |
| WO | WO-2014018091 A1 | 1/2014 |
| WO | WO-2014032000 A1 | 2/2014 |
| WO | WO-2014042781 A2 | 3/2014 |
| WO | WO-2014043651 A2 | 3/2014 |
| WO | WO-2014046797 A2 | 3/2014 |
| WO | WO-2014154253 A1 | 10/2014 |
| WO | WO-2014160529 A1 | 10/2014 |
| WO | WO-2015035521 A1 | 3/2015 |
| WO | WO-2015184388 A1 | 12/2015 |
| WO | WO-2016039999 A1 | 3/2016 |
| WO | WO-2017014635 A1 | 1/2017 |
| WO | WO-2017021083 A1 | 2/2017 |
| WO | WO-2017171115 A1 | 10/2017 |
| WO | WO-2018001637 A1 | 1/2018 |
| WO | WO-2019051609 A1 | 3/2019 |
| WO | WO-2019136018 A2 | 7/2019 |
| WO | WO-2020057998 A1 | 3/2020 |
| WO | WO-2020245070 A1 | 12/2020 |
| WO | WO-2021252535 A2 | 12/2021 |
| WO | WO-2022031726 A2 | 2/2022 |

OTHER PUBLICATIONS

Aeshala, L.M. et al., "Effect of solid polymer electrolyte on electrochemical reduction of CO2, Separation and Purification Technology," 94, (2012), pp. 131-137.
AU Office Action dated Sep. 7, 2022, in Application No. AU2019210132.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Balster, J. et al., "Tailoring the Interface Layer of the Bipolar Membrane", Journal of Membrane Science, vol. 365, No. 1-2, Dec. 2010, pp. 389-398.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
BR Office Action dated Nov. 28, 2022, in Application No. BR1120200149381 with English translation.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
Chen, et al., "Poly(Alkyl-terphenyl Piperidinium) Ionomers and Membranes With an Outstanding Alkaline-membrane Fuel-cell Performance of 2.58 Wcm@2,"Fuel Cells Hot Paper, 2021, vol. 60, pp. 7710-7718.
Chen, et al., "Poly(Fluorenyl Aryl Piperidinium) Membranes and Ionomers for Anion Exchange Membrane Fuel Cells," Nature Communications, 2021, vol. 12, pp. 1-12.
CN Office Action dated Jan. 4, 2023, in CN Application No. CN201980021305.1 with English translation.

Delacourt et al., "Design of an Electrochemical Cell Making Syngas (CO + H2) from CO2 and H2O Reduction at Room Temperature," Journal of The Electrochemical Society, 155 (1), (2008), pp. B42-B49.
Digdaya, et al., "A Direct Coupled Electrochemical System for Capture and Conversion of Co2 From Oceanwater," Nature Communications, 2020, vol. 11, pp. 1-10.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
EP search report dated Sep. 14, 2021, in application No. EP19741371.9.
Fan, et al., "Poly(Bis-arylimidazoliums) Possessing High Hydroxide Ion Exchange Capacity and High Alkaline Stability," Nature Communications, 2019, vol. 10, pp. 1-10.
Ge, et al., "Oxygen Reduction in Alkaline Media: From Mechanisms to Recent Advances of Catalysts, ACS Catalysis,"2015, vol. 5, pp. 1-97.
Gerhardt, et al., "Along-the-channel Impacts Ofwater Management and Carbon-dioxide Contamination in Hydroxide-exchange-membrane Fuel Cells: a Modeling Study," Journal of the Electrochemical Society, 2019, vol. 166(7), pp. F3180-F3192.
Gu, et al., "Electrochemical Energy Engineering: a New Frontier of Chemical Engineering Innovation," Annual Review of Chemical and Biomolecular Engineering, 2014, vol. 5, pp. 429-454.
Hao, J.H. et al., "Preparation of Solvent-resistant Anion-exchange Membranes", Desalination, Jun. 2000, vol. 129, No. 1, pp. 15-22.
Hassan, N., et al., "Achieving High-Performance and 2000 h Stability in Anion Exchange Membrane Fuel Cells by Manipulating Ionomer Properties and Electrode Optimization," Advanced Energy Materials, 2020, pp. 1-8.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.
Huang, et al., "Composite Poly(Norbornene) Anion Conducting Membranes for Achieving Durability, water Management and High Power 3.4 W/cm2) in Hydrogen/oxygen Alkaline Fuel Cells, "Journal of The Electrochemical Society, 2019, vol. 10, pp. F637-F644.
IN Office Action dated Feb. 16, 2022, in Application No. IN202037034886.
Inaba, et al., "Effects of Carbon Dioxide on the Performance of Anion-exchange Membrane Fuel Cells,"Electrochemistry, 2011, vol. 79(5), pp. 322-325.
International Preliminary Report on Patentability and Written opinion dated Jun. 9, 2022 in Application No. PCT/US2020/062080.
International Search Report and Written Opinion dated Feb. 23, 2022, in Application No. PCT/US2021/55902.
International Preliminary Report on Patentability dated Feb. 16, 2023 in PCT Application No. PCT/US2021/044378.
International Preliminary Report on Patentability dated May 4, 2023, in Application No. PCT/US2021/055900.
International Preliminary Report on Patentability dated May 4, 2023, in Application No. PCT/US2021/055902.
International Search Report and Written Opinion dated Apr. 10, 2023 in PCT Application No. PCT/US2022/079335.
International Search Report and Written Opinion dated Apr. 30, 2019, for application No. PCT/US19/014586.
International Search Report and Written Opinion dated Feb. 24, 2022, in Application No. PCT/US2021/055900.
International Search Report and Written Opinion dated Feb. 28, 2022, in Application No. PCT/US2021/044378.
International Search Report and Written Opinion dated Mar. 7, 2023 in PCT Application No. PCT/US2022/081034.
International Search Report and Written Opinion issued in PCT Application No. PCT/US2020/062080 on Mar. 16, 2021.
James, B.D., et al. 2017 DOE Hydrogen and Fuel Cells Program Review, Fuel Cell Systems Analysis, Strategic Analysis, Project IDI FC163, Jun. 8, 2017, 34 pages.
JP Office Action dated Jan. 4, 2023, in Application No. JP2020-561577 with English translation.
Keith, et al., "A Process for Capturing Co2 From the Atmosphere,"Cell Press, 2018, vol. 2, pp. 1573-1594.

(56) References Cited

OTHER PUBLICATIONS

Kim, C., et al., "Impact of Pulsed Electrochemical Reduction of CO2 on the formation of C2+ Products over Cu," ACS Catal., 2020, 10, 12403-12413.

Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.

Kriescher, Stefanie M.A. et al., "A membrane electrode assembly for the electrochemical synthesis of hydrocarbons from C02(g) and Ho2(g), Electrochemistry Communications," 50 (2015), pp. 64-68.

Li, et al., "Electrolysis of Co2 to Syngas in Bipolar Membrane-Based Electrochemical Cells," ACS Publications, ACS Energy Letters, 2016, 1, pp. 1149-1153.

Li, et al., "Electrolytic Conversion of Bicarbonate into CO in a Flow Cell," Cell Press, Joule 3, Jun. 19, 2019, pp. 1487-1497.

Liew, F. et al., "Gas Fermentation—A Flexible Platform for Commercial Scale Production of Low-Carbon-Fuels and Chemicals from Waste and Renewable Feedstocks", Frontiers in Microbiology, May 11, 2016, vol. 7, No. 694, pp. 1-28.

Lu, et al., "Halloysite-derived Nitrogen Doped Carbon Electrocatalysts for Anion Exchange Membrane Fuel Cells,"Journal of Power Sources, 2017, vol. 372, pp. 82-90.

Matz, et al., "Demonstration of Electrochemically-driven Co2 Separation Using Hydroxide Exchange Membranes,"Journal of the Electrochemical Society, 2021, vol. 168, pp. 1-12.

Muroyama, et al., "Review—CO2 Separation and Transport via Electrochemical Methods,"Journal of the Electrochemical Society, 2020, vol. 167, pp. 1-13.

Office Action issued on Apr. 1, 2021, in U.S. Appl. No. 16/254,255.

Peng, et al., "Nitrogen-doped Carbon-coox Nanohybrids: a Precious Metal Free Cathode That Exceeds 1.0 Wcm@2 Peak Power and 100 H Life in Anion-Exchange Membrane Fuel Cells," Angewandte Chemie, 2019, vol. 58(4), pp. 1058-1063.

Peng, et al., "Using Operando Techniques to Understand and Design High Performance and Stable Alkaline Membrane Fuel Cells,"Nature Communications, 2020, vol. 11, pp. 1-10.

Sharifian, et al., "Electrochemical Carbon Dioxide Capture to Close the Carbon Cycle," Energy & Environmental Science, 2021, vol. 14, pp. 781-814.

Sharma, et al., "Electrocatalytic conversion of carbon dioxide to fuels: a review on the interaction between CO2 and the liquid electrolyte," WIREs Energy Environ 2017, 6:e239. doi: 10.1002/wene.239, pp. 1-21.

Shi, et al., "Editors' Choice—uncovering the Role of Alkaline Pretreatment for Hydroxide Exchange Membrane Fuel Cells," Journal of the Electrochemical Society, 2020, vol. 167, pp. 1-10.

Shi, L. et al., "A shorted membrane electrochemical cell powered by hydrogen to remove CO2 from the air feed of hydroxide exchange membrane fuel cells", Nature Energy, Mar. 2022, vol. 7, 36 pages.

Shi, X., et al., "Sorbents for the Direct Capture of Co2 From Ambient Air," Angewandte Chemie, 2020, vol. 59(18), pp. 1-25.

Shu, Q., et al., "Electrochemical Regeneration of Spent Alkaline Absorbent from Direct Air Capture," Environmental science & technology, 2020, vol. 54(14), pp. 8990-8998.

Spets et al. "Direct Glucose Fuel Cell With Anion Exchange Membrane in the Near Neutral State Electrolyte, International Journal of Electrochemical Science," 7, 11696-11705, Dec. 1, 2012, entire document, http.electrochemsci.org/papers/vol? /71211696 .pdf.

Srinivasan, S. et al., "Advances in Solid Polymer Electrolyte Fuel Cell Technology with Low Platinum Loading Electrodes," Journal of Power Sources, 22 (1988) pp. 359-375.

U.S. Notice of Allowance dated Sep. 1, 2022 in U.S. Appl. No. 16/254,255.

U.S. Final office Action dated Nov. 21, 2022 in U.S. Appl. No. 17/247,036.

U.S. Non-Final office Action dated Jan. 20, 2023 in U.S. Appl. No. 17/452,395.

U.S. Non-Final Office Action dated May 24, 2022, in U.S. Appl. No. 17/247,036.

US Non-Final Office Action dated Oct. 22, 2021, in U.S. Appl. No. 16/254,255.

U.S. Notice of Allowance dated Feb. 10, 2023 in U.S. Appl. No. 17/247,036.

U.S. Notice of Allowance dated Mar. 2, 2023 in U.S. Appl. No. 17/247,036.

U.S. Appl. No. 18/051,944, inventors Kuhl et al., filed on Nov. 2, 2022.

U.S. Appl. No. 18/295,412, inventors Flanders et al., filed on Apr. 4, 2023.

U.S. Appl. No. 18/300,380, inventors Ziyang Huo et al., filed on Apr. 13, 2023.

U.S. Appl. No. 18/306,928, inventors Kendra P. Kuhl et al., filed on Apr. 25, 2023.

U.S. Appl. No. 18/324,929, inventors Huo Ziyang et al., filed on May 26, 2023.

U.S Restriction requirement dated Aug. 1, 2023 in U.S. Appl. No. 18/324,929.

U.S. Restriction Requirement dated Dec. 15, 2022 in U.S. Appl. No. 17/452,395.

U.S. Restriction requirement dated Jun. 23, 2023, in U.S. Appl. No. 17/444,356.

Verma, et al., "The effect of electrolyte composition on the electroreduction of CO2 to CO on Ag based gas diffusion electrodes," Phys. Chem. Chem. Phys., 2016, 18, pp. 7075-7084.

Voskian, S. et al., "Faradaic electro-swing reactive adsorption for $CO_2$ capture", Energy & Environmental Science, 2019, vol. 12, pp. 3530-3547.

Wang, et al., "Approaches for the preparation of non-linear amphiphilic polymers and their applications to drug delivery", Advanced Drug Delivery Reviews, 2012, vol. 64, pp. 852-865.

Wang, L., et al., "A High Conductivity Ultrathin Anion-exchange Membrane With 500+ H Alkali Stability for Use in Alkaline Membrane Fuel Cells That Can Achieve 2 W Cm-2 at 80 0C," Journal of Materials Chemistry A, 2018, vol. 6, pp. 15404-15412.

Wang, L., "Radiation-grafted anion-exchange membranes: the switch from low- to high-density polyethylene leads to remarkably enhanced fuel cell performance," Energy and Environmental Science, 2019, vol. 12, 1575-1579.

Wang, Y., et al., "Synergistic Mn—Co Catalyst Outperforms Pt on High-rate Oxygen Reduction for Alkaline Polymer Electrolyte Fuel Cells," Nature Communications, 2019, vol. 10(1), pp. 1-8.

Woo, J., et al., "Promoting Oxygen Reduction Reaction Activity of Fe-N/C Electrocatalysts by Silica-Coating-Mediated Synthesis for Anion-Exchange Membrane Fuel Cells," Chemistry of Materials, 2018, vol. 30, pp. 6684-6701.

Wurzbacher, J., et al., "Concurrent Separation of Co2 and H2o From Air by a Temperature-vacuum Swing Adsorption/desorption Cycle," Environmental science & technology, 2012, vol. 46(16), pp. 9191-9198.

Xia, Chuan, et al., "Continuous production of pure liquid fuel solutions via electrocatalytic CO2 reduction using solid electrolyte devices," Nature Energy, http://www.nature.com/natureenergy; https://doi.org/10.1038/s41560-019-0451-x.

Xin, L., et al., Carbon Supported Ag Nanoparticles as High Performance Cathode Catalyst for H2/O2 anion exchange membrane fuel cell, Frontiers in Chemistry, 2013, vol. 1(16), pp. 1-5.

Xu, C. et al., Preparation of PVA-GA-CS/PVA-Fe-SA Bipolar Membrane and Its Application in Electro-generation of 2,2-dimethyl-3-hydroxypropionic Acid, Journal of Membrane Science, vol. 307, No. 2, Jan. 2008, pp. 218-224.

Xu, Y., et al., "Self-Cleaning CO2 Reduction Systems: Unsteady Electrochemical Forcing Enables Stability," ACS Energy Letters, 2021, 6, pp. 809-815.

Yang, B. et al., "Preparation of a Bipolar Membrane by Photografting Polymerization", Frontiers of Chemistry in China, vol. 3, No. 1, Jan. 2008, pp. 10-13.

Zhan, et al., "Multiarm Star Poly(epsilon-caprolactone) with Hyperbranched Polyamidoamine as Core Capable of Selective Accommodating Cationic or Anionic Guests", Chinese Journal of Polymer Science, 2015. vol. 33, No. 6, pp. 920-930.

(56) References Cited

OTHER PUBLICATIONS

Zhang, J., et al., "Recent Insights on Catalyst Layers for Anion Exchange Membrane Fuel Cells," Advanced Science, 2021, vol. 8(15), pp. 1-26.

Zheng, et al., "Hyperbranched polymers: advances from synthesis to applications", Chemical Society Reviews, 2015, vol. 44, pp. 4091-4130.

Zheng, et al., "Editors' Choice—power-generating Electrochemical Co2 Scrubbing From Air Enabling Practical Aemfc Application," Journal of the Electrochemical Society, 2012, vol. 168, pp. 1-8.

Zheng, Y., et al., Quantifying and Elucidating the Effect of Co2 On the Thermodynamics, Kinetics and Charge Transport of AEMFC, Energy and Environmental Science, 2019, vol. 12, pp. 1-14.

Zhu, Wenlei et al., "Monodisperse Au Nanoparticles for Selective Electrocatalytic Reduction of CO2 to CO.Journal of the American Chemical Society," 2013, 135, pp. 16833-16836.

Gurkan, B., et al., "Quinone Reduction in Ionic Liquids for Electrochemical CO 2 Separation," ACS Sustainable Chemistry & Engineering, Jun. 5, 2015, vol. 3(7), pp. 1394-1405.

International Search Report and Written Opinion dated Nov. 27, 2023 in PCT Application No. PCT/US2023/024184.

Kang, J S., et al., "Redox-responsive Sorbents and Mediators for Electrochemically Based $Co_2$ Capture," Current Opinion in Green and Sustainable Chemistry, Oct. 1, 2021, vol. 31, p. 100504.

Kungas R., "Review-Electrochemical CO2 Reduction for CO Production: Comparison of Low- and High-Temperature Electrolysis Technologies," Journal of The Electrochemical Society, 2020, vol. 167, 044508, 12 Pages.

Liu, Y., et al., "Electrochemically Mediated Carbon Dioxide Separation with Quinone Chemistry in Salt-concentrated Aqueous Media," Nature Communications, May 8, 2020, vol. 11(1), pp. 1-11.

U.S. Non-Final Office Action dated Jan. 19, 2024 in U.S. Appl. No. 17/303,329.

U.S. Non-Final Office Action dated Jan. 19, 2024 in U.S. Appl. No. 18/306,928.

U.S. Non-Final Office Action dated Nov. 15, 2023 in U.S. Appl. No. 18/324,929.

Van Bavel, S., et al., "Integrating $CO_2$ Electrolysis into the Gas-to-Liquids-Power-to-Liquids Process," ACS Energy Letters, Jul. 24, 2020, vol. 5(8), pp. 2597-2601.

Wallace, G G., et al., "Manipulating and Monitoring Biomolecular Interactions with Conducting Electroactive Polymers," Advanced Materials, VCH Publishers, DE, Jul. 4, 2002, vol. 14(13-14), pp. 953-960.

\* cited by examiner

SEMI-INTERPENETRATING AND CROSSLINKED POLYMERS AND MEMBRANES THEREOF

STATEMENT OF GOVERNMENT SUPPORT

This invention was made with government support under Award Number DE-SC0020463 award by the Department of Energy. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The present disclosure relates to compositions including a core moiety and a plurality of polymeric units, in which at least one of these can include an ionizable moiety or an ionic moiety. Materials, devices, and methods using such compositions are also described.

BACKGROUND

One component of an electrochemical cell includes a polymer-based electrolyte membrane. The physical and chemical characteristics of the polymeric membrane can affect performance of such cells.

SUMMARY

The present disclosure relates to compositions including a core moiety and a plurality of polymeric units, in which at least one of these includes an ionizable moiety or an ionic moiety.

Accordingly, in a first aspect, the present disclosure encompasses a composition including a structure of formula (I):

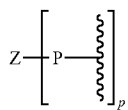

(I)

or a salt thereof, wherein:
Z is a core moiety having p number of linkages, wherein p is an integer of 1, 2, 3 or more;
P is a polymeric unit, wherein each P in each linkage can be same or different; and
at least one of Z or P includes an ionizable moiety or an ionic moiety.

In some embodiments, the composition includes a structure of any one of the following:

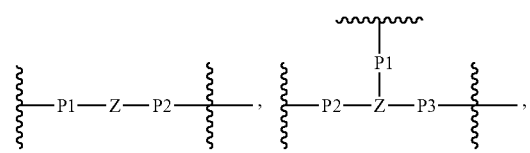

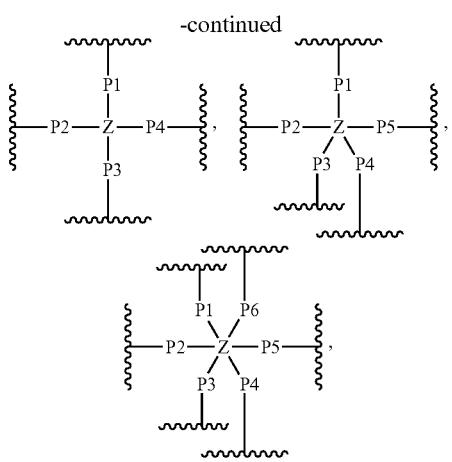

or a salt thereof, wherein:
each of P1, P2, P3, P4, P5, and P6 is, independently, a polymeric unit (e.g., any described herein).

In some embodiments, Z includes a structure of formula (IIa) or (IIb)

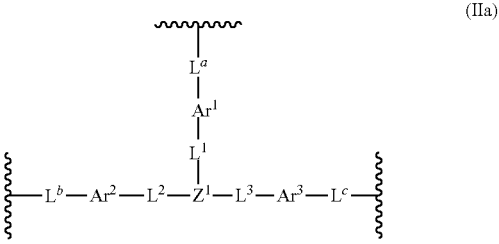

or

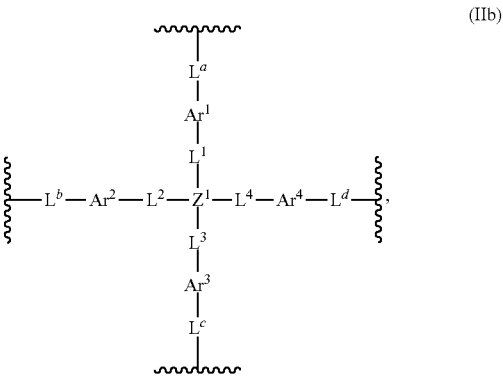

wherein:
$Z^1$ is a multivalent moiety (e.g., benzene, adamantane, triazine, triphenylene, carbon atom, silicon atom, etc.);
each of $Ar^1$, $Ar^2$, $Ar^3$, and $Ar^4$ includes, independently, an optionally substituted aromatic or optionally substituted arylene; and
each of $L^1$, $L^2$, $L^3$, $L^4$, $L^a$, $L^b$, $L^c$, and $L^d$ is, independently, a covalent bond, —O—, —$NR^{N1}$—, —C(O)—, optionally substituted aliphatic, optionally substituted alkylene, optionally substituted heteroaliphatic, or optionally substituted heteroalkylene,
wherein $R^{N1}$ is H, optionally substituted aliphatic, optionally substituted alkyl, optionally substituted aromatic, or optionally substituted aryl, and wherein each of $L^1$, $L^2$, $L^3$, $L^4$, $L^a$, $L^b$, $L^c$, and $L^d$ can, independently, optionally include an ionizable moiety or an ionic moiety (e.g., any described herein).

In any embodiment herein, each of $Ar^1$, $Ar^2$, $Ar^3$, and $Ar^4$ is, independently, -L-Ar—, -L-Ar-L-, —Ar-L-, -L-Ar—Ar-L-, -L-Ar—Ar-Ar-L-, or —Ar-L-Ar—; wherein each Ar is, independently, an optionally substituted aromatic or optionally substituted arylene; and wherein each L is, independently, a covalent bond, —O—, —$NR^{N1}$—, —C(O)—, optionally substituted aliphatic, optionally substituted alkylene, optionally substituted alkyleneoxy, optionally substituted heteroaliphatic, or optionally substituted heteroalkylene.

In any embodiment herein, each or at least one P, P1, P2, P3, P4, P5, and P6 includes, independently, a structure of any one of the following:

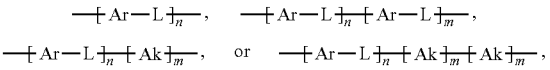

wherein:
each Ar includes, independently, an optionally substituted aromatic or optionally substituted arylene;
each Ak includes, independently, an optionally substituted aliphatic, optionally substitute alkylene, optionally substituted heteroaliphatic, or optionally substituted alkyleneoxy;
each L includes, independently, —O—, —$NR^{N1}$—, —C(O)—, optionally substituted aliphatic, optionally substituted alkylene, optionally substituted alkyleneoxy, optionally substituted heteroaliphatic, optionally substituted heteroalkylene, optionally substituted aromatic, optionally substituted arylene, optionally substituted heterocycle, or an optionally substituted heterocyclyldiyl;
$R^{N1}$ is H, optionally substituted aliphatic, optionally substituted alkyl, optionally substituted aromatic, or optionally substituted aryl;
n is an integer of 1 or more;
m is 0 or an integer of 1 or more; and
wherein each Ar and/or L can, independently, optionally include an ionizable moiety or an ionic moiety.

In any embodiment herein, each or at least one P, P1, P2, P3, P4, P5, and P6 includes, independently, a structure of any one or more of the following:

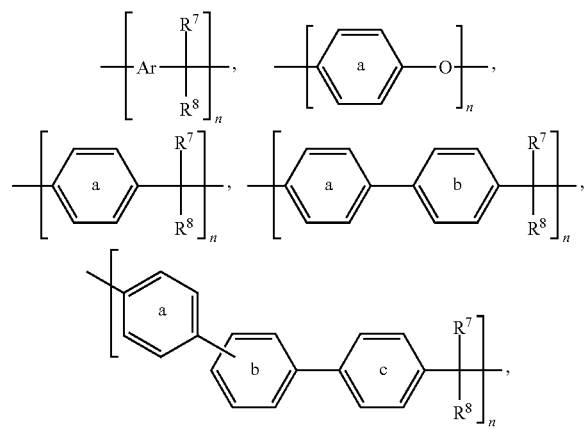

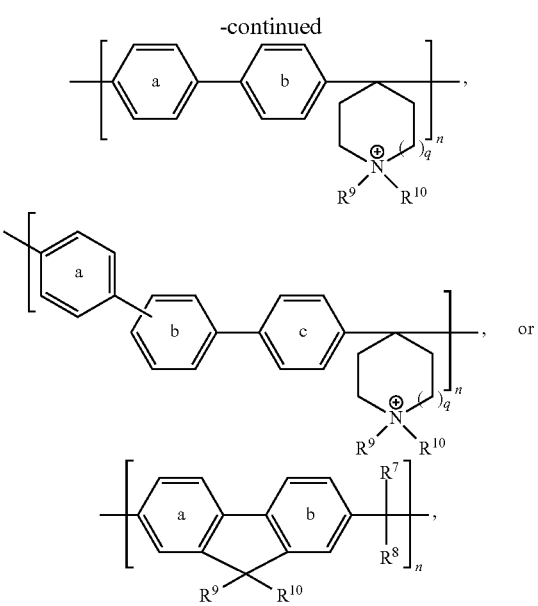

wherein:
each of $R^7$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein $R^7$ and $R^8$ can be taken together to form an optionally substituted cyclic group (e.g., which can optionally be substituted with an ionizable moiety or an ionic moiety);
each of $R^9$ and $R^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^9$ and $R^{10}$ can be taken together to form an optionally substituted cyclic group (e.g., which can optionally be substituted with an ionizable moiety or an ionic moiety);
Ar includes or is an optionally substituted aromatic or an optionally substituted arylene;
n is an integer of 1 or more;
q is 0, 1, 2, or more;
each of ring a, ring b, and/or ring c can, independently, be optionally substituted; and
wherein one or more of ring a, ring b, ring c, $R^7$, $R^8$, $R^9$, and $R^{10}$ can optionally include an ionizable moiety or an ionic moiety.

In any embodiment herein, the electron-withdrawing moiety is an optionally substituted haloalkyl (e.g., any described herein), cyano (CN), phosphate (e.g., —O(P=O)($OR^{P1}$)($OR^{P2}$) or —O—[P(=O)($OR^{P1}$)—O]$_{P3}$—$R^{P2}$), -sulfate (e.g., —O—S(=O)$_2$($OR^{S1}$)), sulfonic acid (—$SO_3H$), sulfonyl (e.g., —$SO_2$—$CF_3$), -difluoroboranyl (—$BF_2$), borono (—B(OH)$_2$), thiocyanato (—SCN), or piperidinium.

In any embodiment herein, the ionizable moiety or the ionic moiety includes -$L^A$-$X^A$ or -$L^A$-($L^{A'}$-$X^A$)$_{L2}$ or -$L^A$-($X^A$-$L^{A'}$-$X^{A'}$)$_{L2}$ or -$L^A$-$X^A$-$L^{A'}$-$X^{A'}$ or -$L^A$-$X^A$-$L^{A'}$-$X^{A'}$- $L^{A''}$-$X^{A''}$, wherein each $L^A$, $L^{A'}$, and $L^{A''}$ is, independently, a linking moiety; each $X^A$, $X^{A'}$, and $X^{A''}$ includes, independently, an acidic moiety, a basic moiety, or a multi-ionic moiety; and L2 is an integer of 1 or more. In some embodiments, each $L^A$, $L^{A'}$, and $L^{A''}$ includes, independently, an optionally substituted alkylene, optionally substituted alkyleneoxy, optionally substituted heteroalkylene, optionally substituted arylene, and/or optionally substituted aryleneoxy. In other embodiments, each $X^A$, $X^{A'}$, and $X^{A''}$ includes, independently, sulfo (—$SO_2OH$), sulfonate anion (—$SO_2O^-$), sulfonium cation (e.g., —$SR^{S1}R^{S2}$), carboxy (—$CO_2H$), carboxylate anion (—$CO_2^-$), phosphono (e.g., —P(=O)(OH)$_2$), phosphonate anion (e.g., —P(=O)(O$^-$)$_2$ or —P(=O)(OH)(O$^-$)), phosphonium cation (e.g., —$P^+R^{P1}R^{P2}R^{P3}$), phosphazenium cation (e.g., —$P^+$(=$NR^{N1}R^{N2}$)$R^{P1}R^{P2}$, amino (e.g., —$NR^{N1}R^{N2}$), ammonium cation (e.g., —$N^+R^{N1}R^{N2}R^{N3}$ or —$N^+R^{N1}R^{N2}$—), heterocyclic cation, piperidinium cation, azepanium cation, or a salt form thereof.

In any embodiment herein, the linking moiety is or includes a covalent bond, —O—, —$SO_2$—, —$NR^{N1}$—, —C(O)—, optionally substituted aliphatic, optionally substituted alkylene, optionally substituted haloalkylene, optionally substituted hydroxyalkylene, optionally substituted alkyleneoxy, optionally substituted heteroaliphatic, optionally substituted heteroalkylene, optionally substituted aromatic, optionally substituted arylene, optionally substituted aryleneoxy, optionally substituted heterocycle, or optionally substituted heterocyclyldiyl.

In any embodiment herein, the optionally substituted arylene or optionally substituted rings a-c is substituted with one or more substituents, and wherein the substituent is selected from the group consisting of alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

In any embodiment herein, at least one of rings a-c includes an ionizable moiety or an ionic moiety.

In any embodiment herein, $R^7$ is the electron-withdrawing moiety, and $R^8$ includes the ionizable moiety or the ionic moiety.

In any embodiment herein, $R^8$ includes an ionizable moiety or an ionic moiety.

In any embodiment herein, $R^7$ and $R^8$ can be taken together to form an optionally substituted cyclic group, or $R^9$ and $R^{10}$ can be taken together to form an optionally substituted cyclic group. In particular embodiments, the optionally substituted cyclic group can optionally be substituted with an ionizable moiety or an ionic moiety.

In any embodiment herein, the composition includes a polymer or a copolymer.

In any embodiment herein, the composition includes a film, a membrane, or a cross-linked polymeric matrix.

In a second aspect, the present disclosure features an electrochemical cell including: an anode; a cathode; and a polymer electrolyte membrane disposed between the anode and the cathode. In some embodiments, the polymer electrolyte membrane includes any composition described herein.

In a third aspect, the present disclosure features a method of making a polymer, the method including:
providing one or more polymeric units in the presence of an interpenetrating agent and a Friedel-Crafts alkylation agent, wherein the interpenetrating agent includes a core moiety Z and the Friedel-Crafts alkylation agent includes a haloalkyl group and a reactive group, thereby forming an initial polymer having a reactive group; and
substituting the reactive group with an ionic moiety, thereby providing an ionic polymer.

In some embodiments, the ionic polymer includes any composition described herein. Additional details follow.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

By "aliphatic" is meant a hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Such an aliphatic can be unsubstituted or substituted with one or more groups, such as groups described herein for an alkyl group.

The term "acyl," or "alkanoyl," as used interchangeably herein, represents an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group. In particular embodiments, the alkanoyl group is —C(O)-Ak, in which Ak is an alkyl group, as defined herein.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —O-Ak, wherein Ak is optionally substituted $C_{1-6}$ alkyl); (2) $C_{1-6}$ alkylsulfinyl (e.g., —S(O)-Ak, wherein Ak is optionally substituted $C_{1-6}$ alkyl); (3) $C_{1-6}$ alkylsulfonyl (e.g., —$SO_2$-Ak, wherein Ak is optionally substituted $C_{1-6}$ alkyl); (4) amino (e.g., —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group); (5) aryl; (6) arylalkoxy (e.g., —O-L-Ar, wherein L is a bivalent form of optionally substituted alkyl and Ar is optionally substituted aryl); (7) aryloyl (e.g., —C(O)—Ar, wherein Ar is optionally substituted aryl); (8) azido (e.g., —N$_3$); (9) cyano (e.g., —CN); (10) carboxyaldehyde (e.g., —C(O)H); (11) C$_{3-8}$ cycloalkyl (e.g., a monovalent saturated or unsaturated non-aromatic cyclic C$_{3-8}$ hydrocarbon group); (12) halo (e.g., F, Cl, Br, or I); (13) heterocyclyl (e.g., a 5-, 6- or 7-membered ring, unless otherwise specified, containing one, two, three, or four non-carbon heteroatoms, such as nitrogen, oxygen, phosphorous, sulfur, or halo); (14) heterocyclyloxy (e.g., —O-Het, wherein Het is heterocyclyl, as described herein); (15) heterocyclyloyl (e.g., —C(O)—Het, wherein Het is heterocyclyl, as described herein); (16) hydroxyl (e.g., —OH); (17) N-protected amino; (18) nitro (e.g., —NO$_2$); (19) oxo (e.g., =O) or hydroxyimino (e.g., =N—OH); (20) C$_{3-8}$ spirocyclyl (e.g., an alkylene or heteroalkylene diradical, both ends of which are bonded to the same carbon atom of the parent group); (21) C$_{1-6}$ thioalkoxy (e.g., —S-Ak, wherein Ak is optionally substituted C$_{1-6}$ alkyl); (22) thiol (e.g., —SH); (23) —CO$_2$R$^A$, where R$^A$ is selected from the group consisting of (a) hydrogen, (b) C$_{1-6}$ alkyl, (c) C$_{4-18}$ aryl, and (d) (C$_{4-18}$ aryl) C$_{1-6}$ alkyl (e.g., -L-Ar, wherein L is a bivalent form of optionally substituted alkyl group and Ar is optionally substituted aryl); (24) —C(O)NR$^B$R$^C$, where each of R$^B$ and R$^C$ is, independently, selected from the group consisting of (a) hydrogen, (b) C$_{1-6}$ alkyl, (c) C$_{4-18}$ aryl, and (d) (C$_{4-18}$ aryl) C$_{1-6}$ alkyl (e.g., -L-Ar, wherein L is a bivalent form of optionally substituted alkyl group and Ar is optionally substituted aryl); (25) —SO$_2$R$^D$, where R$^D$ is selected from the group consisting of (a) C$_{1-6}$ alkyl, (b) C$_{4-18}$ aryl, and (c) (C$_{4-18}$ aryl) C$_{1-6}$ alkyl (e.g., -L-Ar, wherein L is a bivalent form of optionally substituted alkyl group and Ar is optionally substituted aryl); (26) —SO$_2$NR$^E$R$^F$, where each of R$^E$ and R$^F$ is, independently, selected from the group consisting of (a) hydrogen, (b) C$_{1-6}$ alkyl, (c) C$_{4-18}$ aryl, and (d) (C$_{4-18}$ aryl) C$_{1-6}$ alkyl (e.g., -L-Ar, wherein L is a bivalent form of optionally substituted alkyl group and Ar is optionally substituted aryl); and (27) —NR$^G$R$^H$, where each of R$^G$ and R$^H$ is, independently, selected from the group consisting of (a) hydrogen, (b) an N-protecting group, (c) C$_{1-6}$ alkyl, (d) C$_{2-6}$ alkenyl (e.g., optionally substituted alkyl having one or more double bonds), (e) C$_{2-6}$ alkynyl (e.g., optionally substituted alkyl having one or more triple bonds), (f) C$_{4-18}$ aryl, (g) (C$_{4-18}$ aryl) C$_{1-6}$ alkyl (e.g., L-Ar, wherein L is a bivalent form of optionally substituted alkyl group and Ar is optionally substituted aryl), (h) C$_{3-8}$ cycloalkyl, and (i) (C$_{3-8}$ cycloalkyl) C$_{1-6}$ alkyl (e.g., -L-Cy, wherein L is a bivalent form of optionally substituted alkyl group and Cy is optionally substituted cycloalkyl, as described herein), wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a C$_{1-3}$, C$_{1-6}$, C$_{1-12}$, C$_{1-16}$, C$_{1-18}$, C$_{1-20}$, or C$_{1-24}$ alkyl group.

By "alkylene" is meant a multivalent (e.g., bivalent, trivalent, tetravalent, etc.) form of an alkyl group, as described herein. Exemplary alkylene groups include methylene, ethylene, propylene, butylene, etc. In some embodiments, the alkylene group is a C$_{1-3}$, C$_{1-6}$, C$_{1-12}$, C$_{1-16}$, C$_{1-18}$, C$_{1-20}$, C$_{1-24}$, C$_{2-3}$, C$_{2-6}$, C$_{2-12}$, C$_{2-16}$, C$_{2-18}$, C$_{2-20}$, or C$_{2-24}$ alkylene group. The alkylene group can be branched or unbranched. The alkylene group can be saturated or unsaturated (e.g., having one or more double bonds or triple bonds). The alkylene group can also be substituted or unsubstituted. For example, the alkylene group can be substituted with one or more substitution groups, as described herein for alkyl. In one instance, a substituted alkylene group can include an optionally substituted haloalkylene (e.g., an optionally substituted alkylene substituted with one or more hydroxyl groups, as defined herein), an optionally substituted haloalkylene (e.g., an optionally substituted alkylene substituted with one or more halo groups, as defined herein), and the like.

By "alkyleneoxy" is meant an alkylene group, as defined herein, attached to the parent molecular group through an oxygen atom.

By "amino" is meant —NR$^{N1}$R$^{N2}$, where each of R$^{N1}$ and R$^{N2}$ is, independently, H, optionally substituted alkyl, optionally substituted cycloalkyl, or optionally substituted aryl; or R$^{N1}$ and R$^{N2}$, taken together with the nitrogen atom to which each are attached, form an optionally substituted heterocyclyl group or heterocycle, as defined herein; or R$^{N1}$ and R$^{N2}$, taken together, form an optionally substituted alkylene or heteroalkylene (e.g., as described herein).

By "aminoalkyl" is meant an alkyl group, as defined herein, substituted by an amino group, as defined herein. Non-limiting aminoalkyl groups include -L-NR$^{N1}$R$^{N2}$, where L is a multivalent alkyl group, as defined herein; each of R$^{N1}$ and R$^{N2}$ is, independently, H, optionally substituted alkyl, or optionally substituted aryl; or R$^{N1}$ and R$^{N2}$, taken together with the nitrogen atom to which each are attached, form a heterocyclyl group, as defined herein.

By "ammonium" is meant a group including a protonated nitrogen atom N$^+$. Exemplary ammonium groups include —N$^+$R$^{N1}$R$^{N2}$R$^{N3}$ where each of R$^{N1}$, R$^{N2}$, and R$^{N3}$ is, independently, H, optionally substituted alkyl, optionally substituted cycloalkyl, or optionally substituted aryl; or R$^{N1}$ and R$^{N2}$, taken together with the nitrogen atom to which each are attached, form an optionally substituted heterocyclyl group or heterocycle; or R$^{N1}$ and R$^{N2}$, taken together, form an optionally substituted alkylene or heteroalkylene (e.g., as described herein); or R$^{N1}$ and R$^{N2}$ and R$^{N3}$, taken together with the nitrogen atom to which each are attached, form an optionally substituted heterocyclyl group or heterocycle, such as a heterocyclic cation.

By "aromatic" is meant a cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Huckel rule (4n+2). The point of attachment to the parent structure typically is through an aromatic portion of the condensed ring system. Such an aromatic can be unsubstituted or substituted with one or more groups, such as groups described herein for an alkyl or aryl group. Yet other substitution groups can include aliphatic, haloaliphatic, halo, nitrate, cyano, sulfonate, sulfonyl, or others.

By "aryl" is meant a group that contains any carbon-based aromatic group including, but not limited to, phenyl, benzyl, anthracenyl, anthryl, benzocyclobutenyl, benzocyclooctenyl, biphenylyl, chrysenyl, dihydroindenyl, fluoranthenyl, indacenyl, indenyl, naphthyl, phenanthryl, phenoxybenzyl, picenyl, pyrenyl, terphenyl, and the like, including fused benzo-C$_{4-8}$ cycloalkyl radicals (e.g., as defined herein) such as, for instance, indanyl, tetrahydronaphthyl, fluorenyl, and the like. The term aryl also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term non-heteroaryl, which is also included in the term aryl, defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl (e.g., —C(O)-Ak, wherein Ak is optionally substituted $C_{1-6}$ alkyl); (2) $C_{1-6}$ alkyl; (3) $C_{1-6}$ alkoxy (e.g., —O-Ak, wherein Ak is optionally substituted $C_{1-6}$ alkyl); (4) $C_{1-6}$ alkoxy-$C_{1-6}$ alkyl (e.g., -L-O-Ak, wherein L is a bivalent form of optionally substituted alkyl group and Ak is optionally substituted $C_{1-6}$ alkyl); (5) $C_{1-6}$ alkylsulfinyl (e.g., —S(O)-Ak, wherein Ak is optionally substituted $C_{1-6}$ alkyl); (6) $C_{1-6}$ alkylsulfinyl-$C_{1-6}$ alkyl (e.g., -L-S(O)-Ak, wherein L is a bivalent form of optionally substituted alkyl group and Ak is optionally substituted $C_{1-6}$ alkyl); (7) $C_{1-6}$ alkylsulfonyl (e.g., —$SO_2$-Ak, wherein Ak is optionally substituted $C_{1-6}$ alkyl); (8) $C_{1-6}$ alkylsulfonyl-$C_{1-6}$ alkyl (e.g., -L-$SO_2$-Ak, wherein L is a bivalent form of optionally substituted alkyl group and Ak is optionally substituted $C_{1-6}$ alkyl); (9) aryl; (10) amino (e.g., —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group); (11) $C_{1-6}$ aminoalkyl (e.g., an alkyl group, as defined herein, substituted by one or more —$NR^{N1}R^{N2}$ groups, as described herein); (12) heteroaryl (e.g., a subset of heterocyclyl groups (e.g., a 5-, 6- or 7-membered ring, unless otherwise specified, containing one, two, three, or four non-carbon heteroatoms), which are aromatic); (13) ($C_{4-18}$ aryl) $C_{1-6}$ alkyl (e.g., -L-Ar, wherein L is a bivalent form of optionally substituted alkyl and Ar is optionally substituted aryl); (14) aryloyl (e.g., —C(O)—Ar, wherein Ar is optionally substituted aryl); (15) azido (e.g., —$N_3$); (16) cyano (e.g., —CN); (17) $C_{1-6}$azidoalkyl (e.g., an alkyl group, as defined herein, substituted by one or more azido groups, as described herein); (18) carboxyaldehyde (e.g., —C(O)H); (19) carboxyaldehyde-$C_{1-6}$ alkyl (e.g., an alkyl group, as defined herein, substituted by one or more carboxyaldehyde groups, as described herein); (20) $C_{3-8}$ cycloalkyl (e.g., a monovalent saturated or unsaturated non-aromatic cyclic $C_{3-8}$ hydrocarbon group); (21) ($C_{3-8}$ cycloalkyl) $C_{1-6}$ alkyl (e.g., an alkyl group, as defined herein, substituted by one or more cycloalkyl groups, as described herein); (22) halo (e.g., F, Cl, Br, or I); (23) $C_{1-6}$ haloalkyl (e.g., an alkyl group, as defined herein, substituted by one or more halo groups, as described herein); (24) heterocyclyl (e.g., a 5-, 6- or 7-membered ring, unless otherwise specified, containing one, two, three, or four non-carbon heteroatoms, such as nitrogen, oxygen, phosphorous, sulfur, or halo); (25) heterocyclyloxy (e.g., —O-Het, wherein Het is heterocyclyl, as described herein); (26) heterocyclyloyl (e.g., —C(O)—Het, wherein Het is heterocyclyl, as described herein); (27) hydroxyl (e.g., —OH); (28) $C_{1-6}$ hydroxyalkyl (e.g., an alkyl group, as defined herein, substituted by one or more hydroxyl, as described herein); (29) nitro (e.g., —$NO_2$); (30) $C_{1-6}$ nitroalkyl (e.g., an alkyl group, as defined herein, substituted by one or more nitro, as described herein); (31) N-protected amino; (32) N-protected amino-$C_{1-6}$ alkyl (e.g., an alkyl group, as defined herein, substituted by one or more N-protected amino groups); (33) oxo (e.g., =O) or hydroxyimino (e.g., =N—OH); (34) $C_{1-6}$ thioalkoxy (e.g., —S-Ak, wherein Ak is optionally substituted $C_{1-6}$ alkyl); (35) thio-$C_{1-6}$ alkoxy-$C_{1-6}$ alkyl (e.g., -L-S-Ak, wherein L is a bivalent form of optionally substituted alkyl and Ak is optionally substituted $C_{1-6}$ alkyl); (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl and Ar is optionally substituted aryl); (37) —$(CH_2)_rCONR^BR^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl and Ar is optionally substituted aryl); (38) —$(CH_2)_rSO_2R^D$, where r is an integer of from zero to four and where $R^D$ is selected from the group consisting of (a) $C_{1-6}$ alkyl, (b) $C_{4-18}$ aryl, and (c) ($C_{4-18}$ aryl) $C_{1-6}$ alkyl (e.g., -L-Ar, wherein L is a bivalent form of optionally substituted alkyl and Ar is optionally substituted aryl); (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl and Ar is optionally substituted aryl); (40) —$(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl (e.g., optionally substituted alkyl having one or more double bonds), (e) $C_{2-6}$ alkynyl (e.g., optionally substituted alkyl having one or more triple bonds), (f) $C_{4-18}$ aryl, (g) ($C_{4-18}$ aryl) $C_{1-6}$ alkyl (e.g., -L-Ar, wherein L is a bivalent form of optionally substituted alkyl and Ar is optionally substituted aryl), (h) $C_{3-8}$ cycloalkyl, and (i) ($C_{3-8}$ cycloalkyl) $C_{1-6}$ alkyl (e.g., -L-Cy, wherein L is a bivalent form of optionally substituted alkyl and Cy is optionally substituted cycloalkyl, as described herein), wherein in one embodiment no two groups are bound to the nitrogen atom through a carbonyl group or a sulfonyl group; (41) thiol (e.g., —SH); (42) perfluoroalkyl (e.g., an alkyl group having each hydrogen atom substituted with a fluorine atom); (43) perfluoroalkoxy (e.g., —$OR^f$, where $R^f$ is an alkyl group having each hydrogen atom substituted with a fluorine atom); (44) aryloxy (e.g., —OAr, where Ar is optionally substituted aryl); (45) cycloalkoxy (e.g., —O-Cy, wherein Cy is optionally substituted cycloalkyl, as described herein); (46) cycloalkylalkoxy (e.g., —O-L-Cy, wherein L is a bivalent form of optionally substituted alkyl and Cy is optionally substituted cycloalkyl, as described herein); and (47) arylalkoxy (e.g., —O-L-Ar, wherein L is a bivalent form of optionally substituted alkyl and Ar is optionally substituted aryl). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylalkoxy" is meant an arylalkylene group, as defined herein, attached to the parent molecular group through an oxygen atom. In some embodiments, the arylalkoxy group is —O-Ak-Ar, in which Ak is an optionally substituted alkylene, as defined herein, and Ar is an optionally substituted aryl, as defined herein.

By "(aryl)(alkyl)ene" is meant a bivalent form including an arylene group, as described herein, attached to an alkylene or a heteroalkylene group, as described herein. In some embodiments, the (aryl)(alkyl)ene group is -L-Ar— or -L-Ar-L- or —Ar-L-, in which Ar is an arylene group and each L is, independently, an optionally substituted alkylene group or an optionally substituted heteroalkylene group.

By "arylalkylene" is meant an aryl group, as defined herein, attached to the parent molecular group through an alkylene group, as defined herein. In some embodiments, the arylalkylene group is -Ak-Ar, in which Ak is an optionally substituted alkylene, as defined herein, and Ar is an optionally substituted aryl, as defined herein. The arylalkylene group can be substituted or unsubstituted. For example, the arylalkylene group can be substituted with one or more substitution groups, as described herein for aryl and/or alkyl. Exemplary unsubstituted arylalkylene groups are of from 7 to 16 carbons ($C_{7-16}$ arylalkylene), as well as those having an aryl group with 4 to 18 carbons and an alkylene group with 1 to 6 carbons (i.e., ($C_{4-18}$ aryl)$C_{1-6}$ alkylene).

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloyl" is meant an aryl group that is attached to the parent molecular group through a carbonyl group. In some embodiments, an unsubstituted aryloyl group is a $C_{7-11}$ aryloyl or $C_{5-19}$ aryloyl group. In particular embodiments, the aryloyl group is —C(O)—Ar, in which Ar is an aryl group, as defined herein.

By "boranyl" is meant a —BR$_2$ group, in which each R, independently, can be H, halo, or optionally substituted alkyl.

By "borono" is meant a —BOH$_2$ group.
By "carboxyl" is meant a —CO$_2$H group.
By "carboxylate anion" is meant a —CO$_2^-$ group.
By "covalent bond" is meant a covalent bonding interaction between two components. Non-limiting covalent bonds include a single bond, a double bond, a triple bond, or a spirocyclic bond, in which at least two molecular groups are bonded to the same carbon atom.

By "cyano" is meant a —CN group.
By "cyclic group" is used herein to refer to either aryl groups, non-aryl groups (e.g., cycloalkyl or heterocycloalkyl groups), or both. Cyclic groups have one or more ring systems that can be substituted or unsubstituted. A cyclic group can contain one or more aryl groups, one or more non-aryl groups, or one or more aryl groups and one or more non-aryl groups.

By "cycloalkyl" is meant a monovalent saturated or unsaturated non-aromatic cyclic hydrocarbon group of from three to ten carbons (e.g., $C_{3-8}$ or $C_{3-10}$), unless otherwise specified, and is exemplified by cyclopropyl, cyclobutyl, cyclopentyl, cyclohexyl, cycloheptyl, bicyclo[2.2.1.]heptyl, and the like. The term cycloalkyl also includes "cycloalkenyl," which is defined as a non-aromatic carbon-based ring composed of three to ten carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The cycloalkyl group can also be substituted or unsubstituted. For example, the cycloalkyl group can be substituted with one or more groups including those described herein for alkyl.

By "halo" is meant F, Cl, Br, or I.
By "haloalkyl" is meant an alkyl group, as defined herein, substituted with one or more halo.
By "haloalkylene" is meant an alkylene group, as defined herein, substituted with one or more halo.
By "heteroaliphatic" is meant an aliphatic group, as defined herein, including at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group.

By "heteroalkyl" is meant an alkyl group, as defined herein, containing one, two, three, or four non-carbon heteroatoms (e.g., independently selected from the group consisting of nitrogen, oxygen, phosphorous, sulfur, selenium, or halo).

By "heteroalkylene" is meant an alkylene group, as defined herein, containing one, two, three, or four non-carbon heteroatoms (e.g., independently selected from the group consisting of nitrogen, oxygen, phosphorous, sulfur, selenium, or halo). The heteroalkylene group can be saturated or unsaturated (e.g., having one or more double bonds or triple bonds). The heteroalkylene group can be substituted or unsubstituted. For example, the heteroalkylene group can be substituted with one or more substitution groups, as described herein for alkyl.

By "heteroaryl" is meant a subset of heterocyclyl groups, as defined herein, which are aromatic, i.e., they contain 4n+2 pi electrons within the mono- or multi cyclic ring system.

The term "heterocycloalkyl" is a type of cycloalkyl group as defined above where at least one of the carbon atoms and its attached hydrogen atoms, if any, are replaced by O, S, N, or NH. The heterocycloalkyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

By "heterocycle" is meant a compound having one or more heterocyclyl moieties. Non-limiting heterocycles include optionally substituted imidazole, optionally substituted triazole, optionally substituted tetrazole, optionally substituted pyrazole, optionally substituted imidazoline, optionally substituted pyrazoline, optionally substituted imidazolidine, optionally substituted pyrazolidine, optionally substituted pyrrole, optionally substituted pyrroline, optionally substituted pyrrolidine, optionally substituted tetrahydrofuran, optionally substituted furan, optionally substituted thiophene, optionally substituted oxazole, optionally substituted isoxazole, optionally substituted isothiazole, optionally substituted thiazole, optionally substituted oxathiolane, optionally substituted oxadiazole, optionally substituted thiadiazole, optionally substituted sulfolane, optionally substituted succinimide, optionally substituted thiazobdinedione, optionally substituted oxazobdone, optionally substituted hydantoin, optionally substituted pyridine, optionally substituted piperidine, optionally substituted pyridazine, optionally substituted piperazine, optionally substituted pyrimidine, optionally substituted pyrazine, optionally substituted triazine, optionally substituted pyran, optionally substituted pyrylium, optionally substituted tetrahydropyran, optionally substituted dioxine, optionally substituted dioxane, optionally substituted dithiane, optionally substituted trithiane, optionally substituted thiopyran, optionally substituted thiane, optionally substituted oxazine, optionally substituted morpholine, optionally substituted thiazine, optionally substituted thiomorpholine, optionally substituted cytosine, optionally substituted thymine, optionally substituted uracil, optionally substituted thiomorpholine dioxide, optionally substituted indene, optionally substituted indoline, optionally substituted indole, optionally substituted isoindole, optionally substituted indolizine, optionally substituted indazole, optionally substituted benzimidazole, optionally substituted azaindole, optionally substituted azaindazole, optionally substituted pyrazolopyrimidine, optionally substituted purine, optionally substituted benzofuran, optionally substituted isobenzofuran, optionally substituted benzothiophene, optionally substituted benzisoxazole, optionally substituted anthranil, optionally substituted benzisothiazole, optionally substituted benzoxazole, optionally substituted benzthiazole, optionally substituted benzthiadiazole, optionally substituted adenine, optionally substituted guanine, optionally substituted tetrahydroquinoline, optionally substituted dihydroquinoline, optionally substituted dihydroisoquinoline, optionally substituted quinoline, optionally substituted isoquinoline, optionally substituted quinolizine, optionally substituted quinoxaline, optionally substituted phthalazine, optionally substituted quinazoline, optionally substituted cinnoline, optionally substituted naphthyridine, optionally substituted pyridopyrimidine, optionally substituted pyridopyrazine, optionally substituted pteridine, optionally substituted chromene, optionally substituted isochromene, optionally substituted chromenone, optionally substituted benzoxazine, optionally substituted quinolinone, optionally substituted isoquinolinone, optionally substituted carbazole, optionally substituted dibenzofuran, optionally substituted acridine, optionally substituted phenazine, optionally substituted phenoxazine, optionally substituted phenothiazine, optionally substituted phenoxathiine, optionally substituted quinuclidine, optionally substituted azaadamantane, optionally substituted dihydroazepine, optionally substituted azepine, optionally substituted diazepine, optionally substituted oxepane, optionally substituted thiepine, optionally substituted thiazepine, optionally substituted azocane, optionally substituted azocine, optionally substituted thiocane, optionally substituted azonane, optionally substituted azecine, etc. Optional substitutions include any described herein for aryl. Heterocycles can also include cations and/or salts of any of these (e.g., any described herein, such as optionally substituted piperidinium, optionally substituted pyrrolidinium, optionally substituted pyrazolium, optionally substituted imidazolium, optionally substituted pyridinium, optionally substituted quinolinium, optionally substituted isoquinolinium, optionally substituted acridinium, optionally substituted phenanthridinium, optionally substituted pyridazinium, optionally substituted pyrimidinium, optionally substituted pyrazinium, optionally substituted phenazinium, or optionally substituted morpholinium).

By "heterocyclyl" is meant a 3-, 4-, 5-, 6- or 7-membered ring (e.g., a 5-, 6- or 7-membered ring), unless otherwise specified, containing one, two, three, or four non-carbon heteroatoms (e.g., independently selected from the group consisting of nitrogen, oxygen, phosphorous, sulfur, selenium, or halo). The 3-membered ring has zero to one double bonds, the 4- and 5-membered ring has zero to two double bonds, and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include acridinyl, adenyl, alloxazinyl, azaadamantanyl, azabenzimidazolyl, azabicyclononyl, azacycloheptyl, azacyclooctyl, azacyclononyl, azahypoxanthinyl, azaindazolyl, azaindolyl, azecinyl, azepanyl, azepinyl, azetidinyl, azetyl, aziridinyl, azirinyl, azocanyl, azocinyl, azonanyl, benzimidazolyl, benzisothiazolyl, benzisoxazolyl, benzodiazepinyl, benzodiazocinyl, benzodihydrofuryl, benzodioxepinyl, benzodioxinyl, benzodioxanyl, benzodioxocinyl, benzodioxolyl, benzodithiepinyl, benzodithiinyl, benzodioxocinyl, benzofuranyl, benzophenazinyl, benzopyranonyl, benzopyranyl, benzopyrenyl, benzopyronyl, benzoquinolinyl, benzoquinolizinyl, benzothiadiazepinyl, benzothiadiazolyl, benzothiazepinyl, benzothiazocinyl, benzothiazolyl, benzothienyl, benzothiophenyl, benzothiazinonyl, benzothiazinyl, benzothiopyranyl, benzothiopyronyl, benzotriazepinyl, benzotriazinonyl, benzotriazinyl, benzotriazolyl, benzoxathiinyl, benzotrioxepinyl, benzoxadiazepinyl, benzoxathiazepinyl, benzoxathiepinyl, benzoxathiocinyl, benzoxazepinyl, benzoxazinyl, benzoxazocinyl, benzoxazolinonyl, benzoxazolinyl, benzoxazolyl, benzylsultamyl benzylsultimyl, bipyrazinyl, bipyridinyl, carbazolyl (e.g., 4H-carbazolyl), carbolinyl (e.g., β-carbolinyl), chromanonyl, chromanyl, chromenyl, cinnolinyl, coumarinyl, cytdinyl, cytosinyl, decahydroisoquinolinyl, decahydroquinolinyl, diazabicyclooctyl, diazetyl, diaziridinethionyl, diaziridinonyl, diaziridinyl, diazirinyl, dibenzisoquinolinyl, dibenzoacridinyl, dibenzocarbazolyl, dibenzofuranyl, dibenzophenazinyl, dibenzopyranonyl, dibenzopyronyl (xanthonyl), dibenzoquinoxalinyl, dibenzothiazepinyl, dibenzothiepinyl, dibenzothiophenyl, dibenzoxepinyl, dihydroazepinyl, dihydroazetyl, dihydrofuranyl, dihydrofuryl, dihydroisoquinolinyl, dihydropyranyl, dihydropyridinyl, dihydroypyridyl, dihydroquinolinyl, dihydrothienyl, dihydroindolyl, dioxanyl, dioxazinyl, dioxindolyl, dioxiranyl, dioxenyl, dioxinyl, dioxobenzofuranyl, dioxolyl, dioxotetrahydrofuranyl, dioxothiomorpholinyl, dithianyl, dithiazolyl, dithienyl, dithiinyl, furanyl, furazanyl, furoyl, furyl, guaninyl, homopiperazinyl, homopiperidinyl, hypoxanthinyl, hydantoinyl, imidazolidinyl, imidazolinyl, imidazolyl, indazolyl (e.g., 1H-indazolyl), indolenyl, indolinyl, indolizinyl, indolyl (e.g., 1H-indolyl or 3H-indolyl), isatinyl, isatyl, isobenzofuranyl, isochromanyl, isochromenyl, isoindazoyl, isoindolinyl, isoindolyl, isopyrazolonyl, isopyrazolyl, isoxazolidiniyl, isoxazolyl, isoquinolinyl, isoquinolyl, isothiazolidinyl, isothiazolyl, morpholinyl, naphthindazolyl, naphthindolyl, naphthiridinyl, naphthopyranyl, naphthothiazolyl, naphthothioxolyl, naphthotriazolyl, naphthoxindolyl, naphthyridinyl, octahydroisoquinolinyl, oxabicycloheptyl, oxauracil, oxadiazolyl, oxazinyl, oxaziridinyl, oxazolidinyl, oxazolidonyl, oxazolinyl, oxazolonyl, oxazolyl, oxepanyl, oxetanonyl, oxetanyl, oxetyl, oxtenayl, oxindolyl, oxiranyl, oxobenzoisothiazolyl, oxochromenyl, oxoisoquinolinyl, oxoquinolinyl, oxothiolanyl, phenanthridinyl, phenanthrolinyl, phenazinyl, phenothiazinyl, phenothienyl (benzothiofuranyl), phenoxathiinyl, phenoxazinyl, phthalazinyl, phthalazonyl, phthalidyl, phthalimidinyl, piperazinyl, piperidinyl, piperidonyl (e.g., 4-piperidonyl), pteridinyl, purinyl, pyranyl, pyrazinyl, pyrazolidinyl, pyrazolinyl, pyrazolopyrimidinyl, pyrazolyl, pyridazinyl, pyridinyl, pyridopyrazinyl, pyridopyrimidinyl, pyridyl, pyrimidinyl, pyrimidyl, pyronyl, pyrrolidinyl, pyrrolidonyl (e.g., 2-pyrrolidonyl), pyrrolinyl, pyrrolizidinyl, pyrrolyl (e.g., 2H-pyrrolyl), pyrylium, quinazolinyl, quinolinyl, quinolizinyl (e.g., 4H-quinolizinyl), quinoxalinyl, quinuclidinyl, selenazinyl, selenazolyl, selenophenyl, succinimidyl, sulfolanyl, tetrahydrofuranyl, tetrahydrofuryl, tetrahydroisoquinolinyl, tetrahydroisoquinolyl, tetrahydropyridinyl, tetrahydropyridyl (piperidyl), tetrahydropyranyl, tetrahydropyronyl, tetrahydroquinolinyl, tetrahydroquinolyl, tetrahydrothienyl, tetrahydrothiophenyl, tetrazinyl, tetrazolyl, thiadiazinyl (e.g., 6H-1,2,5-thiadiazinyl or 2H,6H-1,5,2-dithiazinyl), thiadiazolyl, thianthrenyl, thianyl, thianaphthenyl, thiazepinyl, thiazinyl, thiazolidinedionyl, thiazolidinyl, thiazolyl, thienyl, thiepanyl, thiepinyl, thietanyl, thietyl, thiiranyl, thiocanyl, thiochromanonyl, thiochromanyl, thiochromenyl, thiodiazinyl, thiodiazolyl, thioindoxyl, thiomorpholinyl, thiophenyl, thiopyranyl, thiopyronyl, thiotriazolyl, thiourazolyl, thioxanyl, thioxolyl, thymidinyl, thyminyl, triazinyl, triazolyl, trithianyl, urazinyl, urazolyl, uretidinyl, uretinyl, uricyl, uridinyl, xanthenyl, xanthinyl, xanthionyl, and the like, as well as modified forms thereof (e.g., including one or more oxo and/or amino) and salts thereof. The heterocyclyl group can be substituted or unsubstituted. For example, the heterocyclyl group can be substituted with one or more substitution groups, as described herein for aryl.

By "heterocyclyldiyl" is meant a bivalent form of a heterocyclyl group, as described herein. In one instance, the heterocyclyldiyl is formed by removing a hydrogen from a heterocyclyl group. Exemplary heterocyclyldiyl groups include piperdylidene, quinolinediyl, etc. The heterocyclyldiyl group can also be substituted or unsubstituted. For example, the heterocyclyldiyl group can be substituted with one or more substitution groups, as described herein for heterocyclyl.

By "hydroxyl" is meant an —OH group.

By "hydroxyalkyl" is meant an alkyl group, as defined herein, substituted with one or more hydroxyl.

By "hydroxyalkylene" is meant an alkylene group, as defined herein, substituted with one or more hydroxy.

By "nitro" is meant an —NO$_2$ group.

By "phosphate" is meant a group derived from phosphoric acid. One example of phosphate includes a —O—P(=O)(OR$^{P1}$)(OR$^{P2}$) or —O—[P(=O)(OR$^{P1}$)—O]$_{P3}$—R$^{P2}$ group, where each of R$^{P1}$ and R$^{P2}$, is, independently, H, optionally substituted alkyl, optionally substituted alkenyl, optionally substituted aryl, or optionally substituted arylalkylene, and where P3 is an integer from 1 to 5. Yet other examples of phosphate include orthophosphoric acid, pyrophosphoric acid, tripolyphosphoric acid, tetrapolyphosphoric acid, trimetaphosphoric acid, and/or phosphoric anhydride, or combinations thereof.

By "phosphono" or "phosphonic acid" is meant a —P(O)(OH)$_2$ group.

By "spirocyclyl" is meant an alkylene diradical, both ends of which are bonded to the same carbon atom of the parent group to form a spirocyclyl group and also a heteroalkylene diradical, both ends of which are bonded to the same atom. Non-limiting alkylene and heteroalkylene groups for use within a spirocyclyl group includes $C_{2-12}$, $C_{2-11}$, $C_{2-10}$, $C_{2-9}$, $C_{2-8}$, $C_{2-7}$, $C_{2-6}$, $C_{2-5}$, $C_{2-4}$, or $C_{2-3}$ alkylene groups, as well as $C_{1-12}$, $C_{1-11}$, $C_{1-10}$, $C_{1-9}$, $C_{1-8}$, $C_{1-7}$, $C_{1-6}$, $C_{1-5}$, $C_{1-4}$, $C_{1-3}$, or $C_{1-2}$ heteroalkylene groups having one or more heteroatoms.

By "sulfate" is meant a group derived from sulfuric acid. One example of sulfate includes a —O—S(=O)$_2$(OR$^{S1}$) group, where R$^{S1}$ is H, optionally substituted alkyl, optionally substituted alkenyl, optionally substituted aryl, or optionally substituted arylalkylene.

By "sulfo" or "sulfonic acid" is meant an —S(O)$_2$OH group.

By "sulfonyl" is meant an —S(O)$_2$— or —S(O)$_2$R group, in which R can be H, optionally substituted alkyl, or optionally substituted aryl. Non-limiting sulfonyl groups can include a trifluoromethylsulfonyl group (—SO$_2$—CF$_3$ or Tf).

By "thiocyanato" is meant an —SCN group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January; 66(1): 1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, gluconate, glutamate, glycerophosphate, hemisulfate, heptonate, hexanoate, hydrobromide, hydrochloride, hydroiodide, hydroxy ethanesulfonate, hydroxynaphthoate, iodide, lactate, lactobionate, laurate, lauryl sulfate, malate, maleate, malonate, mandelate, mesylate, methanesulfonate, methylbromide, methylnitrate, methyl sulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include ammonium, sulfonium, sulfoxonium, phosphonium, iminium, imidazolium, benzimidazolium, amidinium, guanidinium, phosphazinium, phosphazenium, pyridinium, etc., as well as other cationic groups described herein (e.g., optionally substituted isoxazolium, optionally substituted oxazolium, optionally substituted thiazolium, optionally substituted pyrrolium, optionally substituted furanium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinum, optionally substituted quinolizinium, optionally substituted dehydroquinolizinium, optionally substituted quinolinium, optionally substituted isoindolinium, optionally substituted benzimidazolinium, and optionally substituted purinium). Yet other salts can include an anion, such as a halide (e.g., F⁻, Cl⁻, Br⁻, or I⁻), a hydroxide (e.g., OFT), a borate (e.g., tetrafluoroborate ($BF_4^-$), a carbonate (e.g., $CO_3^{2-}$ or $HCO_2^-$), or a sulfate (e.g., $SO_4^{2-}$).

By "leaving group" is meant an atom (or a group of atoms) with electron withdrawing ability that can be displaced as a stable species, taking with it the bonding electrons, or an atom (or a group of atoms) that can be replaced by a substitution reaction. Examples of suitable leaving groups include H, halides, and sulfonates including, but not limited to, triflate (—OTf), mesylate (—OMs), tosylate (—OTs), brosylate (—OBs), acetate, Cl, Br, and I.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, JI bond interactions, hydrophobic interactions, inclusion complexes, clathration, van der Waals interactions, and combinations thereof.

DETAILED DESCRIPTION

The present disclosure relates to a composition including a core moiety Z and a plurality of polymeric units P, in which at least one of Z or P includes an ionizable moiety or an ionic moiety. In use, the core moiety provides a crosslinked structure interspersed with polymeric units, and charge conduction through the material can be controlled by the type and amount of charge (e.g., anionic and/or cationic charge) provided by the ionizable/ionic moieties. The extent of crosslinking can be controlled by increasing or decreasing the valency of the core moiety, as well as by the rigidity or flexibility of the polymeric units.

In one embodiment, the composition includes a formula (I):

or a salt thereof, wherein:
Z is a core moiety having p number of linkages, wherein p is an integer of 1, 2, 3 or more;
P is a polymeric unit, wherein each P in each linkage can be same or different; and
at least one of Z or P includes an ionizable moiety or an ionic moiety.

In particular embodiments, Z include one or more optionally substituted aromatic or optionally substituted arylene (e.g., multivalent forms of benzene, acenaphthene, acenaphthylene, anthracene, benz[a]anthracene, benzo[a]fluorene, benzo[c]fluorene, benzo[c]phenanthrene, chrysene, fluoranthene, fluorene, naphthalene, phenalene, phenanthrene, pyrene, tetracene, or triphenylene). In some embodiments, p is an integer of 2 or more (e.g., from 2 to 20, 2 to 10, 2 to 8, or 2 to 6); or an integer of 3 or more (e.g., from 3 to 20, 3 to 10, 3 to 8, or 3 to 6).

The core moiety Z can include three or more linkages. Non-limiting examples of such compositions can include any of the following:

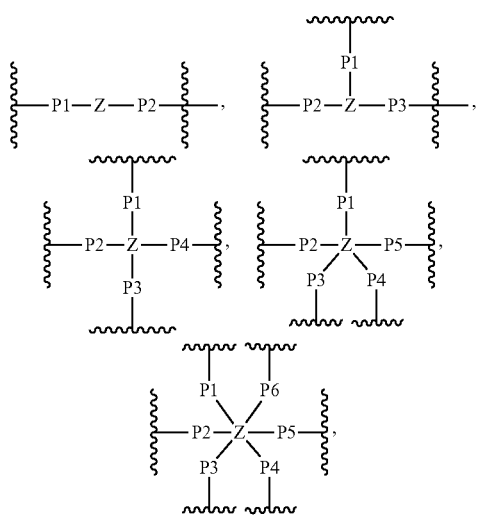

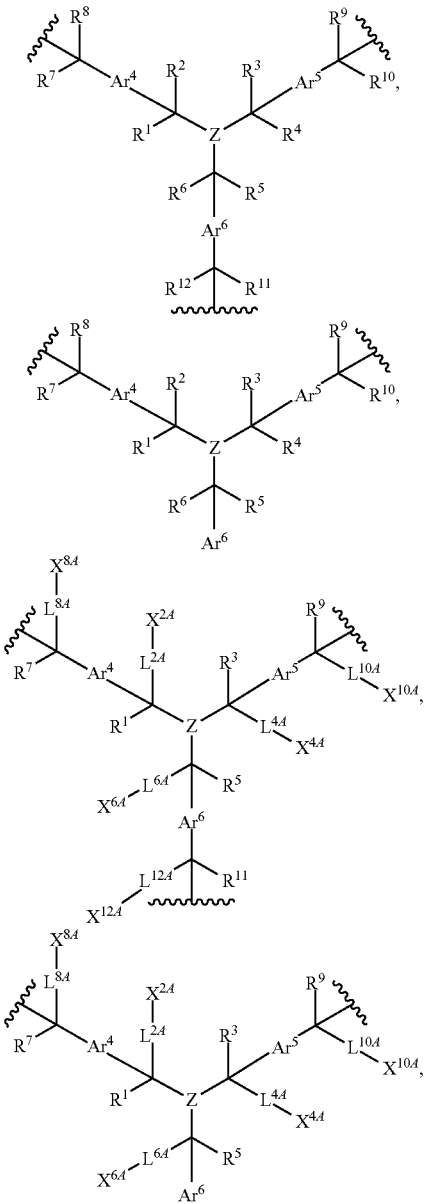

or a salt thereof, wherein Z is a core moiety; and at least one of P1, P2, P3, P4, P5, and P6 is, independently, a polymeric unit (e.g., any described herein). In some embodiment, each of each of P1, P2, P3, P4, P5, and P6 is, independently, a polymeric unit. Examples of core moieties to provide such linkages are described herein.

Figure 1A:
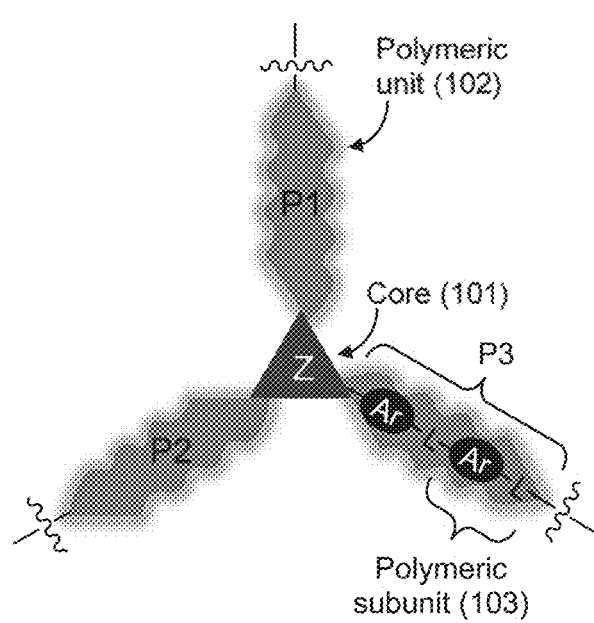
FIG. 1A-1D provides schematics of non-limiting (A, C, D) compositions and (B) polymeric units.

FIG. 1A provides a schematic of a non-limiting structure having a trivalent core moiety Z 101 that is attached to three polymeric units 102 (P1, P2, P3). The three linkages for the trivalent core moiety can be arranged symmetrically or asymmetrically around the core. Non-limiting trivalent core moieties can include benzenetriyl (a trivalent benzene group), aryltriyl (a trivalent aryl group), cycloalkyltriyl (a trivalent cycloalkyl group), heterocyclyltriyl (a trivalent heterocyclyl group), heteroaryltriyl (a trivalent heteroaryl group), or a trivalent atom (e.g., a boron atom, a nitrogen atom, or a phosphorous atom) having three linking moieties (e.g., any described herein, such as optionally substituted aliphatic, optionally substituted alkylene, optionally substituted aromatic, or optionally substituted arylene).

Each polymeric unit 102 can include one or more subunits 103 (or one or more monomeric units). In one instance, the polymeric subunit (or monomeric unit) 103 includes:

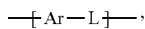

in which Ar is an optionally substituted arylene or optionally substituted aromatic, and L is a linking moiety (e.g., any described herein). Other monomeric units can be employed, such as:

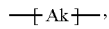

in which Ak is an optionally substituted alkylene or optionally substituted haloalkylene or optionally substituted aliphatic. Any number and type of monomeric units can be combined to form the polymeric unit.

Figure 1B:
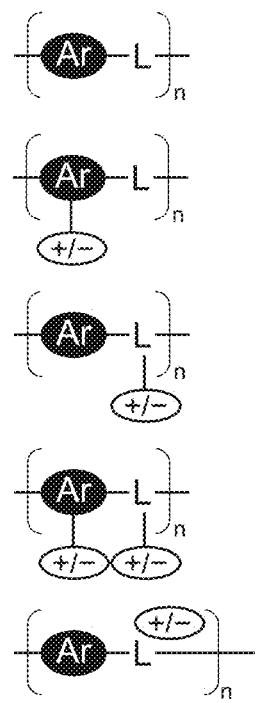

Ionizable or ionic moieties can be present on the core moiety Z and/or the polymeric unit P. As seen in FIG. 1B, a non-limiting polymeric subunit can lack ionic moieties. Alternatively, the polymeric subunit can include an ionic moiety (indicated as ⊕ on the Ar group, the L group, both the Ar and L groups, or be integrated as part of the L group. Non-limiting examples of ionizable and ionic moieties including cationic, anionic, and multi-ionic group, as described herein.

In other embodiments, the composition can include a structure of formula:

or a salt thereof, wherein:
Z is a core moiety (e.g., any described herein, including a multivalent core moiety, trivalent core moiety, tetravalent core moiety, pentavalent core moiety, or multivalent arylene moiety);
each of $Ar^4$, $Ar^5$, and $Ar^6$ includes, independently, an optionally substituted aromatic, an optionally substituted arylene, or an optionally substituted aryl (e.g., any described herein);
each of $R^1$, $R^3$, $R^5$, $R^7$, $R^9$, and $R^{11}$ is, independently, a haloalkyl, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;

each of $R^2$, $R^4$, $R^6$, $R^8$, $R^{10}$, and $R^{12}$ includes an ionizable moiety or an ionic moiety;

each $L^{2A}$, $L^{4A}$, $L^{6A}$, $L^{8A}$, $L^{10A}$, and $L^{12A}$ is, independently, a linking moiety; and each $X^{2A}$, $X^{4A}$, $X^{6A}$, $X^{8A}$, $X^{10A}$, and $X^{12A}$ is, independently, an acidic moiety or a basic moiety.

Figure 1C:
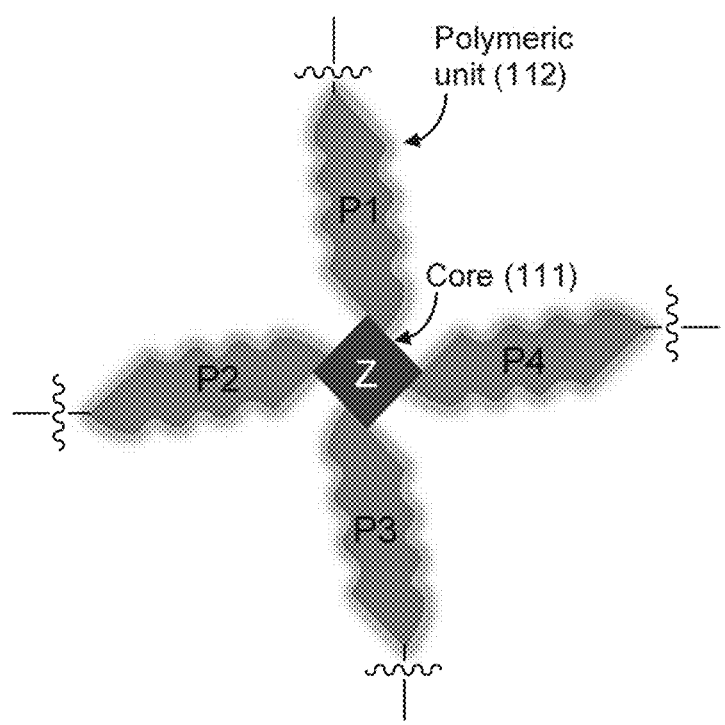

The core moiety Z can include additional linkages. As seen in FIG. 1C, the structure can include a tetravalent core moiety Z 111 that is attached to four polymeric units 112 (P1, P2, P3, P4). The four linkages for the tetravalent core moiety can be arranged symmetrically or asymmetrically around the core. Non-limiting tetravalent core moieties can include benzenetetrayl (a tetravalent benzene group), aryltetrayl (a tetravalent aryl group), cycloalkyltetrayl (a tetravalent cycloalkyl group), heterocyclyltetrayl (a tetravalent heterocyclyl group), heteroaryltetrayl (a tetravalent heteroaryl group), or a tetravalent atom (e.g., a carbon atom or a silicon atom) having four linking moieties (e.g., any described herein, such as optionally substituted aliphatic, optionally substituted alkylene, optionally substituted aromatic, or optionally substituted arylene). In other embodiments, the core moiety can be a pentavalent core moiety.

Figure 1D:
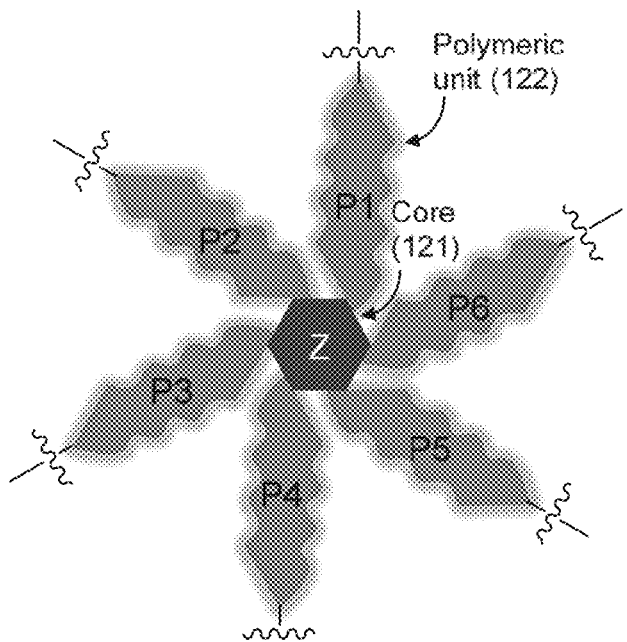

As seen in FIG. 1D, the structure can include a hexavalent core moiety Z 121 that is attached to six polymeric units 122 (P1, P2, P3, P4, P5, P6). The six linkages for the hexavalent core moiety can be arranged symmetrically or asymmetrically around the core. Non-limiting hexavalent core moieties can include benzenehexayl (a hexavalent benzene group), arylhexayl (a hexavalent aryl group), cycloalkylhexayl (a hexavalent cycloalkyl group), heterocyclylhexayl (a hexavalent heterocyclyl group), or heteroarylhexayl (a hexavalent heteroaryl group).

Figure 2A:
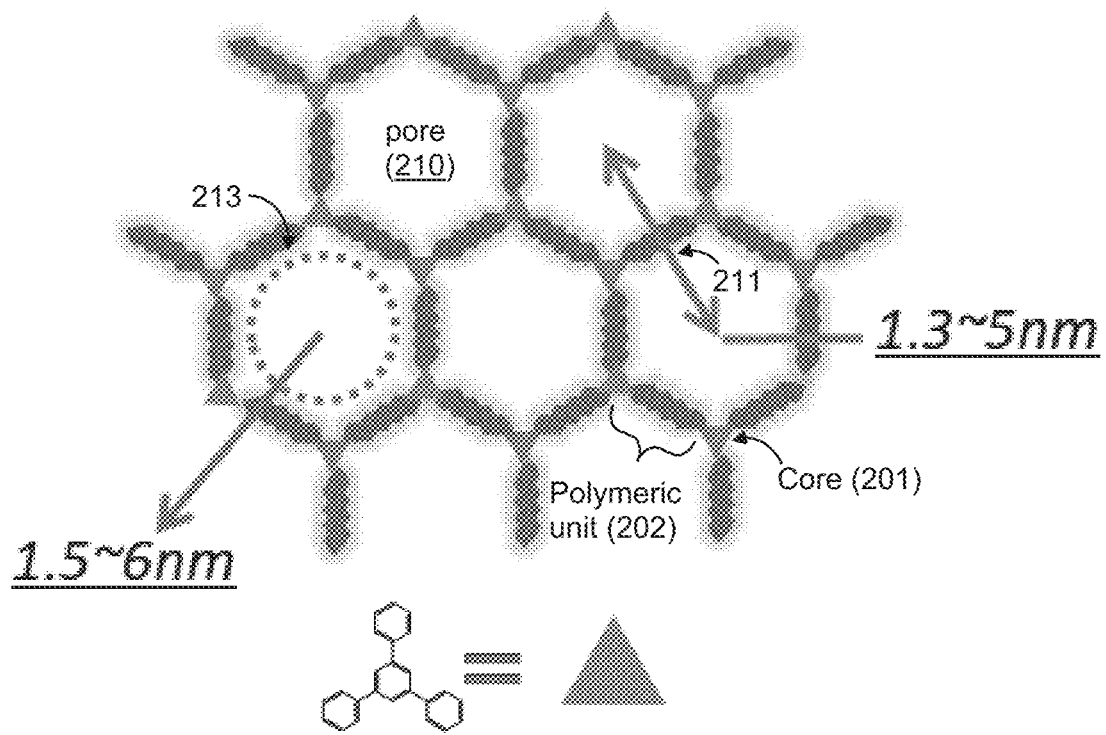
FIG. 2A-2B provides schematics of non-limiting polymer networks.
Figure 2B:
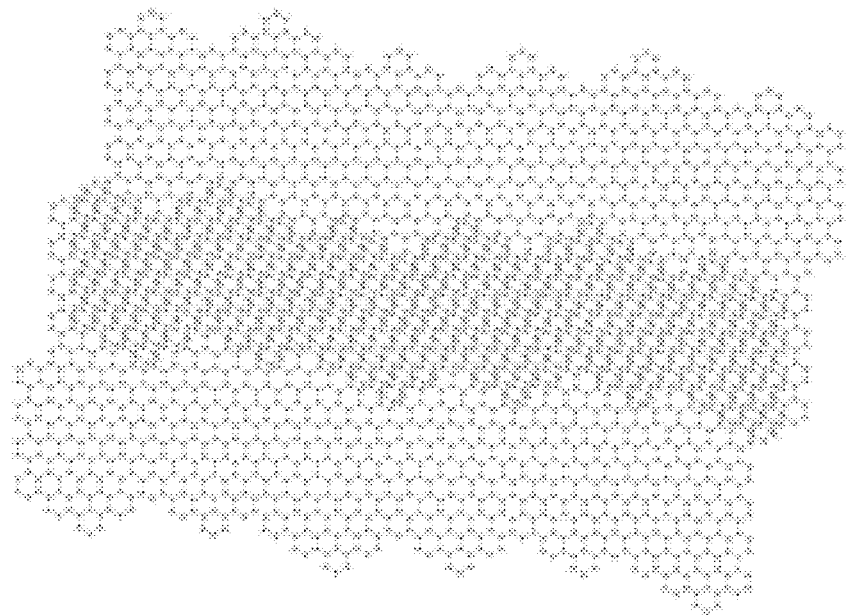

Such core moieties and polymeric units can form any useful polymeric superstructure. In particular embodiments, the structure can be a polymeric network, in which a core moiety can form nodes and polymeric units can extend between core moieties to connect such nodes. FIG. 2A shows a non-limiting network formed by using a trivalent core moiety 201 and extending polymeric units 202 between each core 201. In one embodiment, the core is 1,3,5-triphenylbenzene. As can be seen, the network can include a plurality of pores 201 having particular characteristics, such as inter-pore distance 211, pore circumference 213, pore diameter, etc. The choice of the core moiety and polymeric units can affect the geometry and characteristics of the pore. For instance, smaller pores with higher density within the material can be formed with higher valency core moieties and/or shorter polymeric units. As seen in FIG. 2B, such networks can form continuous networks or network layers.

Figure 3:
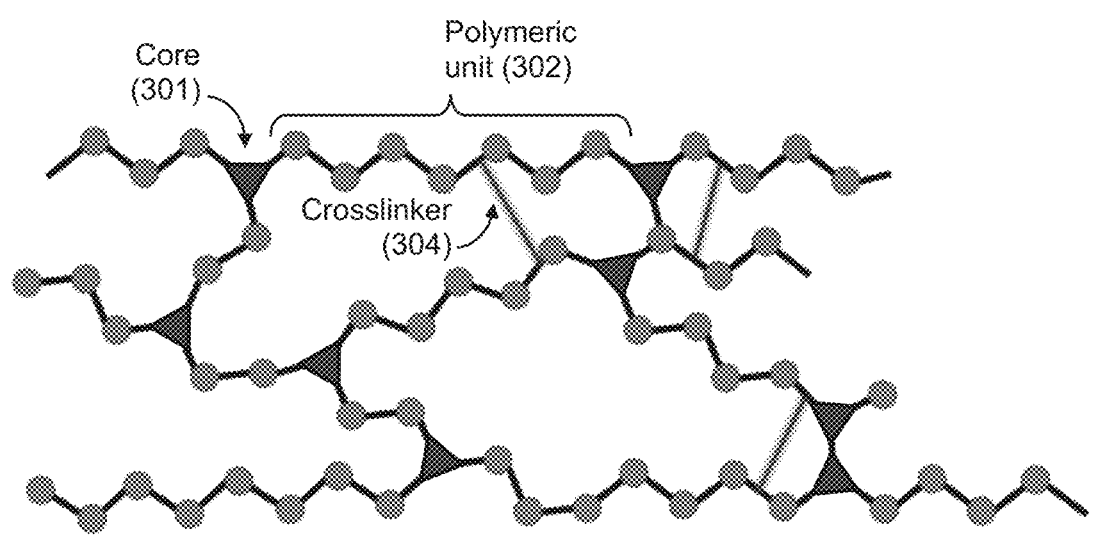
FIG. 3 provides a schematic of another non-limiting polymer network having crosslinkers.

Further crosslinking within the material, polymeric network, and/or network layers can be promoted by use of crosslinking reagents. For instance, the composition can include polymeric units, and a crosslinking reagent can be used to provide crosslinking between polymeric units. For instance, if the polymeric units (P1 and P2) include a leaving group, then a diamine crosslinking reagent (e.g., $H_2N$-Ak-$NH_2$) can be used to react with the polymeric units by displacing the leaving group and forming an amino-containing crosslinker within the composition (e.g., thereby forming P1-NH-Ak-NH—P2). As seen in FIG. 3, a crosslinked network can include a core 301 and extending polymeric units 302 between each core 301. As can be seen, a polymeric unit between each core can be the same (as in FIG. 2A) or be different (as in FIG. 3, in which polymeric units 302 can have a different number and type of monomeric units, circles). Between two polymeric units, a crosslinker 304 can be present to provide a further crosslinked network. Such crosslinkers can be introduced by forming a polymer composition and then exposing the composition to a crosslinking reagent to form crosslinker.

In some instances, the crosslinking reagent is a multivalent amine, such as diamine, triamine, tetraamine, pentaamine, etc. Non-limiting amine-containing crosslinking reagents can include:

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and each of $R^{N1}$ and $R^{N2}$ is, independently, H or optionally substituted alkyl. Yet further examples of amine-containing linkers include 1,6-diaminohexane (hexanediamine), 1,4-diaminobutane, 1,8-diaminooctane, propane-1,2,3-triamine, [1,1':3',1''-terphenyl]-4,4'',5'-triamine, and others.

Depending on the functional group present in the material, the crosslinking reagent can include a nucleophilic group (e.g., an amine or a hydroxyl) or an electrophilic group (e.g., a carbonyl). Thus, non-limiting crosslinking reagents can include amine-containing reagents, hydroxyl-containing reagents, carboxylic acid-containing reagents, acyl halide-containing reagents, or others. Further crosslinking reagents can include:

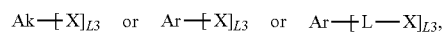

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and X is halo, hydroxyl, optionally substituted amino, hydroxyl, carboxyl, acyl halide (e.g., —C(O)—R, in which R is halo), carboxyaldehyde (e.g., —C(O)H), or optionally substituted alkyl. Non-limiting crosslinking reagents can include terephthalaldehyde, glutaraldehyde, ortho-xylene, para-xylene, or meta-xylene.

After reacting the crosslinking reagent, the composition can include one or more crosslinkers within the composition. If the crosslinking reagent is bivalent, then a crosslinker can be present between two of any combination of core moieties, polymeric units, and ionizable/ionic moieties (e.g., between two polymeric units, between two core moieties, between a core moiety and a polymeric unit, between two ionizable/ionic moieties, etc.). If the crosslinking reagent is trivalent or of higher n valency, then the crosslinker can be present between any n number of core moieties, polymeric units, ionizable moieties, and/or ionic moieties. Non-limiting crosslinkers present in the composition include those formed after reacting a crosslinking reagent. Thus, examples of crosslinkers can include:

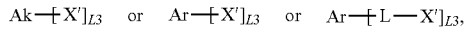

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and X' is a reacted form of X. In some embodiments, X' is absent, —O—, —NR$^{N1}$—, —C(O)—, or -Ak-, in which R$^{N1}$ is H or optionally substituted alkyl, and Ak is optionally substituted alkylene, optionally substituted heteroalkylene, optionally substituted aliphatic, or optionally substituted heteroaliphatic.

The selection of particular polymer components (e.g., core moieties, polymeric units, ionic moieties, crosslinkers, etc.) can provide useful chemical or physical properties for the composition. In one instance, polymer components can be selected to minimize water uptake, in which excessive water can result in flooding of an electrochemical cell. In another instance, polymer components can be selected to provide resistance to softening or plasticization. In other embodiments, the composition can be an ion-conducting polymer having greater than about 1 mS/cm specific conductivity for anions and/or cations.

Figure 4:
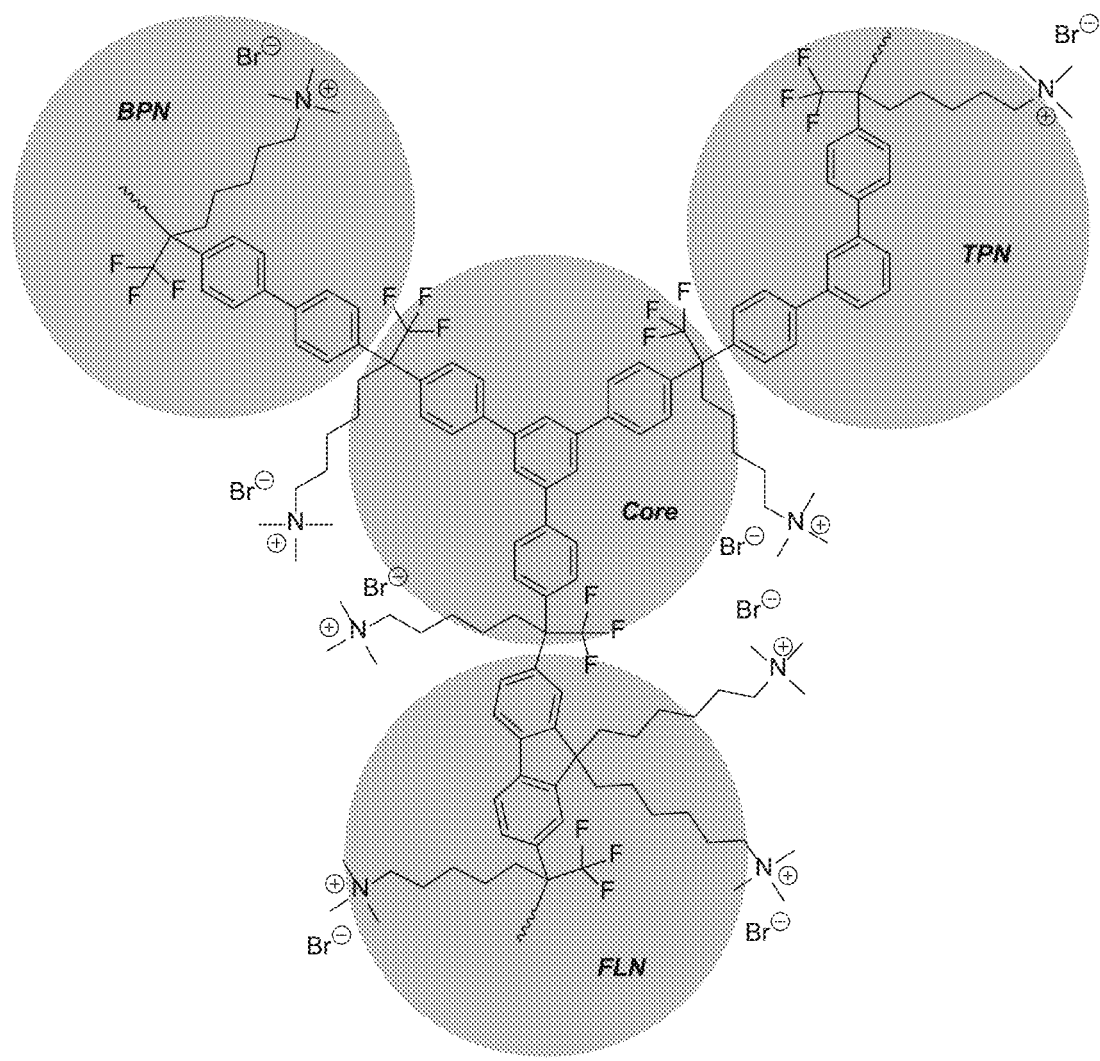
FIG. 4 provides a schematic of a non-limiting composition.

FIG. 4 provides a non-limiting structure with interpenetrating backbone and crosslink structures to manipulate the free volume change and interchain spacing, where the gas crossover and plasticization effects could be both reduced during $CO_2$ electrolysis. The polyaromatic backbone can be partially interpenetrated and crosslinked by grafting with the same types of alternatives with multiple active sites. The mobility of such polymer segments could be minimized and could result in a stable polymer matrix that allows for applications in different operating environments. The degree of interpenetrating and crosslinking can be optimized for ion exchange capacity (IEC), ionic conductivity, and water to ensure the performance of the electrochemical reaction. As one component in photoelectrochemical cells, polymer electrolyte membrane with strong mechanical stability and plasticization resistance are highly desirable in solar fuel production.

The compositions herein can include any useful combination of repeating monomeric units. In one instance, the composition can include -A-A-A- or -[A]-, in which A represent a monomeric unit and [A] represents a block including solely A monomeric units. A can be selected from those provided as a polymeric unit and/or a core moiety.

In another instance, the composition includes -[A]-[A-combination-B]—[B]—, in which A and B represents different monomeric units. [A] and [B] represent polymer blocks comprised solely of A monomeric units and solely B monomeric units, respectively. The [A-combination-B] block implies a block including some combination of A and B monomeric units. Each of A and B can be selected from those provided herein as a polymeric unit and/or a core moiety.

In another instance, the composition includes at least one alternating/periodic block, in which the different monomers have an ordered sequence, e.g., -[A-B-A-B- ... ]-, -[A-B-C-A-B-C- ... ]-, -[A-A-B-B-A-A-B-B- ... ]-, -[A-A-B-A-A-B- ... ]-, -[A-B-A-B-B-A-A-A-A-B-B- ... ]-, etc. A, B, and C represent different monomeric units. The square bracketed examples represent polymer blocks, wherein the monomer sequence is repeated throughout the block. Each of A, B, and C can be selected from those provided as a polymeric unit and/or a core moiety.

In yet another instance, the composition includes a particular unit that is covalently bonded between at least one pair of blocks, e.g., [A]-D-[B] or [A]-D-[B]—[C], in which D can be a monomeric unit or a linking moiety (e.g., any described herein). More than one D can be present, such as in [A]-D-D-[B] or [A]-D-D-D-[B], in which each C can be the same or different. [A] represents a block comprising solely A monomeric units; [B] represents a block comprising solely B monomeric units; [C] represents a block comprising solely C monomeric units; and D can represent individual monomer units (e.g., any described herein) or linking moieties (any described herein). Each of A, B, and C can be selected from those provided as a polymeric unit and/or a core moiety. D can be selected from those provided as a polymeric unit, a core moiety, or a linking moiety (e.g., L).

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein The compositions herein can be characterized by a first molecular weight (MW) of the polymeric unit P, a second MW of the core moiety Z, or a total MW of the composition. In one embodiment, the first MW, second MW, or total M is a weight-average molecular weight (Mw) of at least 10,000 g/mol, at least 20,000 g/mol, or at least 50,000 g/mol; or from about 5,000 to 2,500,000 g/mol, such as from 10,000 to 2,500,000 g/mol, from 50,000 to 2,500,000 g/mol, from 10,000 to 250,000 g/mol, from 20,000 to 250,000 g/mol, or from 20,000 to 200,000 g/mol. In another embodiment, the first MW, second MW, or total MW is a number average molecular weight (Mn) of at least 20,000 g/mol or at least 40,000 g/mol; or from about 2,000 to 2,500,000 g/mol, such as from 5,000 to 750,000 g/mol or from 10,000 to 400,000 g/mol.

The compositions herein can be characterized by a certain mole percentage (mol. %) of the core moiety Z as compared to the total amount of all other components within the composition. In one embodiment, the core moiety Z is present in an amount of about 0.01 mol. % to about 10 mol. % within the composition (e.g., from about 0.01 mol. % to 1 mol. %, 0.01 mol. % to 5 mol. %, 0.01 mol. % to 8 mol. %, 0.05 mol. % to 1 mol. %, 0.05 mol. % to 5 mol. %, 0.05 mol. % to 8 mol. %, 0.05 mol. % to 10 mol. %, 0.1 mol. % to 1 mol. %, 0.1 mol. % to 5 mol. %, 0.1 mol. % to 8 mol. %, or 0.1 mol. % to 10 mol. %). In another embodiment, the core moiety X is present in an amount of at least 0.01 mol. %, 0.02 mol. %, 0.03 mol. %, 0.04 mol. %, 0.05 mol. %, 0.06 mol. %, 0.07 mol. %, 0.08 mol. %, 0.09 mol. %, 0.1 mol. %, 0.2 mol. %, 0.3 mol. %, 0.4 mol. %, 0.5 mol. %, or more within the composition.

The compositions can include any useful number n, m, m1, m2, m3, or m4 of monomeric units. Non-limiting examples for each of n, m, m1, m2, m3, and m4 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

Core Moiety

The compositions herein can include a multivalent core moiety Z. In particular, the core moiety can include a p number of linkages, wherein p is an integer of 3 or more (e.g., 3, 4, 5, 6, 7, 8, or more). In use, the core moiety can provide a crosslinked polymer. In some instance, the core moiety can have one or more ionizable or ionic moieties. In other embodiments, the core moiety can include one or more optionally substituted aryl or optionally substituted arylene (e.g., optionally substituted phenylene or optionally substituted fluorenylene).

In some embodiments, the core moiety Z can include a structure of formula (IIa) or (IIb):

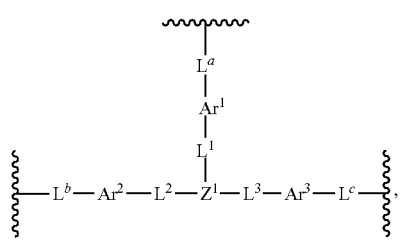

(IIa)

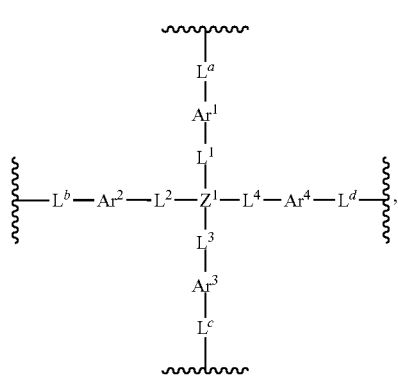

(IIb)

or a salt thereof, wherein:

Z$^1$ is a multivalent moiety;

each of Ar$^1$, Ar$^2$, Ar$^3$, and Ar$^4$ includes, independently, an optionally substituted aromatic or an optionally substituted arylene; and each of L$^1$, L$^2$, L$^3$, L$^4$, L$^a$, L$^b$, L$^c$, and L$^d$ is, independently, a covalent bond, —O—, —NR$^{N1}$—, —C(O)—, optionally substituted alkylene, or optionally substituted heteroalkylene.

In other embodiments, the core moiety Z can include a structure of formula:

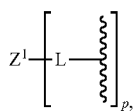

in which Z$^1$ is a multivalent moiety (e.g., any described herein), L is a linking moiety (e.g., any described herein, such as for L$^1$ in formula (IIa)), and p is an integer of 3 or more. In particular embodiments, each L is attached, independently, to a polymeric unit P (e.g., any described herein). In one non-limiting embodiment, each L is a covalent bond.

In yet other embodiments, the core moiety Z can include a structure of formula:

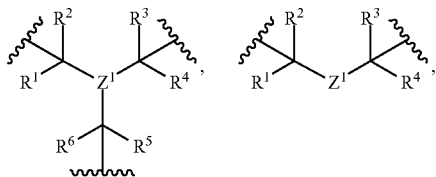

or a salt thereof, wherein:

Z$^1$ is a multivalent arylene moiety;

each of R$^1$, R$^3$, and R$^5$ is, independently, a haloalkyl, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene; and each of R$^2$, R$^4$, and R$^6$ includes, independently, an ionizable moiety or an ionic moiety, wherein Z$^1$ can optionally include an ionizable moiety or an ionic moiety.

In particular embodiments, the core moiety Z can include a structure of formula:

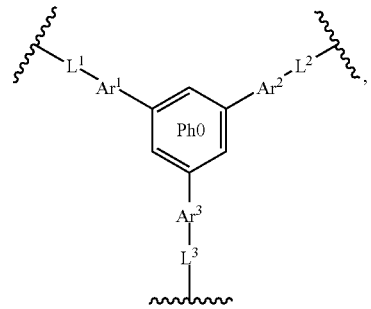

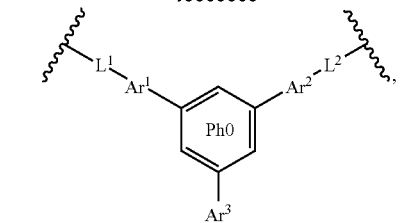

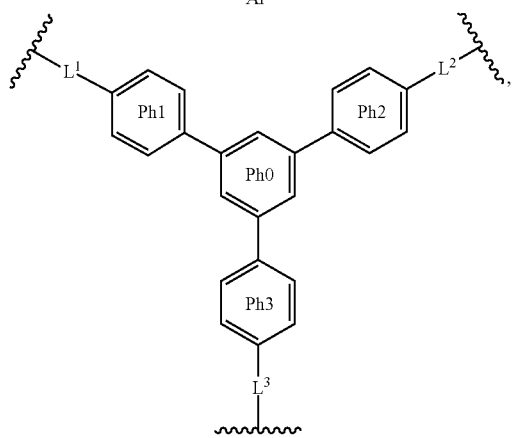

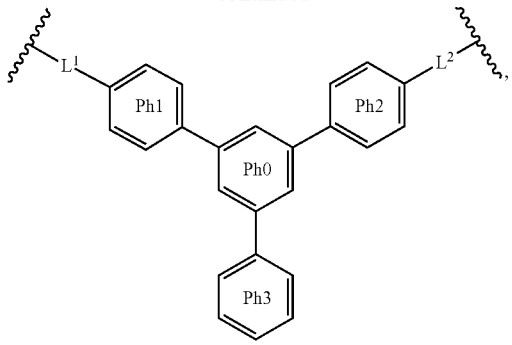

or a salt thereof, wherein:
 each of Ph0, Ph1, Ph2, and Ph3 is, independently, an optionally substituted phenylene;
 each of Ar$^1$, Ar$^2$, and Ar$^3$ comprises, independently, an optionally substituted arylene or an optionally substituted aryl; and
 each of L$^1$, L$^2$, and L$^3$ is, independently, a covalent bond, —O—, —NR$^{N1}$—, —C(O)—, optionally substituted alkylene, or optionally substituted heteroalkylene.

In some embodiments, each L$^1$, L$^2$, and L$^3$ can, independently, include an ionizable moiety or an ionic moiety The multivalent moiety Z$^1$ can be trivalent, tetravalent, pentavalent, hexavalent, or of higher valency. Non-limiting Z$^1$ can include benzene, adamantane, triazine, triphenylene, carbon atom, and silicon atom, which includes multivalent forms thereof. For instance, a multivalent form of benzene can include optionally substituted 1,3,5-benzenetriyl, 1,2,4-benzenetriyl, 1,2,4,5-benzenetetrayl, 1,2,3,5-benzenetetrayl, 1,2,3,4,5-benzenepentayl, 1,2,3,4,5,6-benzenehexayl, etc. In another instance, a multivalent form of adamantane can include optionally substituted 1,3,5-adamantanetriyl, 1,3,5,7-adamantanetetrayl, etc.

Arylene groups can be any described herein. In particular embodiments, the arylene is a bivalent linker, a trivalent linker, or other multivalent linker. Non-limiting arylene groups can include benzene, biphenyl, triphenyl, and fluorene, which include multivalent forms thereof. Further arylene groups are described herein. In other embodiments, arylene (e.g., each of Ar$^1$, Ar$^2$, Ar$^3$, and Ar$^4$) can be -L-Ar—, -L-Ar-L-, —Ar-L-, -L-Ar—Ar-L-, -L-Ar—Ar-Ar-L-, or —Ar-L-Ar—; wherein each Ar is, independently, an optionally substituted arylene (e.g., any arylene group described herein); and wherein each L is, independently, any linking moiety described herein. In yet other embodiments, Z$^1$, Ar$^1$, Ar$^2$, Ar$^3$, and Ar$^4$ can, independently, optionally include an ionizable moiety or an ionic moiety.

In one non-limiting embodiment, each of L$^1$, L$^2$, L$^3$, L$^4$, L$^a$, L$^b$, L$^c$, and L$^d$ is a covalent bond. In other embodiments, each of L$^1$, L$^2$, L$^3$, L$^4$, L$^a$, L$^b$, L$^c$, and L$^d$ can, independently, optionally comprise an ionizable moiety or an ionic moiety. In yet other embodiments, L$^a$, L$^b$, L$^c$, and L$^d$ can be an optionally substituted alkylene. Non-limiting substitutions for this alkylene can include an electron-withdrawing moiety (e.g., any described herein), optionally substituted alkyl, optionally substituted aryl, optionally substituted arylalkylene, an ionizable moiety, or an ionic moiety. In other embodiments, L$^a$, L$^b$, L$^c$, and L$^d$ can be —CR$^7$R$^8$—, in which each of R$^7$ and R$^8$ is, independently, an electron-withdrawing moiety, H, optionally substituted alkyl, optionally substituted heteroalkyl, optionally substituted aryl, or optionally substituted arylalkylene; and wherein R$^7$ and R$^8$ can optionally include an ionizable moiety or an ionic moiety.

Polymeric Unit

The compositions herein can include a polymeric unit, which is attached directly or indirectly (by way of a linking moiety) to the core moiety. The polymeric unit can be a homopolymer, a copolymer, a block copolymer, or other useful combinations of repeating monomeric units. In particular embodiments, the polymeric unit is any described herein in the Appendix of U.S. Provisional Patent Application No. 63/093,790, filed Oct. 20, 2020, which is incorporated herein by reference in its entirety. For any polymer unit or monomer unit herein, salts forms are also included.

Monomeric units can include an optionally substituted aliphatic group, an optionally substituted aromatic group, and combinations thereof. Non-limiting monomeric units can include optionally substituted arylene, optionally substituted aryleneoxy, optionally substituted alkylene, or combinations thereof, such as optionally substituted (aryl)(alkyl)ene (e.g., -Ak-Ar— or -Ak-Ar-Ak- or —Ar-Ak-, in which Ar is an optionally substituted arylene and Ak is an optionally substituted alkylene). Yet other monomeric units can include:

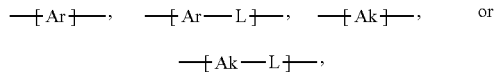

in which Ar is an optionally substituted arylene or optionally substituted aromatic; Ak is an optionally substituted alkylene, optionally substituted haloalkylene, optionally substituted heteroalkylene, optionally substituted aliphatic, or optionally substituted heteroaliphatic; and L is a linking moiety (e.g., any described herein) or can be —C(R$^7$)(R$^8$)— (e.g., in which examples of R$^7$ and R$^8$ groups are provided herein). One or more monomeric units can be optionally substituted with one or more ionizable or ionic moieties (e.g., as described herein). In particular examples, Ar, L, and/or Ak can be optionally substituted with one or more ionizable or ionic moieties and/or one or more electron-withdrawing groups.

One or more monomeric units can be combined to form a polymeric unit. Non-limiting polymeric units include any of the following:

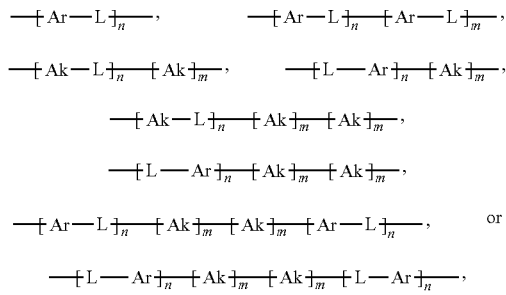

in which Ar is an optionally substituted arylene or an optionally substituted aromatic, Ak is an optionally substituted alkylene or optionally substituted aliphatic, L is a linking moiety (e.g., any described herein), each n is independently an integer of 1 or more, and each m is independently 0 or an integer of 1 or more. In particular embodiments, Ak can be optionally substituted heteroaliphatic, optionally substituted heteroalkylene, or optionally substituted haloalkylene.

In some embodiments of the polymeric unit, L is a covalent bond, —O—, —NR$^{N1}$—, —C(O)—, —SO$_2$—, optionally substituted alkylene (e.g., —CH$_2$— or —C(CH$_3$)$_2$—), optionally substituted alkyleneoxy, optionally substituted haloalkylene (e.g., —CF$_2$— or —C(CF$_3$)$_2$—), optionally substituted heteroalkylene, optionally substituted arylene, optionally substituted aryleneoxy, optionally substituted heterocyclyldiyl, —SO$_2$—NR$^{N1}$-Ak-, —(O-Ak)$_{L1}$-SO$_2$—NR$^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, as well as combinations thereof. In particular embodiments, Ak is an optionally substituted alkylene or optionally substituted haloalkylene; R$^{N1}$ is H or optionally substituted alkyl or optionally substituted aryl; Ar is an optionally substituted arylene; and L1 is an integer from 1 to 3.

Yet other non-limiting polymeric units can include a structure of any one or more of the following:

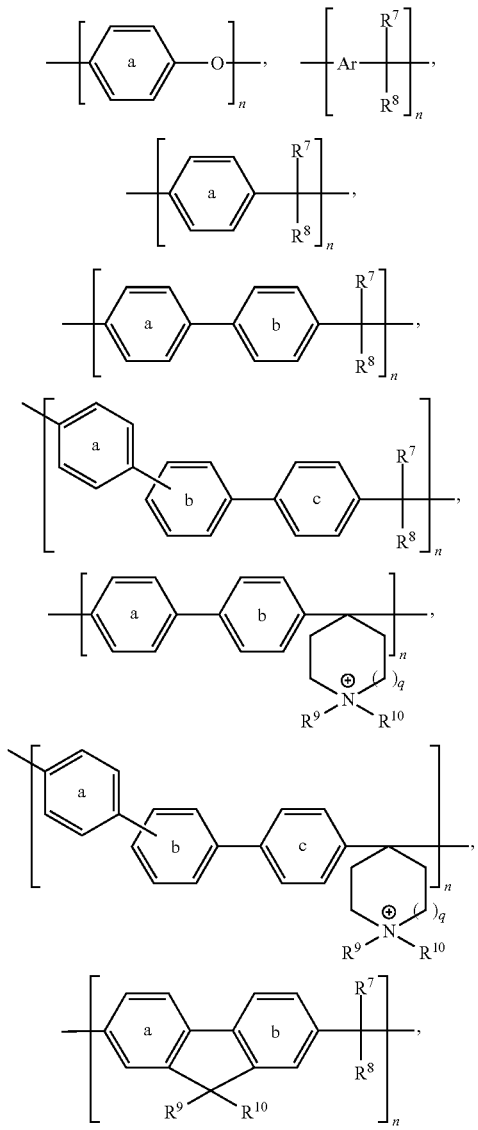

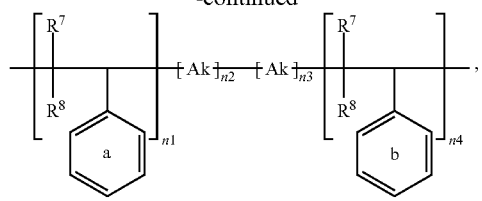

or a salt thereof, wherein:

each of R$^7$ and R$^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, optionally wherein at least one of R$^7$ or R$^8$ includes the electron-withdrawing moiety, or wherein R$^7$ and R$^8$ can be taken together to form an optionally substituted cyclic group;

each of R$^9$ and R$^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, optionally wherein at least one of R$^9$ or R$^{10}$ includes the electron-withdrawing moiety, or wherein R$^9$ and R$^{10}$ can be taken together to form an optionally substituted cyclic group;

each Ak is an optionally substituted alkylene;

each of n, n1, n2, n3, and n4 is, independently, an integer of 1 or more;

q is 0, 1, 2, or more; and each of ring a, ring b, and/or ring c can, independently, be optionally substituted (e.g., as described herein for aryl or alkyl).

In one embodiment, one or more of ring a, ring b, ring c, R$^7$, R$^8$, R$^9$, and R$^{10}$ can optionally include an ionizable moiety or an ionic moiety (e.g., any described herein).

Further substitutions for ring a, ring b, ring c, R$^7$, and R$^8$ can include one or more optionally substituted arylene, as well as any described herein for alkyl or aryl. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein.

Yet further non-limiting polymeric units can include a structure of any one or more of the following:

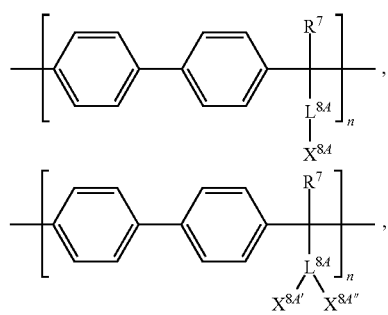

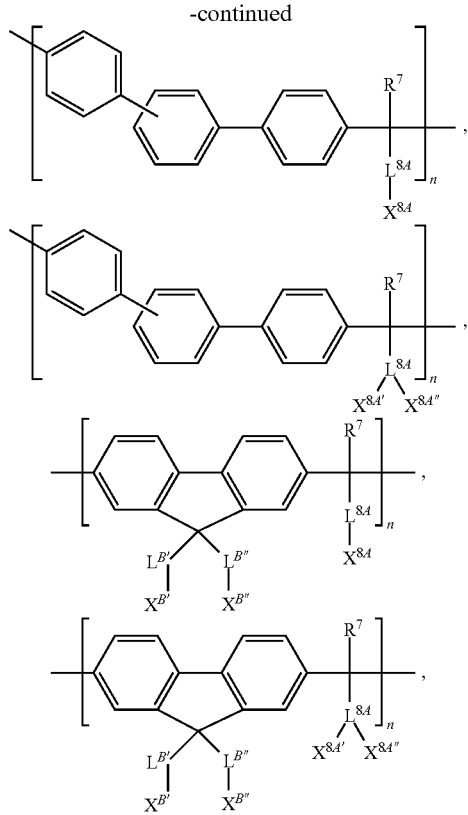

or a salt thereof, wherein:
n is from 1 or more;
each $L^{8A}$, $L^{B'}$, and $L^{B''}$ is, independently, a linking moiety; and
each $X^{8A}$, $X^{8A'}$, $X^{8A''}$, $X^{B'}$, and $X^{B''}$ is, independently, an acidic moiety or a basic moiety.

In some embodiments, ring a, ring b, ring c, Ak, $R^7$, $R^8$, $R^9$, and $R^{10}$ can optionally include an ionizable moiety or an ionic moiety. Further substitutions for ring a, ring b, ring c, $R^7$, $R^8$, $R^9$, and $R^{10}$ can include one or more optionally substituted arylene.

In any embodiment herein, the electron-withdrawing moiety can include or be an optionally substituted haloalkyl (e.g., $C_{1-6}$ haloalkyl, including halomethyl, perhalomethyl, haloethyl, perhaloethyl, and the like), cyano (CN), phosphate (e.g., —O(P=O)(OR$^{P1}$)(OR$^{P2}$) or —O—[P(=O)(OR$^{P1}$)—O]$_{P3}$—R$^{F2}$), sulfate (e.g., —O—S(=O)$_2$(OR$^{S1}$)), sulfonic acid (—SO$_3$H), sulfonyl (e.g., —SO$_2$—CF$_3$), difluoroboranyl (—BF$_2$), borono (B(OH)$_2$), thiocyanato (—SCN), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

In any embodiment herein, non-limiting haloalkyl groups include fluoroalkyl (e.g., —C$_x$F$_y$H$_z$), perfluoroalkyl (e.g., —C$_x$F$_y$), chloroalkyl (e.g., —C$_x$Cl$_y$H$_z$), perchloroalkyl (e.g., —C$_x$Cl$_y$), bromoalkyl (e.g., —C$_x$Br$_y$H$_z$), perbromoalkyl (e.g., —C$_x$Br$_y$), iodoalkyl (e.g., —C$_x$I$_y$H$_z$), or periodoalkyl (e.g., —C$_x$I$_y$). In some embodiments, x is from 1 to 6, y is from 1 to 13, and z is from 0 to 12. In particular embodiments, z=2x+1−y. In other embodiments, x is from 1 to 6, y is from 3 to 13, and z is 0 (e.g., and y=2x+1).

In particular embodiments, the polymeric unit includes more than one arylene groups. For instance, in a polymeric unit having this structure:

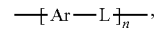

n can be greater than 1, and/or Ar can include two or more aromatic or arylene groups. The presence of such aromatic groups may be used to build linear chains within the composition. In other embodiments, L is an optionally substituted $C_{1-6}$ aliphatic, optionally substituted $C_{1-6}$ alkylene, optionally substituted $C_{1-6}$ heteroalkylene. The use of short linkers could provide more extensive polymeric networks, as shorter linkers could minimize self-cyclization reactions.

The polymeric unit can include one or more substitutions to a ring portion of the unit (e.g., as provided by an aromatic or arylene group) or to a linear portion (e.g., as provided by an aliphatic or alkylene group). Non-limiting substitutions can include lower unsubstituted alkyl (e.g., $C_{1-6}$ alkyl), lower substituted alkyl (e.g., optionally substituted $C_{1-6}$ alkyl), lower haloalkyl (e.g., $C_{1-6}$ haloalkyl), -halo (e.g., F, Cl, Br, or I), unsubstituted aryl (e.g., phenyl), halo-substituted aryl (e.g., 4-fluoro-phenyl), substituted aryl (e.g., substituted phenyl), and others.

In some embodiments of the polymeric unit, L is a covalent bond, —O—, —NR$^{N1}$—, —C(O)—, —SO$_2$—, optionally substituted alkylene (e.g., —CH$_2$— or —C(CH$_3$)$_2$—), optionally substituted alkyleneoxy, optionally substituted haloalkylene (e.g., —CF$_2$— or —C(CF$_3$)$_2$—), optionally substituted heteroalkylene, optionally substituted arylene, optionally substituted aryleneoxy, optionally substituted heterocyclyldiyl, —SO$_2$—NR$^{N1}$-Ak-, —(O-Ak)$_{L1}$-SO$_2$—NR$^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, as well as combinations thereof. In particular embodiments, Ak is an optionally substituted alkylene or optionally substituted haloalkylene; R$^{N1}$ is H or optionally substituted alkyl or optionally substituted aryl; Ar is an optionally substituted arylene; and L1 is an integer from 1 to 3.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties including cationic, anionic, and multi-ionic group, as described herein.

Yet other polymeric units can include poly(benzimidazole) (PBI), polyphenylene (PP), polyimide (PI), poly(ethyleneimine) (PEI), sulfonated polyimide (SPI), polysulfone (PSF), sulfonated polysulfone (SPSF), poly(ether ketone) (PEEK), PEEK with cardo groups (PEEK-WC), polyethersulfone (PES), sulfonated polyethersulfone (SPES), sulfonated poly(ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly(epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly (phosphazene), poly(aryloxyphosphazene), polyetherimide, as well as combinations thereof.

Yet other polymeric units are described in the Appendix of U.S. Provisional Patent Application No. 63/093,790, filed Oct. 20, 2020 (e.g., as a first structure, a second structure, a further polymeric unit, a crosslinker, an ionizable moiety, an ionic moiety, an arylene group, a linking moiety, as well as other structures or combinations of structures), which is incorporated herein by reference in its entirety. Non-limiting polymeric units can include a structure is selected from the group of:

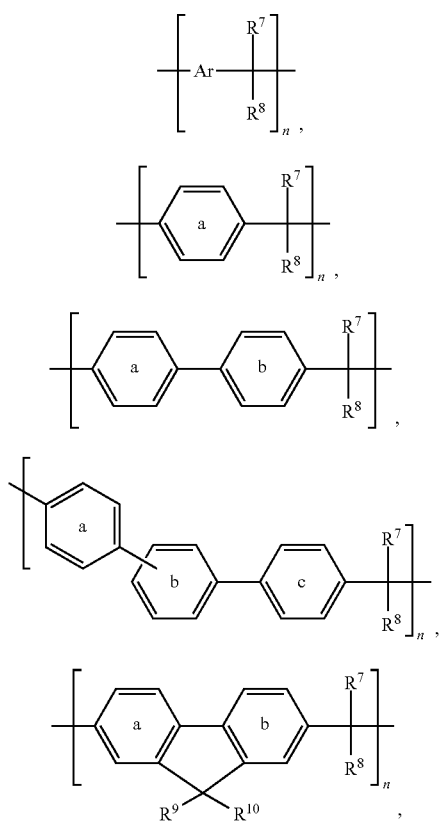

or a salt thereof, wherein:

each of $R^7$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^7$ or $R^8$ comprises the electron-withdrawing moiety or wherein $R^7$ and $R^8$ can be taken together to form an optionally substituted cyclic group;

each of $R^9$ and $R^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^9$ and $R^{10}$ can be taken together to form an optionally substituted cyclic group;

Ar comprises or is an optionally substituted arylene;

n is an integer of 1 or more;

each of ring a, ring b, and/or ring c can be optionally substituted; and wherein one or more of rings a-c, $R^7$, $R^8$, $R^9$, and $R^{10}$ can optionally comprise an ionizable moiety or an ionic moiety.

Further substitutions for ring a, ring b, ring c, $R^7$, and $R^8$ can include one or more optionally substituted arylene, as well as any described herein for alkyl or aryl. In particular embodiments, each of $R^9$ and $R^{10}$ includes, independently, an ionizable/ionic moiety.

In yet other embodiments (e.g., for any structure herein, such as in formulas (I)-(V)), $R^7$ and $R^8$ are taken together to form an optionally substituted cyclic group. For instance, $R^7$ and $R^8$ can be taken together to form an optionally substituted spirocyclyl group, as defined herein. In particular embodiments, the spirocyclyl group is substituted, independently, with one or more ionizable moieties or ionic moieties (e.g., any described herein). In some embodiments, the formulas of (I)-(V) can be represented as follows:

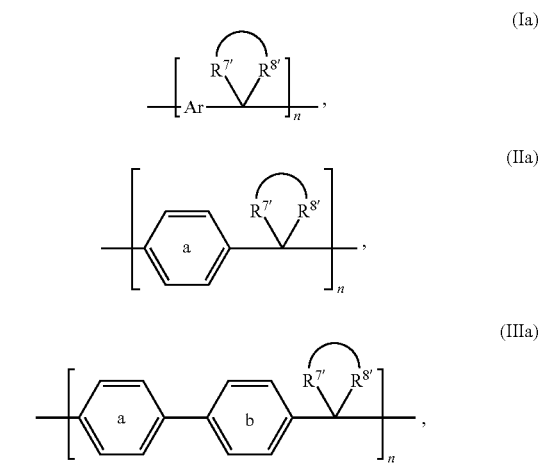

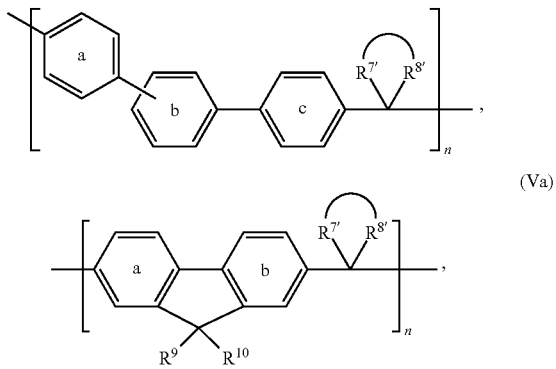

(IVa)

(Va)

or a salt thereof, wherein $R^7$ and $R^8$ are taken together to form an optionally substituted alkylene group or an optionally substituted heteroalkylene group. In particular embodiments, the optionally substituted alkylene group or the optionally substituted heteroalkylene group is substituted, independently, with one or more ionizable moieties or ionic moieties.

The polymeric unit formed by using one or more (e.g., n or m number) of the following monomeric units:

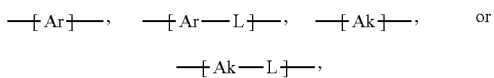

in which Ar is an optionally substituted arylene or optionally substituted aromatic; Ak is an optionally substituted alkylene, optionally substituted haloalkylene, optionally substituted aliphatic, optionally substituted heteroalkylene, or optionally substituted heteroaliphatic; L is a linking moiety (e.g., any described herein); and Ar, L, or Ak can be optionally substituted with one or more ionizable or ionic moieties. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein.

Any portion of the polymeric unit may optionally include an ionizable moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety. Non-limiting examples of $X^A$ include amino, ammonium cation, heterocyclic cation, piperidinium cation, azepanium cation, phosphonium cation, phosphazenium cation, or others herein.

The polymeric unit can include a cyclic cation group. For instance, the polymeric unit can include a structure selected from the following:

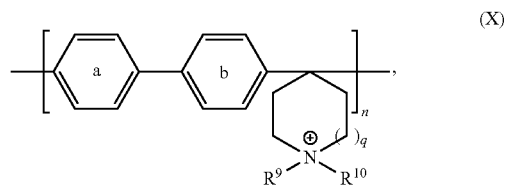

(X)

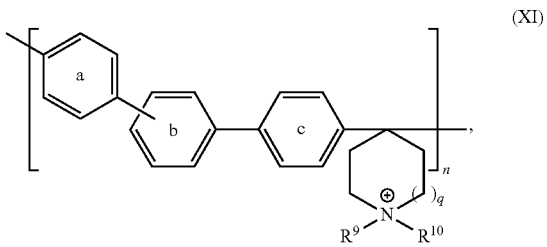

(XI)

or a salt thereof, wherein:
  each of $R^9$ and $R^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^9$ and $R^{10}$ can be taken together to form an optionally substituted cyclic group;

n is an integer of 1 or more;

q is 0, 1, 2, or more;

each of ring a, ring b, and/or ring c can be optionally substituted; and wherein one or more of rings a-c, $R^9$, and $R^{10}$ can optionally include an ionizable moiety or an ionic moiety.

In other embodiments (e.g., for any structure herein, such as in formulas (X)-(XI)), $R^9$ and $R^{10}$ are taken together to form an optionally substituted cyclic group. For instance, $R^9$ and $R^{10}$ can be taken together to form an optionally substituted spirocyclyl group, as defined herein. In particular embodiments, the spirocyclyl group is substituted, independently, with one or more ionizable moieties or ionic moieties (e.g., any described herein). In some embodiments, the formulas of (X)-(XI) can be represented as follows:

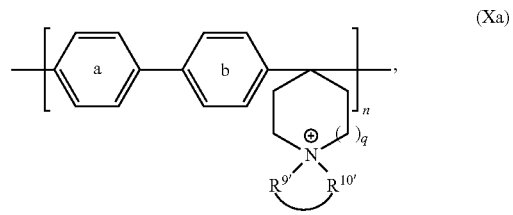

(Xa)

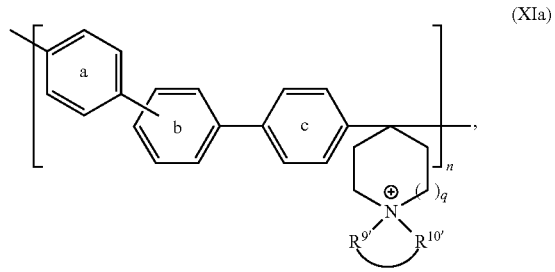

(XIa)

or a salt thereof, wherein $R^{9'}$ and $R^{10'}$ are taken together to form an optionally substituted alkylene group or an optionally substituted heteroalkylene group. In particular embodiments, the optionally substituted alkylene group or the optionally substituted heteroalkylene group is substituted, independently, with one or more ionizable moieties or ionic moieties. In other embodiments, the optionally substituted alkylene group or the optionally substituted heteroalkylene group is substituted, independently, with one or more aliphatic groups or alkyl groups. Without wishing to be limited be mechanism, substitution of the alkylene or heteroalkylene groups to provide a bulky substituents may shield the cationic nitrogen moiety from being degraded.

The polymeric unit can include a combination of soft and hard segments. For instance, the polymeric unit can include a structure as follows:

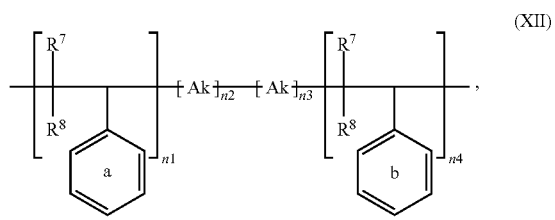

(XII)

or a salt thereof, wherein:
each of R[7] and R[8] is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of R[7] or R[8] comprises the electron-withdrawing moiety;
each Ak is an optionally substituted alkylene;
each of n1, n2, n3, and n4 is, independently, an integer of 1 or more;
each of ring a or ring b can be optionally substituted; and
wherein one or more of rings a-b, R[7], and R[8] can optionally comprise an ionizable moiety or an ionic moiety.

The polymeric unit can include a polyphenylene. For instance, the polymeric unit can include a structure as follows:

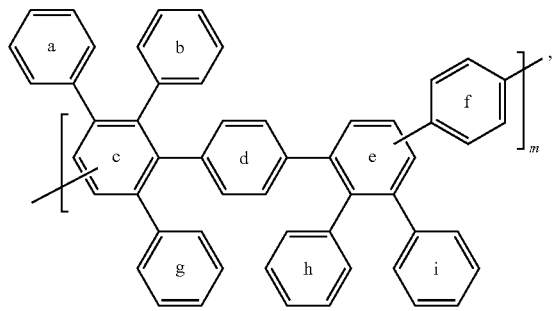
(XIII)

or a salt thereof, wherein:
m is an integer of 1 or more; and
each of rings a-i can be optionally substituted and/or can optionally include an ionizable moiety or an ionic moiety.

In particular embodiments, the ionizable/ionic moiety is present on one or more of rings a, b, f g, h, or i. In some embodiments, the ionic moiety includes or is -L[A]-X[A], in which L[A] is a linking moiety (e.g., optionally substituted aliphatic, alkylene, heteroaliphatic, or heteroalkylene); and X[A] is an acidic moiety, a basic moiety, a multi-ionic moiety, a cationic moiety, or an anionic moiety (e.g., include amino, ammonium cation, heterocyclic cation, or others herein).

The polymeric unit can include a polybenzimidazole that is optionally combined with other arylene-containing monomeric units. In one instance, the polymeric unit can include a structure selected from the following:

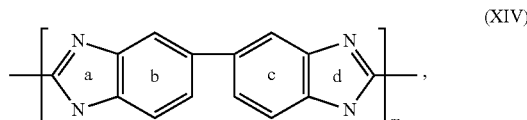
(XIV)

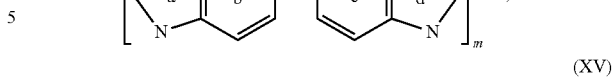
(XV)

or a salt thereof, wherein:
each L is, independently, a linking moiety;
m is an integer of 1 or more; and
each of rings a-f can be optionally substituted and/or can optionally include an ionizable moiety or an ionic moiety.

In particular embodiments, each of the nitrogen atoms on rings a and/or b are substituted with optionally substituted aliphatic, optionally substituted alkyl, optionally substituted aromatic, optionally substituted aryl, an ionizable moiety, or an ionic moiety. In other embodiments, one nitrogen atom in each of rings a and/or b is substituted with optionally substituted aliphatic, optionally substituted alkyl, optionally substituted aromatic, optionally substituted aryl, an ionizable moiety, or an ionic moiety. In particular embodiments, the ionic moiety includes or is -L[A]-X[A], in which L[A] is a linking moiety (e.g., optionally substituted aliphatic, alkylene, or heteroaliphatic, such as $C_{1-12}$, $C_{3-12}$, $C_{4-12}$, or $C_{6-12}$ forms thereof); and X[A] is an acidic moiety, a basic moiety, a multi-ionic moiety, a cationic moiety, or an anionic moiety (e.g., amino, ammonium cation, heterocyclic cation, or others herein).

In yet other embodiments, the linking moiety (e.g., L) is a covalent bond, —O—, —SO$_2$—, —C(O)—, optionally substituted aliphatic, optionally substituted alkylene (e.g., —CR$_2$—, in which R is H, alkyl, or haloalkyl), optionally substituted haloalkylene, or any other linking moiety described herein.

Other polymeric units include those having a plurality of arylene groups. In some embodiments, the polymeric unit can include a structure selected from the following:

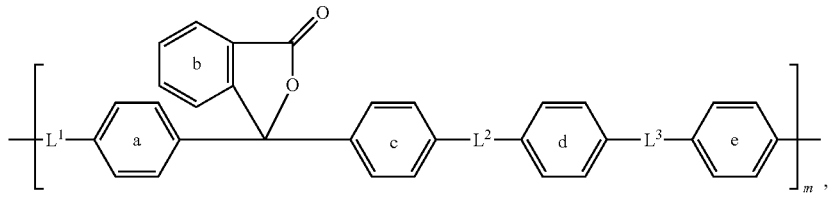

(XVI)

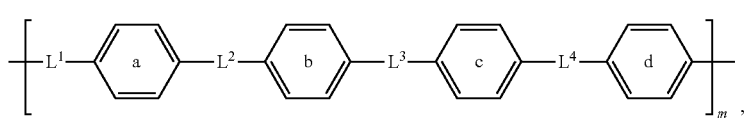

(XVII)

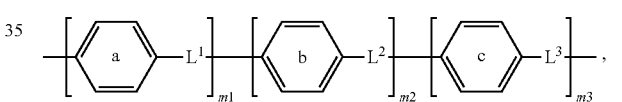

(XVIII)

or a salt thereof, wherein:
- each of $L^1$, $L^2$, $L^3$, and $L^4$ is, independently, a linking moiety;
- m is an integer of 1 or more; and
- each of rings a-e can be optionally substituted and/or can optionally include an ionizable moiety or an ionic moiety.

In particular embodiments, at least one of rings a-e is substituted with optionally substituted aliphatic, optionally substituted alkyl, optionally substituted aromatic, optionally substituted aryl, an ionizable moiety, or an ionic moiety. In some embodiments, at least ring a is substituted an ionizable moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, or heteroalkylene, such as $C_{1-12}$, $C_{1-6}$, $C_{4-12}$, or $C_{6-12}$ forms thereof); and $X^A$ is an acidic moiety, a basic moiety, a multi-ionic moiety, a cationic moiety, or an anionic moiety (e.g., amino, ammonium cation, heterocyclic cation, or others herein).

In some embodiments, the linking moiety (e.g., $L^1$, $L^2$, $L^3$, or $L^4$) is a covalent bond, —O—, —$SO_2$—, —C(O)—, optionally substituted aliphatic, optionally substituted alkylene (e.g., —$CR_2$—, in which R is H, alkyl, or haloalkyl), optionally substituted haloalkylene, optionally substituted alkyleneoxy, optionally substituted heteroaliphatic, optionally substituted heteroalkylene, or any other linking moiety described herein.

Segments of arylene-containing groups can also be employed. For instance, the polymeric unit can include a structure as follows:

or a salt thereof, wherein:
- each of $L^1$, $L^2$, and $L^3$ is, independently, a linking moiety;
- each of m1, m2, and m3 is, independently, an integer of 1 or more; and
- each of rings a-c can be optionally substituted and/or can optionally include an ionizable moiety or an ionic moiety.

In particular embodiments, at least one of rings a-c is substituted with halo, optionally substituted aliphatic, optionally substituted alkyl, optionally substituted aromatic, optionally substituted aryl, an ionizable moiety, or an ionic moiety. In some embodiments, at least one of rings a-c is substituted with both halo and optionally substituted alkyl. In other embodiments, at least one of rings a-c is substituted with both optionally substituted alkyl and an ionizable/ionic moiety. In particular embodiments, the ionic moiety includes or is -$L^A$-$X^A$, in which $L^A$ is a linking moiety (e.g., optionally substituted aliphatic, alkylene, heteroaliphatic, or heteroalkylene, such as $C_{1-12}$, $C_{1-6}$, $C_{4-12}$, or $C_{6-12}$ forms thereof); and $X^A$ is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., $L^1$, $L^2$, or $L^3$) is a covalent bond, —O—, —$SO_2$—, —C(O)—, optionally substituted alkylene (e.g., —$CR_2$—, in which R is H, alkyl, or haloalkyl), or any other linking moiety described herein. In yet other embodiments, each linking moiety (e.g., $L^1$, $L^2$, and $L^3$) is —O—.

The polymeric unit can include halogenated polymeric units. In some embodiments, the polymeric unit can include a structure as follows:

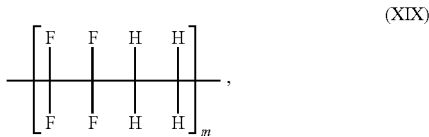
(XIX)

wherein m is an integer of 1 or more. In some embodiments, one or more hydrogen or fluorine atoms can be substituted to include an ionizable moiety or an ionic moiety. In particular embodiments, the ionic moiety includes or is -$L^A$-$X^A$ or -$L^A$-CH(-$L^{A'}$-$X^A$)—, in which each of $L^A$ and $L^{A'}$ is, independently, a linking moiety (e.g., optionally substituted aliphatic, alkylene, heteroaliphatic, heteroalkylene, aromatic, arylene, or —Ar-L-, in which Ar is an optionally substituted arylene and Ak is an optionally substituted alkylene); and $X^A$ is an acidic moiety, a basic moiety, a multi-ionic moiety, a cationic moiety, or an anionic moiety (e.g., amino, ammonium cation, heterocyclic cation, or others herein).

In other embodiments, the polymeric unit is selected from the following:

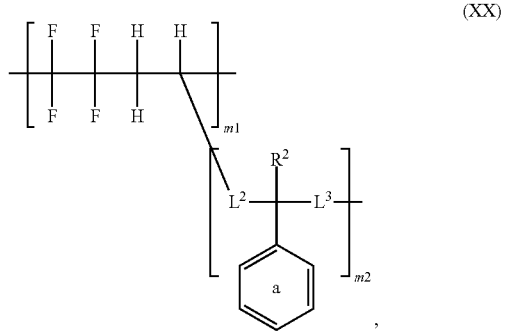
(XX)

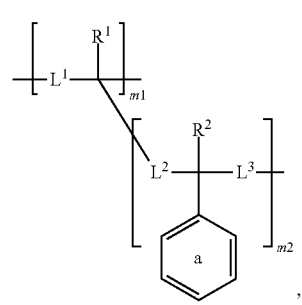
(XXI)

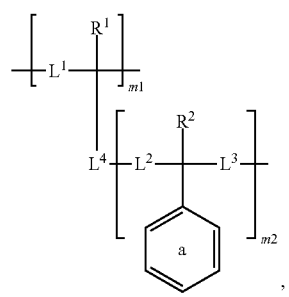
(XXII)

or a salt thereof, wherein:
each of $R^1$ and $R^2$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
each of $L^1$, $L^2$, $L^3$, and $L^4$ is, independently, a linking moiety;
each of m1 and m2 is, independently, an integer of 1 or more; and
ring a can be optionally substituted and/or can optionally comprise an ionizable moiety or an ionic moiety.

In particular embodiments, ring a is substituted with halo, optionally substituted aliphatic, optionally substituted alkyl, optionally substituted aromatic, optionally substituted aryl, an ionizable moiety, or an ionic moiety. In some embodiments, at least one of ring a is substituted with both optionally substituted alkyl and an ionizable/ionic moiety. In particular embodiments, the ionic moiety includes or is -$L^A$-$X^A$, in which $L^A$ is a linking moiety (e.g., optionally substituted aliphatic, alkylene, heteroaliphatic, or heteroalkylene); and $X^A$ is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., $L^1$, $L^2$, $L^3$, or $L^4$) is a covalent bond, —O—, —$SO_2$—, —C(O)—, optionally substituted alkylene (e.g., —$CR_2$—, in which R is H, alkyl, or haloalkyl), optionally substituted haloalkylene, or any other linking moiety described herein. In particular embodiments, $R^2$ is H; and each of $L^2$ and $L^3$ is, independently, a covalent bond, optionally substituted alkylene, or optionally substituted alkyleneoxy. $L^1$ can be an optionally substituted alkylene or optionally substituted haloalkylene. $L^4$, if present, can be a covalent bond, —O—, optionally substituted alkylene, or optionally substituted alkyleneoxy.

The polymeric unit can include epoxy-derived or vinyl alcohol-derived polymeric units. In some embodiments, the polymeric unit can include a structure selected from the following:

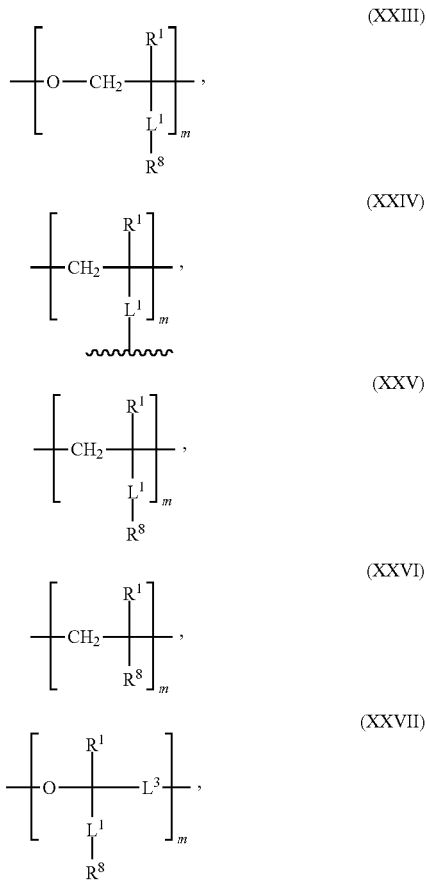

(XXIII)

(XXIV)

(XXV)

(XXVI)

(XXVII)

or a salt thereof, wherein:
- each of $R^1$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
- each of $L^1$, $L^2$, and $L^3$ is, independently, a linking moiety; and
- each of m is, independently, an integer of 1 or more;
- wherein $R^8$ can optionally comprise an ionizable moiety or an ionic moiety.

In particular embodiments, $R^8$ and/or the ionic moiety includes or is -$L^A$-$X^A$, in which each of $L^A$ and $L^{A'}$ is, independently, a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety (e.g., amino, ammonium cation, heterocyclic cation, or others herein).

In some embodiments, $R^1$ is H; and $L^1$ includes a covalent bond, —O—, —C(O)—, optionally substituted alkylene, or optionally substituted heteroalkylene. In some embodiments, $R^8$ includes an ionizable moiety or an ionic moiety. In other embodiments, each of $L^2$ and $L^3$ is, independently, a covalent bond, —O—, optionally substituted alkylene, or optionally substituted heteroalkylene.

In some embodiments, the polymeric unit as follows:

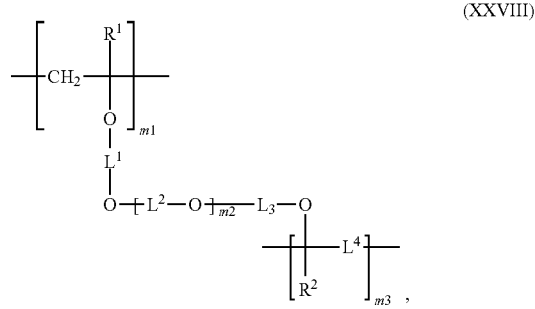

(XXVIII)

or a salt thereof, wherein:
- each of $R^1$ and $R^2$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
- each of $L^1$, $L^2$, $L^3$, and $L^4$ is, independently, a linking moiety; and
- each of m1, m2, and m3 is, independently, an integer of 1 or more.

In particular embodiments, the oxygen atoms present in the polymeric unit can be associated with an alkali dopant (e.g., $K^+$). In other embodiments, the linking moiety (e.g., $L^1$, $L^2$, $L^3$, or $L^4$) is optionally substituted alkylene (e.g., —$CR_2$—, in which R is H, alkyl, or haloalkyl), optionally substituted hydroxyalkylene, or any other linking moiety described herein.

The polymeric unit can include phosphazene-based polymers. In some embodiments, the polymeric unit can include a structure as follows:

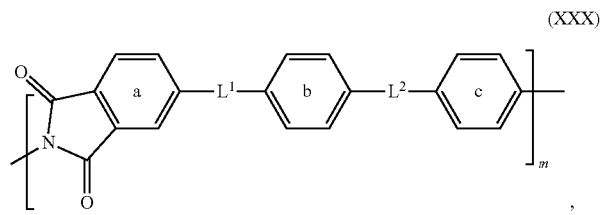

(XXX)

or a salt thereof, wherein:

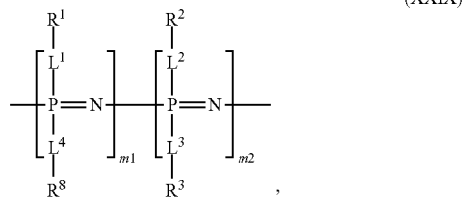

(XXIX)

or a salt thereof, wherein:
- each of $R^1$, $R^2$, $R^3$, and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene;
- each of $L^1$, $L^2$, $L^3$, and $L^4$ is, independently, a linking moiety; and
- each of m1 and m2 is, independently, an integer of 1 or more;
- wherein $R^8$ can optionally comprise an ionizable moiety or an ionic moiety.

In particular embodiments, $R^8$ and/or the ionic moiety includes or is -$L^A$-$X^A$, in which $L^A$ is a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety (e.g., heterocyclic cation, phosphonium cation, phosphazenium cation, or others herein).

In some embodiments, each of $R^1$, $R^2$, and $R^3$ is optionally substituted aromatic, optionally substituted aryl, optionally substituted aryloxy, or optionally substituted arylalkylene. In other embodiments, the linking moiety (e.g., $L^1$, $L^2$, $L^3$, or $L^4$) is a covalent bond, —O—, —$SO_2$—, —C(O)—, optionally substituted alkylene (e.g., —$CR_2$—, in which R is H, alkyl, or haloalkyl), optionally substituted haloalkylene, or any other linking moiety described herein.

The polymeric unit can include polyimide-based polymers. In some embodiments, the polymeric unit can include a structure selected from the following:

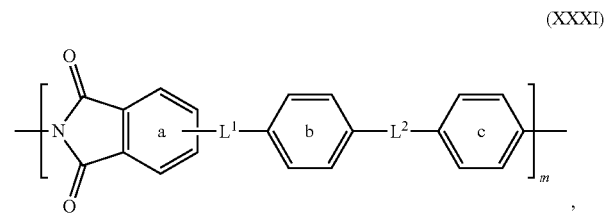

(XXXI)

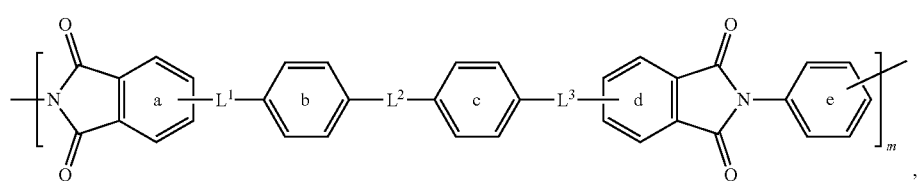

(XXXII)

and a salt thereof, wherein:
- each of $L^1$, $L^2$, and $L^3$ is, independently, a linking moiety;
- m is an integer of 1 or more; and
- each of rings a-e can be optionally substituted and/or can optionally include an ionizable moiety or an ionic moiety.

In particular embodiments, at least one of rings a-e is substituted with optionally substituted aliphatic, optionally substituted alkyl, optionally substituted aromatic, optionally substituted aryl, an ionizable moiety, or an ionic moiety. In some embodiments, at least ring b or c is substituted an ionizable moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, or heteroalkylene, such as $C_{1-12}$, $C_{1-6}$, $C_{4-12}$, or $C_{6-12}$ forms thereof); and $X^A$ is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., $L^1$, $L^2$, or $L^3$) is a covalent bond, —O—, —$SO_2$—, —C(O)—, optionally substituted aliphatic, optionally substituted alkylene (e.g., —$CR_2$—, in which R is H, alkyl, or haloalkyl), optionally substituted haloalkylene, optionally substituted alkyleneoxy, optionally substituted heteroaliphatic, optionally substituted heteroalkylene, or any other linking moiety described herein.

The polymeric unit can include polyether. Non-limiting polymeric units can include a structure as follows:

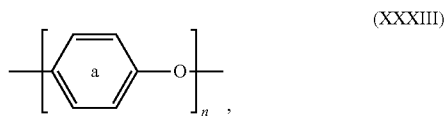

(XXXIII)

wherein:
n is an integer of 1 or more; and
ring a can be optionally substituted and/or can optionally include an ionizable moiety or an ionic moiety. Non-limiting substituents for ring a include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

The polymeric unit can be aromatic. Non-limiting polymeric units can include a structure as follows:

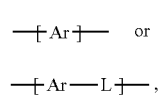

(XXXIV)

(XXXV)

in which Ar is an optionally substituted arylene or optionally substituted aromatic; Ak is an optionally substituted alkylene, optionally substituted haloalkylene, optionally substituted aliphatic, optionally substituted heteroalkylene, or optionally substituted heteroaliphatic; L is a linking moiety (e.g., any described herein); and Ar, L, or Ak can be optionally substituted with one or more ionizable or ionic moieties. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein. Non-limiting substituents for Ar include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

For any polymeric unit described herein, each of m, m1, m2, and m3 is, independently, an integer of 1 or more. In any embodiment herein (e.g., for a polymeric unit), the linking moiety (e.g., L, $L^1$, $L^2$, $L^3$, and $L^4$) is or comprises a covalent bond, —O—, —$SO_2$—, —$NR^{N1}$—, —C(O)—, optionally substituted aliphatic, optionally substituted alkylene (e.g., —$CR_2$—, in which R is H, alkyl, or haloalkyl), optionally substituted haloalkylene, optionally substituted hydroxyalkylene, optionally substituted alkyleneoxy, optionally substituted heteroaliphatic, optionally substituted heteroalkylene, optionally substituted aromatic, optionally substituted arylene, optionally substituted aryleneoxy, optionally substituted heterocycle, or optionally substituted heterocyclyldiyl.

For any polymeric unit described herein, $R^7$ includes an optionally substituted aliphatic group. In one embodiment, $R^7$ includes an optionally alkyl group.

For any polymeric unit described herein, the electron-withdrawing moiety (e.g., for $R^7$) is a haloalkyl group. For any polymeric unit described herein, one or more haloalkyl groups may be present (e.g., attached to the backbone group, an aryl group, or another portion of the structure). Non-limiting haloalkyl groups include fluoroalkyl (e.g., —$C_xF_yH_z$), perfluoroalkyl (e.g., —$C_xF_y$), chloroalkyl (e.g., —$C_xCl_yH_z$), perchloroalkyl (e.g., —$C_xCl_y$), bromoalkyl (e.g., —$C_xBr_yH_z$), perbromoalkyl (e.g., —$C_xBr_y$), iodoalkyl (e.g., —$C_xI_yH_z$), or periodoalkyl (e.g., —$C_xI_y$). In some embodiments, x is from 1 to 6, y is from 1 to 13, and z is from 0 to 12. In particular embodiments, z=2x+1−y. In other embodiments, x is from 1 to 6, y is from 3 to 13, and z is 0 (e.g., and y=2x+1).

For any polymeric unit described herein, $R^8$ includes an optionally substituted aliphatic group or an optionally substituted heteroaliphatic group. In particular embodiments, the aliphatic or heteroaliphatic group is substituted with an oxo group (=O) or an hydroxyimino group (=N—OH). In one embodiment, $R^8$ is —C(=X)—$R^{8'}$, in which X is O or N—OH; and $R^{8'}$ is optionally substituted aliphatic, optionally substituted alkyl, optionally substituted heteroaliphatic, optionally substituted heteroalkyl, optionally substituted alkoxy, optionally substituted haloalkyl, or optionally substituted alkanoyl.

For any polymeric unit described herein, $R^7$ and $R^8$ are taken together to form an optionally substituted cyclic group. For instance, $R^7$ and $R^8$ can be taken together to form an optionally substituted spirocyclyl group, as defined herein. In particular embodiments, the spirocyclyl group is substituted, independently, with one or more ionizable moieties or ionic moieties (e.g., any described herein).

Ionizable and Ionic Moieties

The compositions herein can include one or more ionizable or ionic moieties. Such moieties can include an anionic or cationic charge, such as in an ionic moiety. Alternatively, an ionizable moiety includes a functional group that can be readily converted into an ionic moiety, such as an ionizable moiety of a carboxy group (—$CO_2H$) that can be readily deprotonated to form a carboxylate anion (—$CO_2^-$). As used herein, the terms "ionizable" and "ionic" are used interchangeably.

Moieties can be characterized as an acidic moiety (e.g., a moiety can be deprotonated or can carry a negative charge) or a basic moiety (e.g., a moiety that can be protonated or carry a positive charge). In particular embodiments, the moiety can be a multi-ionic moiety, which can include a plurality of acidic moieties, a plurality of basic moieties, or a combination thereof (e.g., such as in a zwitterionic moiety). Further moieties can include a zwitterionic moiety, such as those including an anionic moiety (e.g., hydroxyl or a deprotonated hydroxyl) and a cationic moiety (e.g., ammonium).

The ionic moieties herein can be connected to the parent structure by way of one or more linking moieties. Furthermore, a single ionic moiety can be extended from a single linking moiety, or a plurality of ionic moieties can have one or more linking moieties therebetween.

For instance, the ionic moiety can have any of the following structures: -$L^A$-$X^A$ or -$L^A$-($L^{A'}$-$X^A$)$_{L2}$ or -$L^A$-($X^A$-$L^{A'}$-$X^{A'}$)$_{L2}$ or -$L^A$-$X^A$-$L^{A'}$-$X^{A'}$-$L^{A''}$-$X^{A''}$, in which each $L^A$, $L^{A'}$, and $L^A$ is a linking moiety; each $X^A$, $X^A$, and $X^A$ includes, independently, an acidic moiety, a basic moiety, or a multi-ionic moiety; and L2 is an integer of 1, 2, 3, or more (e.g., from 1 to 20).

Non-limiting linking moieties (e.g., for $L^A$, $L^{A'}$, and $L^{A''}$) include a covalent bond, a spirocyclic bond, —O—, —$NR^{N1}$—, —$SO_2$—$NR^{N1}$-Ak-, —(O-Ak)$_{L1}$-$SO_2$—$NR^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, in which Ak is an optionally substituted alkylene or optionally substituted haloalkylene, $R^{N1}$ is H or optionally substituted alkyl, Ar is an optionally substituted arylene, and L1 is an integer from 1 to 3. In particular embodiments, $L^A$ is —($CH_2$)$_{L1}$—, —O($CH_2$)$_{L1}$—, —($CF_2$)$_{L1}$—, —O($CF_2$)$_{L1}$—, or —S($CF_2$)$_{L1}$—, in which L1 is an integer from 1 to 3.

In some instances, a linker is attached to two or more ionic moieties. In some embodiments, the ionic moiety can be -$L^A$-($L^{A'}$-$X^A$)$_{L2}$, in which $L^A$ and $L^{A'}$ are linking moieties and $X^A$ is an acidic moiety, a basic moiety, or a multi-ionic moiety. In one instance, $L^A$ provides one, two, or three linkages. Non-limiting $L^A$ can be —CX$_2$(CX$_2$—), —CX(CX$_2$—)$_2$, or —C(CX$_2$—)$_3$, in which X is H, alkyl, or halo. $L^A$ can then provide an attachment point to the ionic moiety. For instance, $L^{A1}$ can be —(CH$_2$)$_{L1}$—, —O(CH$_2$)$_{L1}$—, —(CF$_2$)$_{L1}$—, —O(CF$_2$)$_{L1}$—, or —S(CF$_2$)$_{L1}$—, in which L1 is an integer from 1 to 3; and $X^A$ is any ionizable or ionic moiety described herein.

Non-limiting ionic moieties include carboxy (—CO$_2$H), carboxylate anion (—CO$_2^-$), a guanidinium cation (e.g., —NR$^{N1}$—C(=NR$^{N2}$R$^{N3}$)(NR$^{N4}$R$^{N5}$) or >N=C(NR$^{N2}$R$^{N3}$)(NR$^{N4}$R$^{N5}$)), or a salt form thereof. Non-limiting examples of each of R$^{N1}$, R$^{N2}$, R$^{N3}$, R$^{N4}$, and R$^{N5}$ is, independently, H, optionally substituted alkyl, optionally substituted aryl, or optionally substituted amino; or R$^{N1}$ and R$^{N2}$, R$^{N2}$ and R$^{N3}$, R$^{N3}$ and R$^{N4}$, R$^{N1}$ and R$^{N2}$, or R$^{N1}$ and R$^{N4}$ taken together with the nitrogen atom to which each are attached, form an optionally substituted heterocyclyl, heterocycle, or heterocyclic cation, as defined herein.

Some ionic moieties can include one or more sulfur atoms. Non-limiting sulfur-containing moieties include sulfo (—SO$_2$OH), sulfonate anion (—SO$_2$O$^-$), sulfonium cation (e.g., —SR$^{S1}$R$^{S2}$), sulfate (e.g., —O—S(=O)$_2$(OR$^{S1}$)), sulfate anion (—O—S(=O)$_2$Cr), or a salt form thereof. Non-limiting examples of each of R$^{S1}$ and R$^{S2}$ is, independently, H, optionally substituted alkyl, optionally substituted aryl, or optionally substituted amino; or R$^{S1}$ and R$^{S2}$, taken together with the sulfur atom to which each are attached, form an optionally substituted heterocyclyl, heterocycle, or heterocyclic cation, as defined herein; or R$^{S1}$ and R$^{S2}$, taken together, form an optionally substituted alkylene or heteroalkylene (e.g., as described herein).

Other ionic moieties can include one or more phosphorous atoms. Non-limiting phosphorous-containing moieties include phosphono (e.g., —P(=O)(OH)$_2$), phosphonate anion (e.g., —P(=O)(O)$_2$ or —P(=O)(OH)(O)), phosphate (e.g., —O—P(=O)(OR$^{P1}$)(OR$^{P2}$) or —O—[P(=O)(OR$^{P1}$)—O]$_{P3}$—R$^{P2}$), phosphate anion (e.g., —O—P(=O)(OR$^{P1}$)(O) or —O—P(=O)(O)$_2$), phosphonium cation (e.g., —P$^+$R$^{P1}$R$^{P2}$R$^{P3}$), phosphazenium cation (e.g., —P$^+$(=NR$^{N1}$R$^{N2}$)R$^{P1}$R$^{P2}$, in which each of R$^{N1}$ and R$^{N2}$ is, independently, optionally substituted alkyl or optionally substituted aryl), or a salt form thereof. Non-limiting examples of each of R$^{P1}$, R$^{P2}$, and R$^{P3}$ is, independently, H, optionally substituted alkyl, optionally substituted aryl, or optionally substituted amino; or R$^{P1}$ and R$^{P2}$, taken together with the phosphorous atom to which each are attached, form an optionally substituted heterocyclyl, heterocycle, or heterocyclic cation, as defined herein; or R$^{P1}$ and R$^{P2}$ and R$^{P3}$, taken together with the phosphorous atom to which each are attached, form an optionally substituted heterocyclyl, heterocycle, or heterocyclic cation, as defined herein; or a single, double, or non-localized pi bond, provided that a combination of bonds result in a tetravalent phosphorous; or wherein two of R$^{P1}$, R$^{P2}$, and R$^{P3}$, taken together, form an optionally substituted alkylene or heteroalkylene (e.g., as described herein).

Yet other ionic moieties can include one or more nitrogen atoms. Non-limiting nitrogen-containing moieties include amino (e.g., —NR$^{N1}$R$^{N2}$), ammonium cation (e.g., —N+R$^{N1}$R$^{N2}$R$^{N3}$ or —N+R$^{X1}$R$^{X2}$—), heterocyclic cation (e.g., piperidinium, 1,1-dialkyl-piperidinium, pyrrolidinium, 1,1-dialkyl-pyrrolidinium, pyridinium, 1-alkylpyridinium, (1,4-diazabicyclo[2.2.2]octan-1-yl) (DABCO), 4-alkyl-(1,4-diazabicyclo[2.2.2]octan-1-yl), etc.), or a salt form thereof. Non-limiting examples of each of R$^{N1}$, R$^{N2}$, and R$^{N3}$ is, independently, H, optionally substituted alkyl, optionally substituted cycloalkyl, or optionally substituted aryl; or R$^{N1}$ and R$^{N2}$, taken together with the nitrogen atom to which each are attached, form an optionally substituted heterocyclyl, heterocycle, or heterocyclic cation, as defined herein; or R$^{N1}$ and R$^{N2}$ and R$^{N3}$, taken together with the nitrogen atom to which each are attached, form an optionally substituted heterocyclyl, heterocycle, or heterocyclic cation, as defined herein; or wherein two of R$^{N1}$, R$^{N2}$, and R$^{N3}$, taken together, form an optionally substituted alkylene or heteroalkylene (e.g., as described herein); or a single, double, or non-localized pi bond, provided that a combination of bonds result in a tetravalent nitrogen.

Yet other heterocyclic cations include piperidinium cations, such as dimethyl piperidinium, methyl piperidinium (e.g., 1-methyl-piperidinium-1-yl), ethylmethyl piperidinium, ethyl piperidinium (e.g., 1-ethyl-piperidinium-1-yl), propylmethyl piperidinium, propyl piperidinium (e.g., 1-propyl-piperidinium-1-yl), butylmethyl piperidinium, butyl piperidinium (e.g., 1-butyl-piperidinium-1-yl), diethyl piperidinium, propylethyl piperidinium, butylethyl piperidinium, butylpropyl piperidinium, or spiro-1,1'-bipiperidinium; pyrrolidinium cations, such as dimethyl pyrrolidinium, ethylmethyl pyrrolidinium, propylmethyl pyrrolidinium, butylmethyl pyrrolidinium, diethyl pyrrolidinium, propylethyl pyrrolidinium, butylethyl pyrrolidinium, butylpropyl pyrrolidinium, spiro-1,1'-bipyrrolidinium, spiro-1-pyrrolidinium-r-piperidinium, or spiro-1-pyrrolidinium-1'-morpholinium; pyrazolium cations, such as dimethyl pyrazolium, ethylmethyl pyrazolium, or butylmethyl pyrazolium; imidazolium cations, such as 3-alkyl imidazolium, 1,2-dialkylimidazolium, such as 1,2-dimethyl-1H-imidazol-3-ium; those having one nitrogen and five or six carbon ring members, such as pyridinium, 2-methylpyridinium, 3-methylpyridinium, 4-methylpyridinium, 2,6-dimethylpyridinium, quinolinium, isoquinolinium, acridinium, or phenanthridinium; those having two nitrogen and four carbon ring members, such as pyridazinium, pyrimidinium, pyrazinium or phenazinium; or those having one nitrogen and one oxygen ring member, such as morpholinium, 2-methyl morpholinium, or 3-methyl morpholinium.

Any of the heterocyclic cations can be attached to the polymer either directly or indirectly (e.g., by way of a linker or a linking moiety). Furthermore, any atom within the heterocyclic cation (e.g., within the ring of the heterocyclic cation) can be attached to the polymer. For instance, taking piperidinium as the non-limiting heterocyclic cation, such a cation can be attached to the polymer by way of the cationic center or by way of an atom within the ring, and such attachments can be direct by way of a covalent bond or indirect by way of $L^A$ (a linking moiety, such as any described herein):

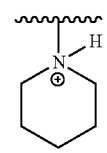

(piperidin-1-ium-1-yl),

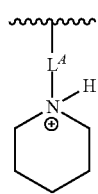

(piperidin-1-ium-1-yl attached by way of $L^A$),

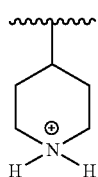

(piperidin-1-ium-4-yl), or

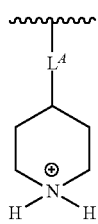

(piperidin-1-ium-4-yl attached by way of $L^A$). In addition to attachment at the 1- or 4-position of piperidin-1-ium, other attachment sites can be implemented at any point on the ring.

In some embodiments, the heterocyclic cations is or comprises a piperidinium cation or an azepanium cation. In one embodiments, the heterocyclic cation includes the following structure:

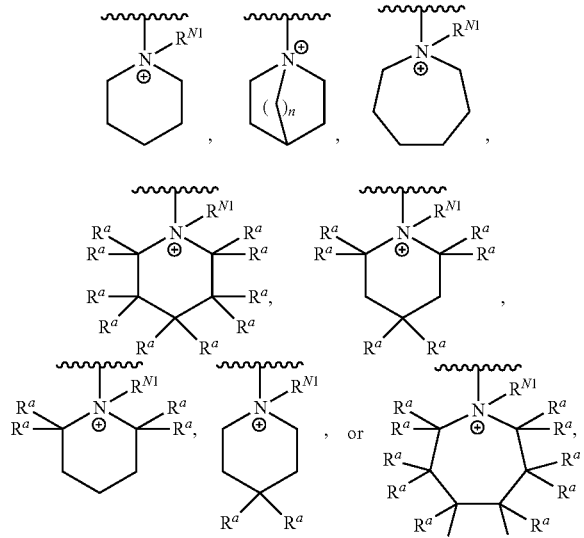

wherein:

$R^{N1}$ is H, optionally substituted aliphatic, optionally substituted alkyl, optionally substituted heteroaliphatic, optionally substituted heteroalkyl, optionally substituted aromatic, or optionally substituted aryl;

n is 1, 2, 3, 4, or 5; and each $R^a$ is, independently, H, optionally substituted aliphatic, optionally substituted alkyl, optionally substituted heteroaliphatic, optionally substituted heteroalkyl, optionally substituted aromatic, optionally substituted aryl, an ionizable moiety, or an ionic moiety;

wherein $R^{N1}$ and at least one $R^a$ can be taken together to form an optionally substituted cyclic group or an optionally substituted heterocyclic group, and/or wherein at least two $R^a$ groups can be taken together to form an optionally substituted cyclic group or an optionally substituted heterocyclic group.

In one instance, $R^{N1}$ and $R^a$ can be taken together to form an optionally substituted alkylene group or an optionally substituted heteroalkylene group. In particular embodiments, the alkylene or heteroalkylene group is substituted, independently, with one or more ionizable moieties or ionic moieties (e.g., any described herein).

In another instance, at least one $R^a$ is optionally substituted aliphatic or optionally substituted alkyl. Non-limiting examples of $R^a$ include methyl, ethyl, n-propyl, isopropyl, n-butyl, sec-butyl, isobutyl, tert-butyl, n-pentyl, sec-pentyl, isopentyl, tert-pentyl, neopentyl, 3-pentyl, sec-isopentyl, and the like. In other embodiments, the heterocyclic cation has a ring having one, two, three, four, five, or six $R^a$ groups that is not H. In yet other embodiments, the heterocyclic cation has a ring having one, two, three, four, five, or six $R^a$ groups that is, independently, optionally substituted aliphatic or optionally substituted alkyl. Without wishing to be limited by mechanism, the presence of bulky substituents may provide more stable cations. In other embodiments, any ionizable moiety or ionic moiety herein can be substituted with one or more $R^a$ groups.

Yet other non-limiting piperidinium cations or azepanium cations include any of the following:

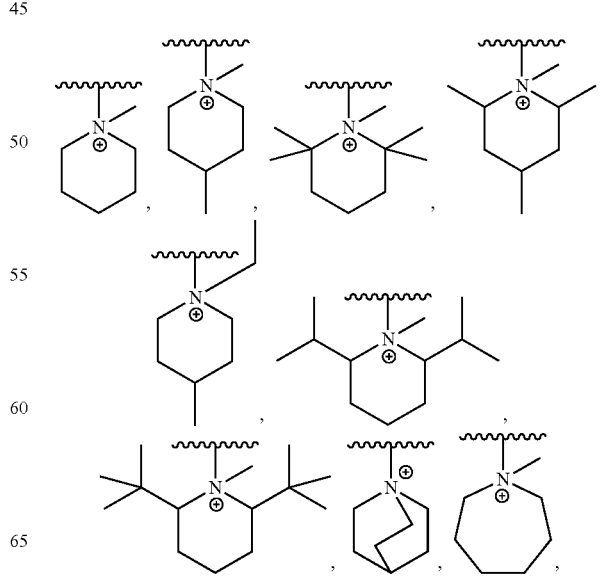

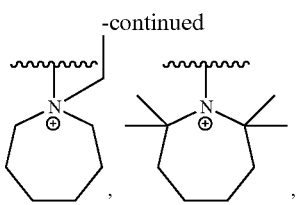

and the like.

Other moieties can include -L$^A$-L$^{A'}$-X$^A$, in which L$^A$ is or includes optionally substituted aromatic, optionally substituted arylene, optionally substituted heterocycle, or optionally substituted heterocyclyl (e.g., optionally substituted phenylene or optionally substituted aryleneoxy); L$^{A'}$ is or includes optionally substituted aliphatic, optionally substituted alkylene, optionally substituted heteroaliphatic, or optionally substituted heteroalkylene (e.g., optionally substituted C$_{1-6}$ alkylene or optionally substituted C$_{1-6}$ heteroalkylene); and X$^A$ is or includes an ionic moiety including one or more nitrogen atoms. Non-limiting ionic moieties include pyridinium (e.g., pyridinium-1-yl, Pyrd; alkylpyridinium, such as 2-methylpyridinium-1-yl, 2MPyrd; or aromatic pyridinium, such as 1-benzylpyridinium-4-yl), imidazolium (e.g., 1,2-dialkylimidazolium-3-yl, including 1,2-dimethyl-imidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2] octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl)ammonium, such as dimethyl(phenylhexyl)ammonium-1-yl), and piperidinium (e.g., aliphatic piperidinium, such as 1-methyl-piperidinium-1-yl (Mepip), 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Yet other moieties can include -L$^A$-X$^A$, in which L$^A$ is a covalent bond (including a spirocyclic bond), optionally substituted aliphatic, optionally substituted alkylene, optionally substituted heteroaliphatic, optionally substituted heteroalkylene, optionally substituted aromatic, optionally substituted arylene, optionally substituted heterocycle, or optionally substituted heterocyclyl (e.g., optionally substituted C$_{1-6}$ alkylene, optionally substituted C$_{1-6}$ heteroalkylene, optionally substituted phenylene, or optionally substituted aryleneoxy); and X$^A$ is or includes an ionic moiety including one or more nitrogen atoms. Non-limiting ionic moieties include pyridinium (e.g., pyridinium-1-yl, Pyrd; alkylpyridinium, such as 2-methylpyridinium-1-yl, 2MPyrd; or aromatic pyridinium, such as 1-benzylpyridinium-4-yl), imidazolium (e.g., 1,2-dialkylimidazolium-3-yl, including 1,2-dimethylimidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2] octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl)ammonium, such as dimethyl(phenylhexyl)ammonium-1-yl), and piperidinium (e.g., aliphatic piperidinium, such as 1-methyl-piperidinium-1-yl, 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Such moieties can be associated with one or more counterions. For instance, a cationic moiety can be associated with one or more anionic counterions, and an anionic moiety can be associated with one or more cationic counterions.

Arylene Groups

Particular moieties herein (e.g., the core moiety Z, the multivalent moiety Z$^1$, the polymeric unit P, linking moieties, and others) can include an optionally substituted arylene. Such arylene groups include any multivalent (e.g., bivalent, trivalent, tetravalent, etc.) groups having one or more aromatic groups, which can include heteroaromatic groups. Non-limiting aromatic groups can include any of the following:

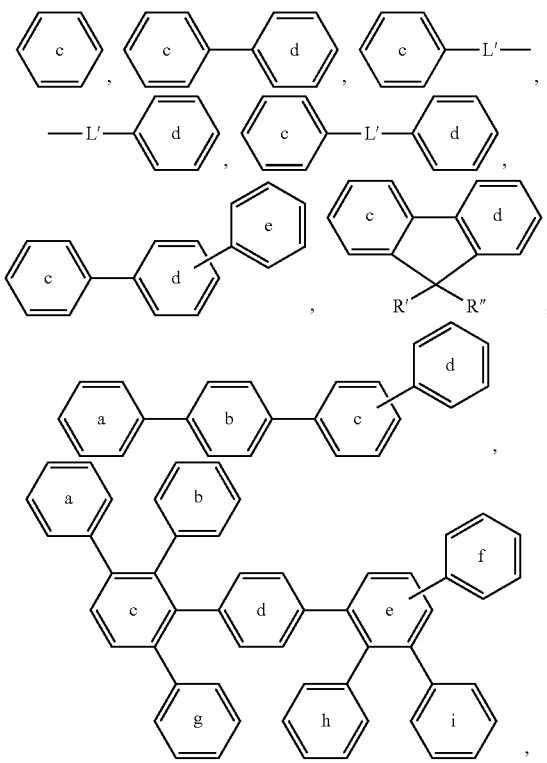

in which each of rings a-i can be optionally substituted (e.g., with any optional substituents described herein for alkyl or aryl; or with any ionic moiety described herein); L' is a linking moiety (e.g., any described herein); and each of R" and R'" is, independently, H, optionally substituted alkyl, optionally substituted aryl, or an ionic moiety, as described herein. Non-limiting substituents for rings a-i include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl. In some embodiments, L' is a covalent bond, —O—, —NR$^{N1}$—, —C(O)—, optionally substituted alkylene, optionally substituted heteroalkylene, or optionally substituted arylene.

Yet other non-limiting arylene can include phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), 9,10-anthracene, naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like.

Non-limiting examples of linking moieties for arylene include any herein. In some embodiments, L' is substituted one or more ionizable or ionic moieties described herein. In particular embodiments, L' is optionally substituted alkylene. Non-limiting substitutions for L' can include -L$^A$-X$^A$, in which L$^A$ is a linking moiety (e.g., any described herein, such as, -Ak-, —O-Ak-, -Ak-O—, —Ar—, —O—Ar—, or —Ar—O—, in which Ak is optionally substituted alkylene and Ar is optionally substituted arylene), and X$^A$ is an acidic moiety, a basic moiety, or a multi-ionic moiety.

Linking Moieties

Particular chemical functionalities herein can include a linking moiety, either between the parent structure and another moiety (e.g., an ionic moiety) or between two (or more) other moieties. Linking moieties (e.g., L, L', L$^1$, L$^2$, L$^3$, L$^4$, L$^a$, L$^b$, L$^c$, L$^d$ L$^A$, L$^{A'}$, L$^{A''}$, L$^{B'}$, L$^{B''}$, L$^{2A}$, L$^{4A}$, L$^{6A}$, L$^{8A}$, L$^{10A}$, L$^{12A}$, and others) can be any useful multivalent group, such as multivalent forms of optionally substituted aliphatic, optionally substituted heteroaliphatic, optionally substituted aromatic, or optionally substituted heteroaromatic.

Non-limiting linking moieties (e.g., L) include a covalent bond, a spirocyclic bond, —O—, —NR$^{N1}$—, —C(O)—, —C(O)O—, —OC(O)—, —SO$_2$—, optionally substituted alkylene, optionally substituted alkyleneoxy, optionally substituted haloalkylene, optionally substituted heteroalkylene, optionally substituted arylene, optionally substituted aryleneoxy, optionally substituted heterocyclyldiyl, —SO$_2$—NR$^{N1}$-Ak-, —(O-Ak)$_{L1}$-SO$_2$—NR$^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, as well as combinations thereof. In particular embodiments, Ak is an optionally substituted aliphatic, optionally substituted alkylene, or optionally substituted haloalkylene; R$^{N1}$ is H or optionally substituted alkyl or optionally substituted aryl; Ar is an optionally substituted aromatic or optionally substituted arylene; and L1 is an integer from 1 to 3.

In some embodiments, the linking moiety is —(CH$_2$)$_{L1}$—, —O(CH$_2$)$_{L1}$—, —(CF$_2$)$_{L1}$—, —O(CF$_2$)$_{L1}$—, or —S(CF$_2$)$_{L1}$— in which L1 is an integer from 1 to 3. In other embodiments, the linking moiety is -Ak-O—Ar-Ak-O-Ak- or -Ak-O—Ar—, in which Ak is optionally substituted alkylene or optionally substituted haloalkylene, and Ar is an optionally substituted arylene. Non-limiting substituted for Ar includes —SO$_2$-Ph, in which Ph can be unsubstituted or substituted with one or more halo.

Methods of Making a Polymer

The present disclosure also encompasses methods of making a polymer. One non-limiting method can include forming an initial polymer having a reactive group (e.g., halo or another leaving group) and substituting the reactive group with an ionic moiety, thereby providing an ionic polymer. Any useful synthetic scheme can be employed to provide such ionizable or ionic moieties, such as by way of sulfonation or oxidation to introduce such ionizable/ionic moieties, catalytic polymerization with monomers having such ionizable/ionic moieties, and the like.

A further step can include exchanging a counterion present in the ionic polymer with another counterion (e.g., exchanging a halide counterion for a hydroxide counterion). Yet other steps can include exposing the ionic polymer to a crosslinking reagent to form one or more crosslinker between a combination of polymeric units, core moieties, ionizable moieties, or ionic moieties.

The initial polymer including the core moiety and the polymeric units can be formed in any useful manner. In one embodiment, the method includes providing one or more polymeric units (or monomeric units) in the presence of an interpenetrating agent, thereby forming a polymeric backbone. In particular embodiments, a Friedel-Crafts alkylation agent is employed to react between the polymeric unit and the core moiety. For instance, the Friedel-Crafts alkylation agent can provide a carbocation intermediate having a haloalkyl group and a reactive group, in which the carbocation center reacts with an aryl group of the polymeric unit and/or the core moiety. The resulting initial polymer can then include the haloalkyl group and the reactive group attached to the polymeric unit and/or the core moiety.

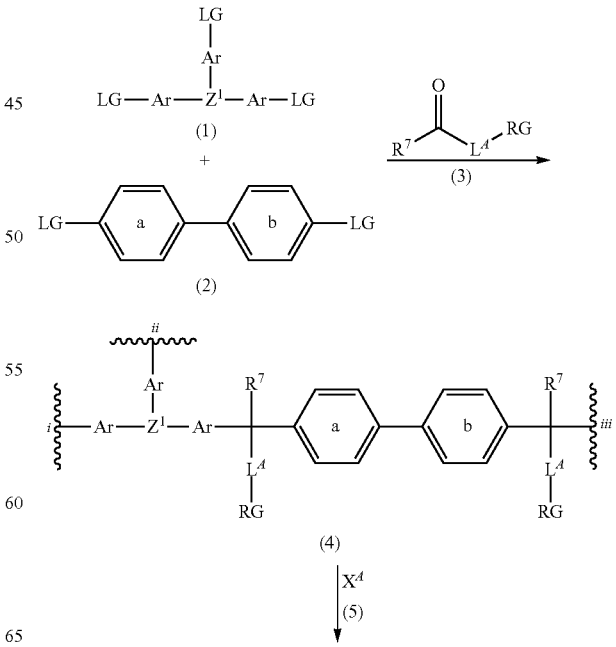

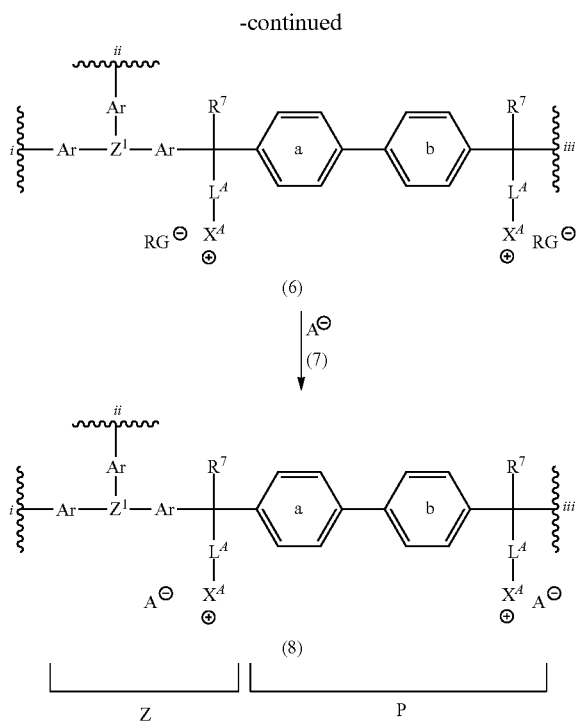

(6)

(7)

(8)

Z      P

Scheme 1 provides a non-limiting reaction scheme for making a polymer. The reaction can proceed by providing a non-limiting interpenetrating agent (1), which has a trivalent moiety $Z^1$ and three linkers having an optionally substituted arylene (—Ar—) and a leaving group (LG, e.g., H). Also provided is a non-limiting polymeric unit agent (2), which has ring a and ring b that can be optionally substituted and that has a leaving group (LG, e.g., H). The non-limiting Friedel-Crafts alkylation agent (3) in the optional presence of a strong acid (e.g., methanesulfonic acid or trifluoromethanesulfonic acid) can be employed to react between the polymeric unit (provided by 2) and the core moiety (provided by 1). For instance, the Friedel-Crafts alkylation agent can provide a carbocation intermediate having a haloalkyl or other electron-withdrawing moiety (e.g., $R^7$) and a reactive group (RG, e.g., halo) attached to the carbonyl carbon by way of a linking moiety ($L^A$). After the electrophilic addition reaction, the resulting initial polymer (4) includes the electron-withdrawing moiety (e.g., $R^7$) and the reactive group (RG) attached to the polymeric unit and the core moiety by way of a linking moiety $L^A$. Further reactions can occur between the aryl groups provided by compounds (1) and (2) to extend the polymeric network, as indicated by regions (i), (ii), and (iii).

Further reactions can include substituting the reactive group RG with an example ionizable reagent (5), thereby providing an ionic polymer (6) having an ionic moiety (—$X^{A+}$). Yet another step can include exchanging a counterion ($RG^-$) present in the ionic polymer (6) with another counterion ($A^-$) (7), thereby providing a further ionic polymer (8). Other steps can include exposing the initial polymer (4) or the ionic polymer (6, 8) to a crosslinking reagent to form one or more crosslinker between a combination of polymeric units, core moieties, ionizable moieties, or ionic moieties.

Scheme 2

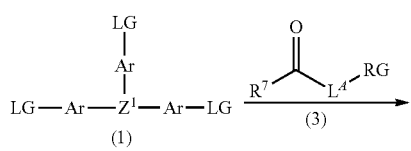

(1)     (3)

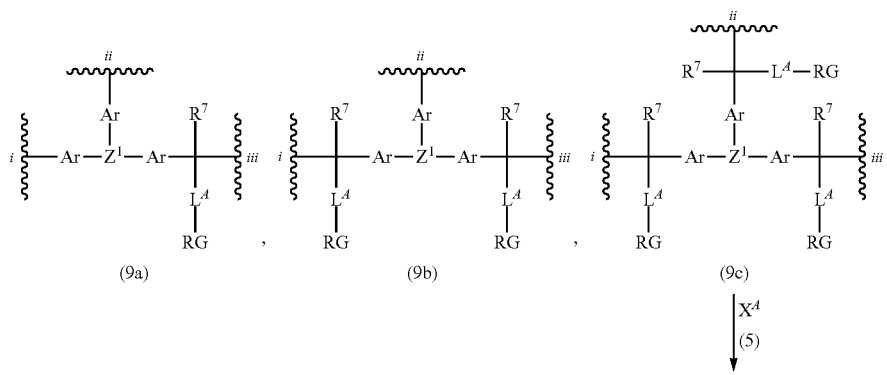

(9a) , (9b) , (9c)

(5)

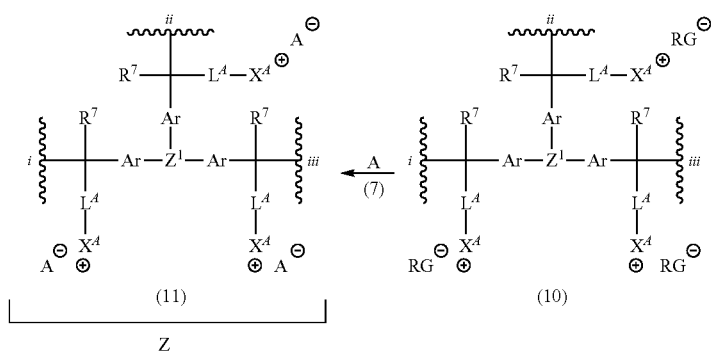

Scheme 2 provides another non-limiting reaction scheme for making an example of a core moiety Z. The reaction can proceed by providing a non-limiting interpenetrating agent (1), which has a trivalent moiety $Z^1$ and three linkers having an optionally substituted arylene (—Ar—) and a leaving group (LG, e.g., H). Also provided is a non-limiting Friedel-Crafts alkylation agent (3), which can include an electron-withdrawing group (e.g., as $R^7$, such as a haloalkyl) and a reactive group (RG). The alkylation agent (3) can be provided in the optional presence of a strong acid (e.g., methanesulfonic acid), thereby forming a reactive carbocation intermediate. This intermediate can participate in electrophilic addition reactions with the aryl groups (Ar) present in agent (1) to form various initial core moieties (9a, 9b, 9c) having various degrees of substitution of the aryl groups in interpenetrating agent (1). The initial core moieties can be reacted with a polymeric unit agent (e.g., as in agent 2 in Scheme 1) at any point during the synthetic scheme to form a polymer.

Further reactions of the initial core moiety can include substituting the reactive group RG with an example ionizable reagent (5), thereby providing an ionic core moiety (10) having an ionic moiety ($—X^{A+}$). Although Scheme 2 shows the substitution reaction with initial core moiety (9c), the other moieties (9a, 9b) can also be similarly reacted to form corresponding ionic core moieties. Yet another step can include exchanging a counterion ($RG^-$) present in the ionic core moiety (10) with another counterion ($A^-$) (7), thereby providing a further ionic core moiety (11). Other steps can include exposing the initial core moiety (9a, 9b, 9c) or the ionic core moiety (10) to a polymeric unit agent (e.g., as in agent 2 in Scheme 1) to form a polymer and/or a crosslinking reagent to form one or more crosslinker between a combination of polymeric units, core moieties, ionizable moieties, or ionic moieties.

In yet other embodiments, an interpenetrating agent is used as a capping agent. For instance, when used as a capping agent, the interpenetrating agent can be introduced after a polymerization reaction is conducted to generate a polymer (e.g., an initial polymer or an ionic polymer).

Scheme 3

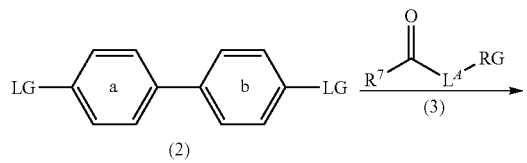

(2)

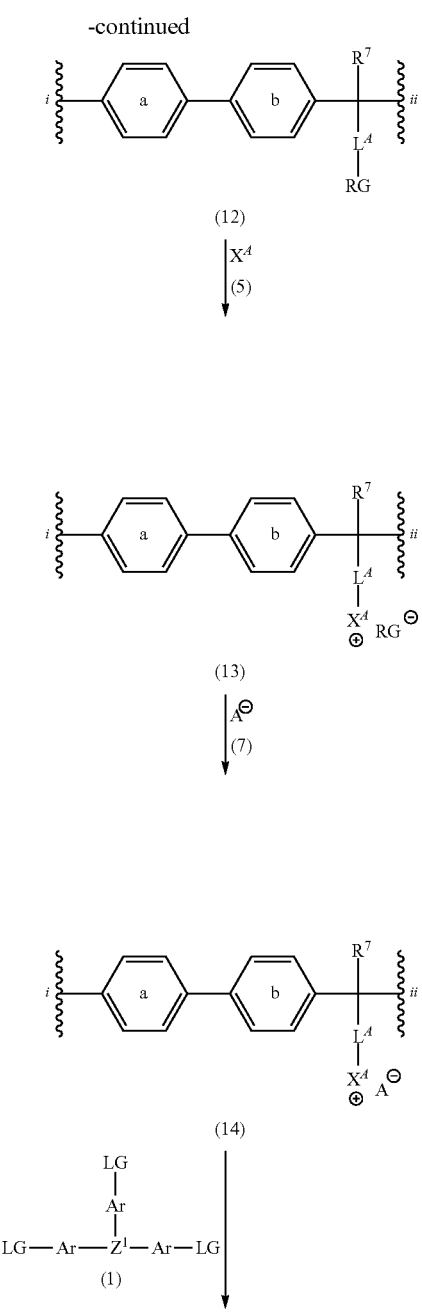

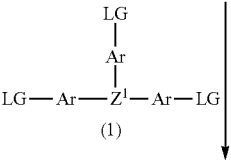

(1)

-continued

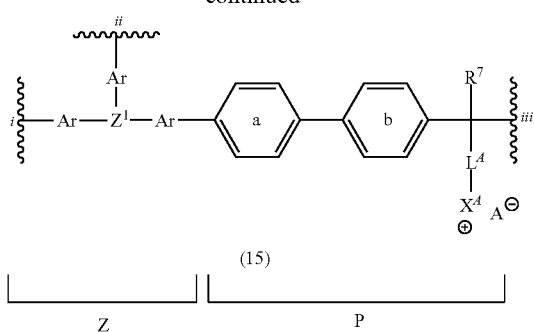

(15)

Scheme 3 provides a non-limiting reaction scheme for capping a polymer. The reaction can proceed by providing a non-limiting polymeric unit agent (2), which has ring a and ring b that can be optionally substituted and that has a leaving group (LG, e.g., H). The non-limiting Friedel-Crafts alkylation agent (3) in the optional presence of a strong acid (e.g., methanesulfonic acid) can be employed to react between polymeric units (provided by 2). For instance, the Friedel-Crafts alkylation agent can provide a carbocation intermediate having a haloalkyl or other electron-withdrawing moiety (e.g., $R^7$) and a reactive group (RG, e.g., halo) attached to the carbonyl carbon by way of a linking moiety ($L^A$). After the electrophilic addition reaction, the resulting initial polymer (12) includes the electron-withdrawing moiety (e.g., $R^7$) and the reactive group (RG) attached to the polymeric unit and the core moiety by way of a linking moiety $L^A$. Further reactions can occur between compounds (2) and (3) to extend the polymeric network, as indicated by regions (i) and 07).

Further reactions can include substituting the reactive group RG with an example ionizable reagent (5), thereby providing an ionic polymer (13) having an ionic moiety ($—X^{A+}$). Yet another step can include exchanging a counterion ($RG^-$) present in the ionic polymer (13) with another counterion ($A^-$) (7), thereby providing a further ionic polymer (14). Other steps can include exposing the initial polymer (12) or the ionic polymer (13, 14) to a crosslinking reagent to form one or more crosslinker between a combination of polymeric units, core moieties, ionizable moieties, or ionic moieties.

Capping of the polymer can be conducted. While Scheme 3 shows capping of the ionic polymer (14), capping can be conducted with the initial polymer (12) or the other ionic polymer (13). In one instance, the capping reaction can proceed by providing a non-limiting interpenetrating agent (1), which has a trivalent moiety $Z^1$ and three linkers having an optionally substituted arylene (—Ar—) and a leaving group (LG, e.g., H, halo, haloalkyl, and the like). As can be seen, if a reactive moiety is present on the ionic polymer, then such moieties can be capped using the interpenetrating agent. Capping can include occur at the terminal unit of a polymeric network (e.g., at region (i)). Alternatively, capping can be used to continue or extend the polymeric network, in which regions (iii) and (iv) can connect one polymeric unit P to another polymer unit by way of the core moiety Z.

Uses

The compositions herein can be employed to form a material, such as a film, a membrane (e.g., an ion exchange membrane), or a crosslinked polymeric matrix. The composition and material thereof can be employed within a device or apparatus, such as an electrochemical cell. In one embodiment, the electrochemical cell includes an anode, a cathode, and a polymer electrolyte membrane (PEM) disposed between the anode and the cathode. The PEM (or a component thereof) can include any composition or material described herein.

The compositions herein can be employed as a component for a membrane electrode assembly (MEA). A non-limiting MEA can include a cathode layer having a reduction catalyst and a first ion-conducting polymer; an anode layer having an oxidation catalyst and a second ion-conducting polymer; a membrane layer having a third ion-conducting polymer between the anode layer and the cathode layer; and a cathode buffer layer having a fourth ion-conducting polymer between the cathode layer and the membrane layer. The membrane layer (e.g., PEM) can provide ionic communication between the cathode layer and the anode layer or can conductively connect the cathode layer and the anode layer. The cathode buffer layer can conductively connect the cathode layer and the membrane layer. Any of the polymers in the MEA (e.g., as a first, second, third, and/or fourth ion-conducting polymer) can include a composition as described herein.

In some embodiments, the cathode buffer layer has a first porosity between about 0.01 and 95 percent by volume (e.g., wherein the first porosity is formed by the inert filler particles, such as diamond particles, boron-doped diamond particles, polyvinylidene difluoride (PVDF) particles, and polytetrafluoroethylene (PTFE) particles).

In other embodiments, at least two of the first, second, third, and fourth ion-conducting polymers are from different classes of ion-conducting polymers. There are three classes of ion-conducting polymers: anion-conductors, cation-conductors, and cation-and-anion-conductors. The ionic or ionizable moiety can be selected to provide any one of these classes.

The term, "ion-conducting polymer" is used herein to describe a polymer electrolyte having greater than approximately 1 mS/cm specific conductivity for anions and/or cations. The term, "anion-conductor" and/or "anion-conducting polymer" describes an ion-conducting polymer that conducts anions primarily (although there will still be some small amount of cation conduction) and has a transference number for anions greater than approximately 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material.

The compositions herein can be employed in a reactor. Non-limiting reactors include an electrolyzer, a carbon dioxide reduction electrolyzer, an electrochemical reactor, a gas-phase polymer-electrolyte membrane electrolyzer, but can additionally or alternatively include any other suitable reactors. The reactor may include one or more: electrodes (e.g., anode, cathode), catalysts (e.g., within and/or adjacent the cathode and/or anode), gas diffusion layers (e.g., adjacent the cathode and/or anode), and/or flow fields (e.g., defined within and/or adjacent the electrodes and/or gas diffusion layers, such as one or more channels defined opposing the cathode across the gas diffusion layer). In some embodiments, the reactor includes a membrane stack or membrane electrode assembly (MEA) having one or more polymer electrolyte membranes (PEMs), providing ionic communication between the anode and cathode of the reactor. In certain embodiments, the reactor includes a membrane stack including: a cathode layer including a reduction catalyst and an ion-conducting polymer; a PEM membrane (e.g., bipolar membrane, monopolar membrane, etc.; membrane including one or more anion conductors such as anion exchange membranes (AEMs), proton and/or cation conductors such as proton exchange membranes, and/or any other suitable ion-conducting polymers; membrane including one or more buffer layers; etc.); and an anode layer including an oxidation catalyst and an ion-conducting polymer. The ion-conducting polymers of each layer can be the same or different ion-conducting polymers. In particular embodiments, the membrane, membrane stack, membrane electrode assembly (MEA), polymer electrolyte membrane (PEM), and/or ion-conducting polymer includes a composition described herein.

In one embodiment, the carbon dioxide reduction electrolyzer includes a membrane electrode assembly (MEA). The MEA can include one or more ion-conducting polymer layers (e.g., including any composition described herein) and a cathode catalyst for facilitating chemical reduction of carbon dioxide to carbon monoxide.

In some configurations, a bipolar MEA has the following stacked arrangement: cathode layer/cathode buffer layer (an anion-conducting layer)/cation-conducting layer (with may be a PEM)/anode layer. In some implementations, the bipolar MEA has a cathode layer containing an anion-conducting polymer and/or an anode layer containing a cation-conducting layer. In some implementations, the bipolar MEA has an anode buffer layer, which may contain a cation-conducting material, between the cation-conducting layer and the anode layer. The cathode layer, cathode buffer layer, anion-conducting layer, cation-conducting layer, and/or anode layer can include any composition described herein.

In some configurations, a bipolar MEA has the following stacked arrangement: cathode layer/cation-conducting layer (with may be a PEM)/anion-conducting layer/anode layer. In some applications, a bipolar MEA having this arrangement is configured in a system for reducing a carbonate and/or bicarbonate feedstock such as an aqueous solution of carbonate and/or bicarbonate. The cathode layer, cation-conducting layer, anion-conducting layer, and/or anode layer can include any composition described herein.

In some configurations, an MEA has the following stacked arrangement: cathode layer/anion-conducting layer/bipolar interface/cation-conducting layer/anode layer. The bipolar interface can include, e.g., a cation-and-anion conducting polymer, a third polymer different from the polymers of the anion-conducting polymer layer and the cation-conducting polymer layer, a mixture of an anion-conducting polymer and a cation-conducting polymer, or a cross-linking of the cation-conducting polymer and anion-conducting polymer. The cathode layer, anion-conducting layer, bipolar interface, cation-conducting layer, and/or anode layer can include any composition described herein.

In some configurations, an MEA has the following stacked arrangement: cathode layer/anion-conducting layer/anode layer. In some implementations, this MEA has no cation-conducting layers between the cathode layer and the anode layer. In some applications, an MEA containing only anion-conducting material between the cathode and anode is configured in a system for reducing carbon monoxide feedstock. The cathode layer, anion-conducting layer, and/or anode layer can include any composition described herein.

The compositions herein can be provided in a layer (e.g., a membrane layer or others herein) having any suitable porosity (including, e.g., no porosity or a porosity between 0.01-95%, 0.1-95%, 0.01-75%, 1-95%, 1-90%, etc.). In some embodiments, the composition can provide a layer (e.g., a membrane) that is chemically and mechanically stable at a temperature of 80° C. or higher, such as 90° C. or higher, or 100° C. or higher. In other embodiments, the composition is soluble in a solvent used during fabrication of a layer (e.g., an organic solvent, such as methanol, ethanol, isopropanol, tetrahydrofuran, chloroform, toluene, or mixtures thereof). In particular embodiments, the composition, a layer thereof, or a membrane thereof is characterized by an ion exchange capacity (IEC) from about 0.2 to 3 milliequivalents/g (meq./g), such as from 0.5 to 3 meq./g, 1 to 3 meq./g, or 1.1 to 3 meq./g. In some embodiments, the composition, a layer thereof, or a membrane thereof is characterized by a water uptake (wt. %) from about 2 to 180 wt. %, such as from 10 to 180 wt. %, 20 to 180 wt. %, 50 to 180 wt. %, 10 to 90 wt. %, 20 to 90 wt. %, or 50 to 90 wt. %. In other embodiments, the composition, a layer thereof, or a membrane thereof is characterized by an ionic conductivity of more than about 10 mS/cm. In any embodiment herein, a layer, a membrane, or a film including a composition herein has a thickness from about 10 to 300 µm, such as from 20 to 300 µm, 20 to 200 µm, or 20 to 100 µm. In any embodiment herein, the composition, a layer thereof, or a membrane thereof is characterized by minimal or no light absorbance at wavelength from about 350 nm to 900 nm, about 400 nm to 800 nm, or about 400 nm to 900 nm.

A layer or a membrane can be formed in any useful manner. In one embodiments, a composition (e.g., an initial polymer or an ionic polymer) can be dissolved in a solvent (e.g., any described herein, such as an organic solvent, including methanol, ethanol, isopropanol, tetrahydrofuran, chloroform, toluene, o-dichlorobenzene, m-dichlorobenzene, p-dichlorobenzene, naphthalene, α-naphthol, or combinations thereof) to from a casting solution. The casting solution can be optionally filtered, applied to a substrate, and then dried to form a film. Application to a substrate can include doctor blade coating, solution casting, spraying, dip coating, spin coating, extrusion, melt casting, or a combination of any technique. The film can be optionally further treated, such as by immersion in any reagents herein (e.g., ionizable reagent, crosslinking reagent, counterion, solvent including water, etc., and combinations thereof).

Further uses, membranes, assemblies, and configurations are described in U.S. application Ser. No. 15/586,182, filed May 3, 2017, published as U.S. Pat. Pub. No. 2017-0321334, by Kuhl et al., entitled "Reactor with advanced architecture for the electrochemical reaction of $CO_2$, CO and other chemical compounds"; U.S. Appl. No. 63/060,583, filed Aug. 3, 2020, and International Appl. No. PCT/US2021/044378, filed Aug. 3, 2020, by Flanders et al., entitled "System and method for carbon dioxide reactor control"; and U.S. Appl. No. 62/939,960, filed Nov. 25, 2019, and International Publication No. WO 2021/108446, by Huo et al., entitled "Membrane electrode assembly for COx reduction", each of which are incorporated herein by reference in its entirety.

EXAMPLES

Example 1: Absorbance of Polymer Compositions

Various polymer compositions were synthesized and characterized by ultraviolet-visible light spectroscopy. In certain uses, a transparent polymer composition may be desired. For instance, polymer-based electrolytes used in conjunction with solar energy application may be exposed to the full solar spectrum, such that a decreased light transmission of the membrane may negatively impact the efficiency of such applications.

Figure 5A:
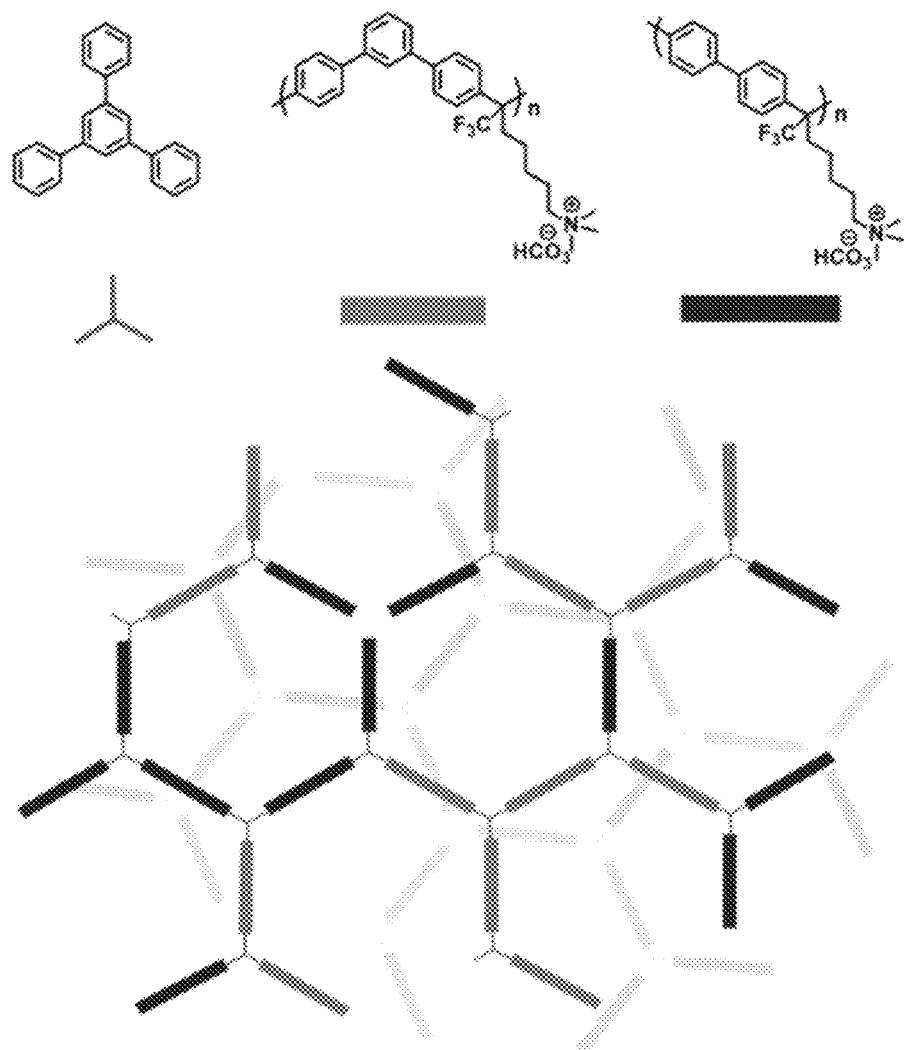
FIG. 5A-5B provides (A) a schematic of a non-limiting composition having a branched triphenyl benzene branching unit as a non-limiting core moiety (Branch, three intersecting lines), a terphenyl unit as a non-limiting polymeric unit (TP, gray rectangle), and a biphenyl unit as another non-limiting polymeric unit (BP, black rectangle); and (B) ultraviolet-visible spectroscopy data for a branched biphenyl polymer including biphenyl units and 0.6 mol. % of the triphenyl benzene branching unit (labeled as "(i)" and "Branch BP"), the triphenyl benzene branching unit (labeled as "(ii)" and "Branch unit"), a polymer including terphenyl units (labeled as "(iii)" and "PE-TP"), a copolymer including biphenyl units and terphenyl units (labeled as "(iv)" and "PE-BP-TP"), and a polymer including biphenyl units (labeled as "(v)" and "PE-BP").

FIG. 5A shows a non-limiting schematic illustration of a branched copolymer composition, which includes a triphenyl benzene branching unit that serves as a core moiety (three intersecting lines), a non-limiting terphenyl unit that serves as a polymeric unit (gray rectangle), and a non-limiting biphenyl unit that serves as another polymeric unit (black rectangle). As seen in this figure, the terphenyl unit includes a terphenylene group, which in turn is attached to a methylene group within the backbone. The biphenyl unit includes a biphenylene group, which in turn is attached to a methylene group within the backbone. For both the terphenyl and biphenyl units, the methylene group is substituted with a trifluoromethyl group and with an ionic moiety including a linking moiety (pentylene), a cationic moiety (trimethylammonium), and an anionic counterion (bicarbonate).

Figure 5B:
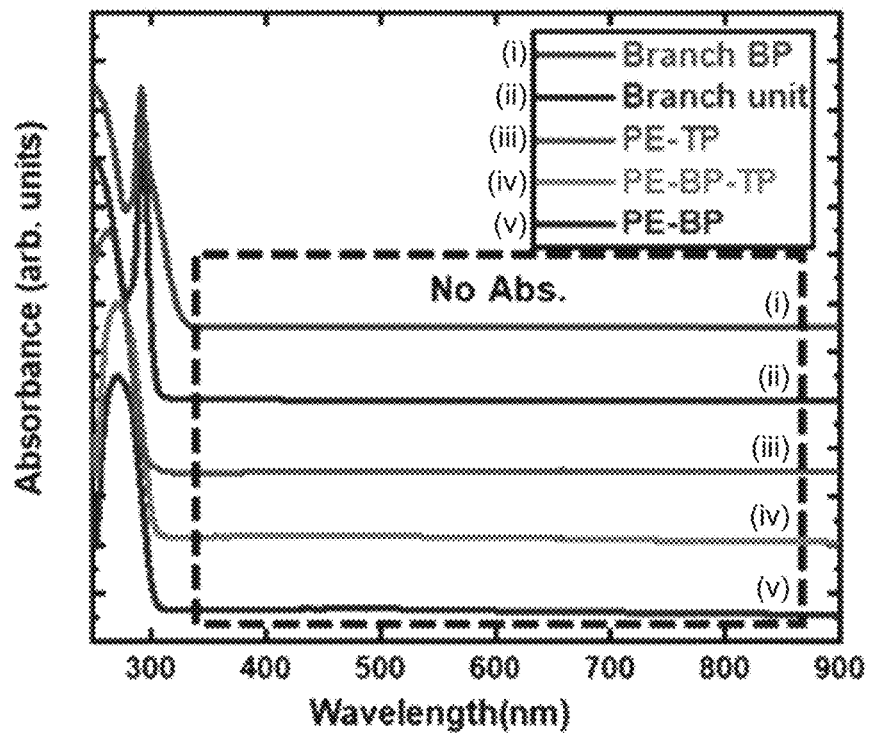

As seen in FIG. 5B, the obtained polymers and copolymers provided a transparent membrane. For instance, the polymer-based electrolyte (PE) containing terphenyl (TP) units ("PE-TP") or containing biphenyl (BP) units ("PE-BP") exhibited no absorbance in the visible light region. The corresponding copolymer including TP and BP units ("PE-BP-TP") were also transparent in this visible light region.

To further demonstrate that branched polymers can retain such optical properties, FIG. 5B shows that a non-limiting branched polymer composition is transparent in the visible light region from 400 nm to 900 nm. Here, the branched polymer includes a biphenyl (BP) unit with triphenyl benzene as the branching unit.

Example 2: Synthesis and Characterization of Branched Polymer Compositions

Figure 6:
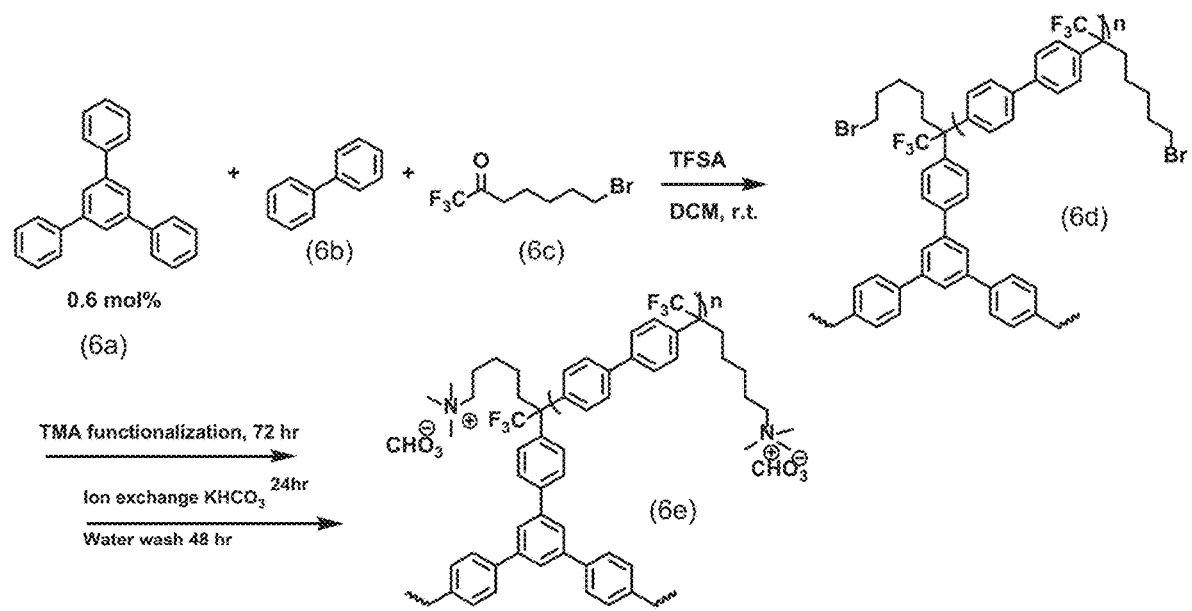
FIG. 6 shows a schematic of a non-limiting synthetic reaction to provide a branched polymer. Reactants include biphenyl units, 0.6 mol. % of a 1,3,5-triphenyl benzene branching unit, and a halogenated ketone (7-bromo-1,1,1-trifluoroheptan-2-one) to provide a non-limiting branched polymer having ionic moieties.

To demonstrate the feasibility of synthesizing branched polymer compositions, a polymerization reaction of a branched BP polymer was performed. FIG. 6 shows a non-limiting reaction scheme to provide a branched polymer including a biphenylene group and a 1,3,5-triphenyl benzene group as the core moiety. The reaction proceeds by providing a non-limiting interpenetrating agent that is 1,3,5-triphenylbenzene (6a) at 0.6 mol. % in the presence of biphenyl (6b) and 7-bromo-1,1,1-trifluoroheptan-2-one (6c, as the Friedel-Crafts alkylation agent). The superacid-catalyzed Friedel-Crafts poly condensation reaction proceeds in the presence of trifluoromethanesulfonic acid (TFSA) in dichloromethane (DCM, at room temperature) to provide an initial polymer (6d) including an electron-withdrawing moiety (—CF$_3$) R$^7$, a reactive group (—Br) attached to the polymeric unit by way of a linking moiety (—[CH$_2$]$_5$—), and a core moiety (-Ph-Ph(Ph-)-Ph-, in which Ph is phenyl).

Further reactions are conducted to substitute the reactive group to provide an ionic polymer. As can be seen, the initial polymer (6d) is reacted with trimethylamine to substitute the bromine atom with a quaternary ammonium group. Then, an ion exchange reaction is performed to exchange the bromine counterion from the prior reaction with a bicarbonate counterion, thereby providing a branched ionic polymer (6e). As seen in polymer (6e), attached to both the biphenylene groups and the triphenyl benzene groups is a methylene group, which in turn is substituted with a trifluoromethyl group and with an ionic moiety including a linking moiety (pentylene), a cationic moiety (trimethylammonium), and an anionic counterion (bicarbonate).

Figure 7A:
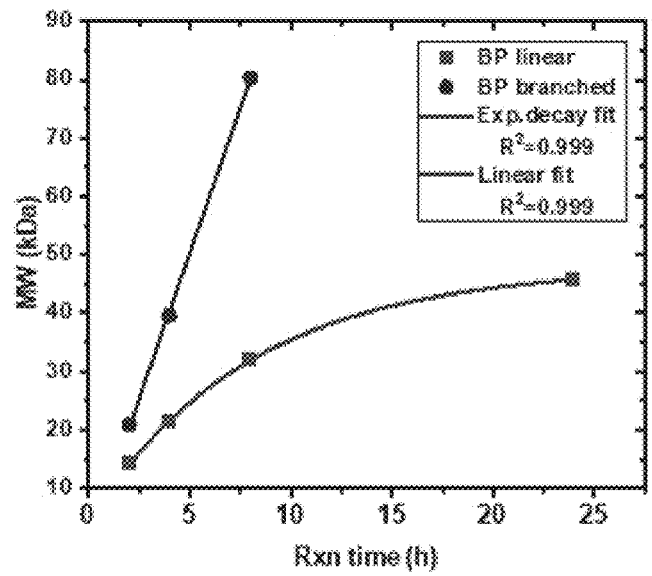
FIG. 7A-7B shows (A) a graph of a non-limiting polymerization kinetics study and (B) a schematic of a linear polymer including biphenyl units (labeled as "BP linear") and a branched polymer including biphenyl units and 0.3 mol. % of a triphenyl benzene branching unit (labeled as "BP branched").
Figure 7B:
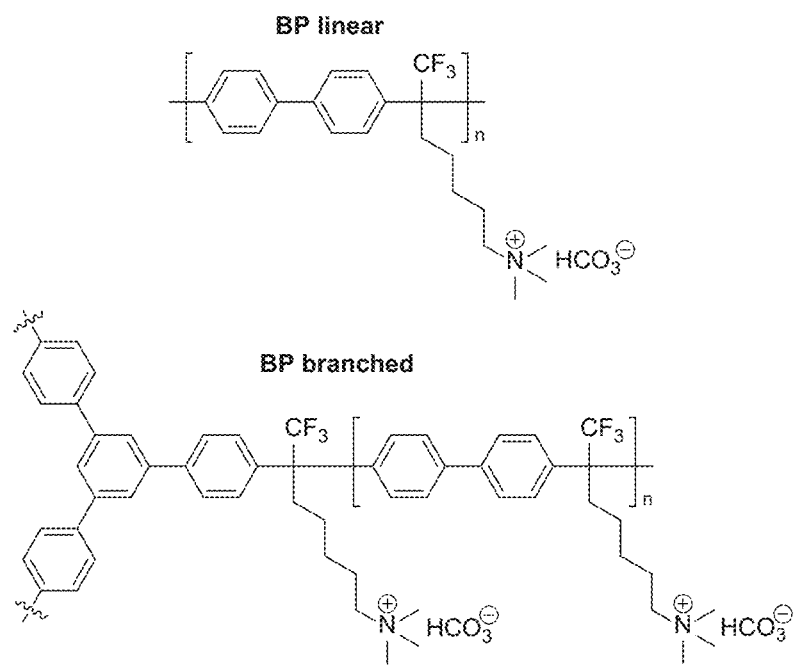

FIG. 7A shows a comparison of polymerization kinetics for a linear biphenyl polymer (BP linear) and a branched biphenyl polymer (BP branched, with 0.3 mol. % of the branching unit). Structures for BP linear and BP branched are provided in FIG. 7B. Polymerization kinetics were characterized by gas phase chromatography (GPC).

Figure 8:
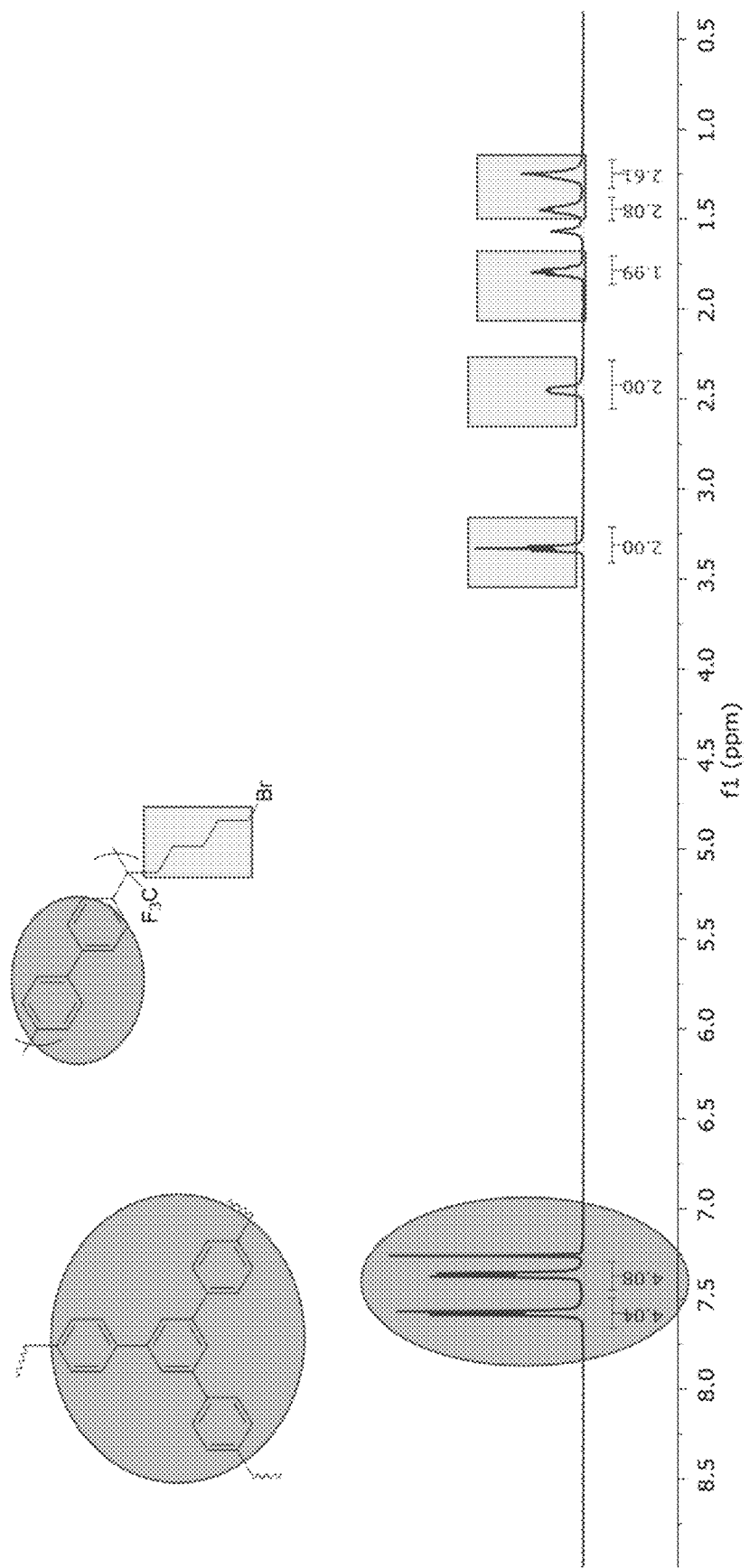
FIG. 8 shows a ¹H-nuclear magnetic resonance spectrum for a non-limiting branched polymer with a terminal bromine group.
Figure 9:
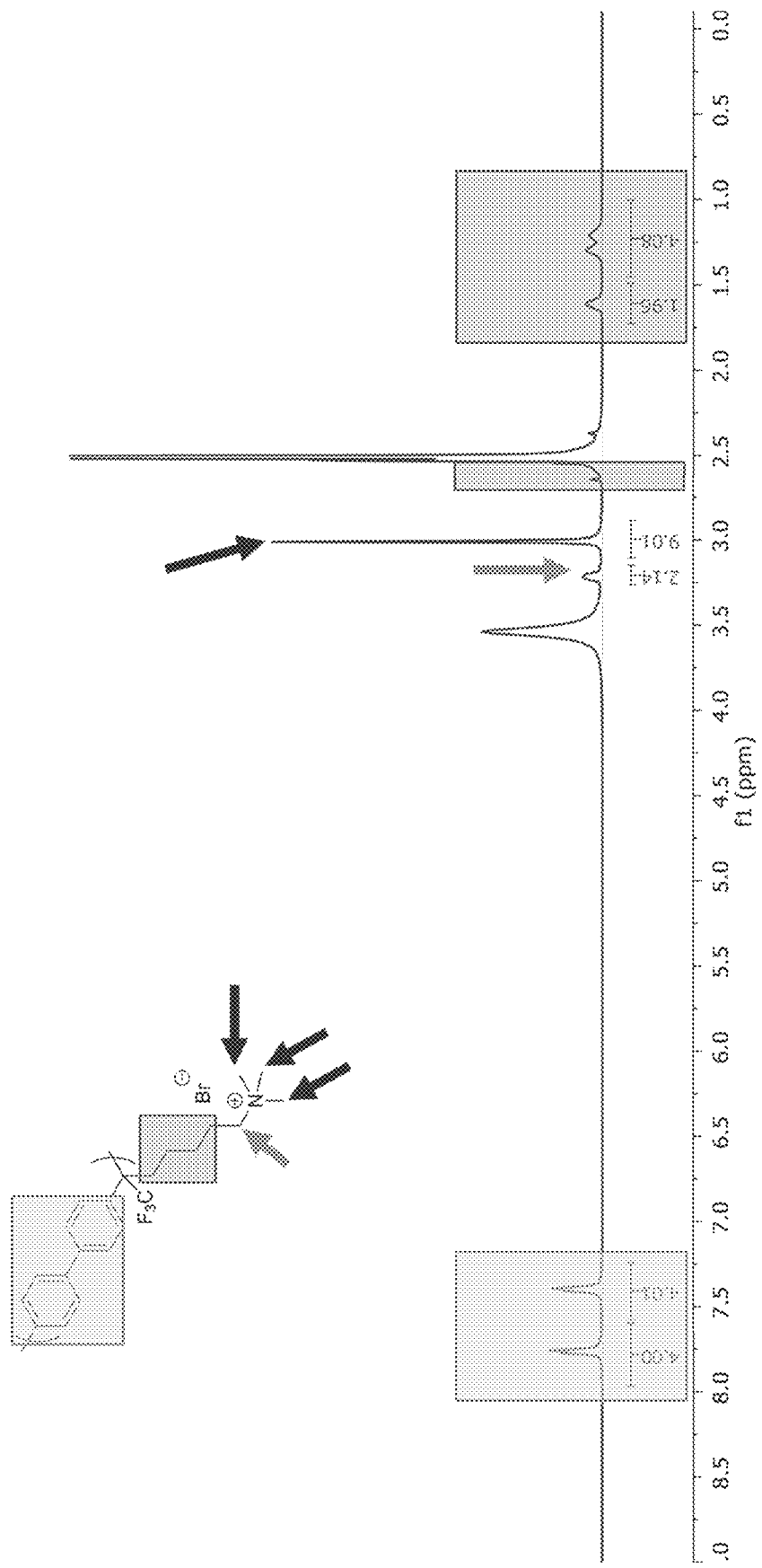
FIG. 9 shows a ¹H-nuclear magnetic resonance spectrum for another non-limiting branched polymer with an ionic moiety, in which this branched polymer was prepared by functionalizing the branched polymer that is characterized in FIG. 8 to provide an ionic polymer having a quaternary ammonium group.

As seen in FIG. 7A, polymerization kinetics for the linear polymer followed an exponential decay, whereas kinetics for the branched polymer followed a linear increase. Without wishing to be limited by mechanism, such an observation can be attributed to decreased solubility and/or increased viscosity of the linear polymer at higher molecular weight products. Thus, as the polymer backbone grows, the kinetics of polymerization decreases. On the other hand, the branched polymer maintained a linearly increasing growth profile that can be characterized as a steady polymerization rate, which can be attributed to polymeric products that remained soluble in solution. For instance, at a reaction time of eight hours, the branched BP (having 0.3 mol. % of the branching unit) had a 1.5 times higher molecular weight, as compared to the linear BP. By employing such a branching structure and maintaining solubility during polymerization, we can access a polymer having a high molecular weight (e.g., more than about 80 kDa) within a relatively short reaction time (e.g., about eight hours). Polymerization products were also confirmed by $^1$H NMR spectroscopy (FIG. 8 and FIG. 9).

As a person skilled in the art will recognize from the previous detailed description and from the figures and claims, modifications and changes can be made to the disclosed embodiments of the disclosure without departing from the scope of this disclosure defined in the following claims.

The invention claimed is:

1. A composition comprising a structure of the formula:

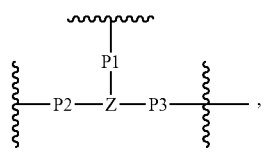

or a salt thereof, wherein:
each of P1, P2, and P3 is independently a structure of any one or more of the following:

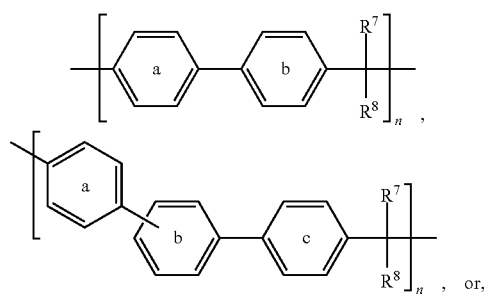

-continued

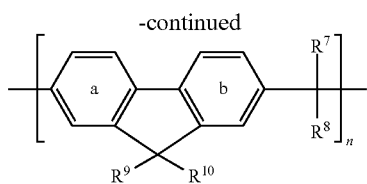

wherein each of $R^7$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein $R^7$ and $R^8$ can be taken together to form an optionally substituted cyclic group;

each of $R^9$ and $R^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^9$ and $R^{10}$ can be taken together to form an optionally substituted cyclic group;

n is an integer of 1 or more;

each of ring a, ring b, and/or ring c can be optionally substituted; and

Z is a core moiety; and at least one of Z, P1, P2 or P3 comprises an ionizable moiety or an ionic moiety.

2. The composition of claim 1, wherein one or more of ring a, ring b, ring c, $R^7$, $R^8$, $R^9$, and $R^{10}$ can, independently, optionally comprise an ionizable moiety or an ionic moiety.

3. The composition of claim 1, wherein Z comprises a structure of formula (IIa) or (IIb):

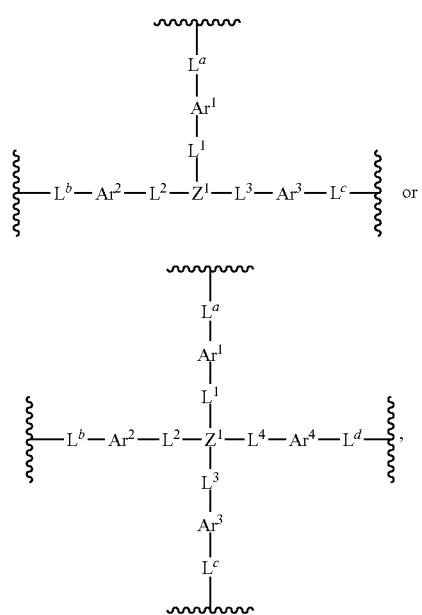

$Z^1$ is a multivalent moiety;
each of $Ar^1$, $Ar^2$, $Ar^3$, and $Ar^4$ comprises, independently, an optionally substituted aromatic or optionally substituted arylene; and each of $L^1$, $L^2$, $L^3$, $L^4$, $L^a$, $L^b$, $L^c$, and $L^d$ is, independently, a covalent bond, —O—, —$NR^{N1}$—, —C(O)—, optionally substituted aliphatic, optionally substituted alkylene, optionally substituted heteroaliphatic, or optionally substituted heteroalkylene, wherein $R^{N1}$ is H, optionally substituted aliphatic, optionally substituted alkyl, optionally substituted aromatic, or optionally substituted aryl, and wherein each of $L^1$, $L^2$, $L^3$, $L^4$, $L^a$, $L^b$, $L^c$, and $L^d$ can, independently, optionally comprise an ionizable moiety or an ionic moiety.

4. The composition of claim 3, wherein each of $Ar^1$, $Ar^2$, $Ar^3$, and $Ar^4$ is, independently, -L-Ar—, -L-Ar-L-, -Ar-L-, -L-Ar—Ar-L-, -L-Ar—Ar-Ar-L-, or —Ar-L-Ar—; wherein each Ar is, independently, an optionally substituted aromatic or optionally substituted arylene; and wherein each L is, independently, a covalent bond, —O—, —$NR^{N1}$—, —C(O)—, optionally substituted aliphatic, optionally substituted alkylene, optionally substituted alkyleneoxy, optionally substituted heteroaliphatic, or optionally substituted heteroalkylene.

5. The composition of claim 1, wherein each P1, P2, and P3 comprises, independently, a structure of the formula:

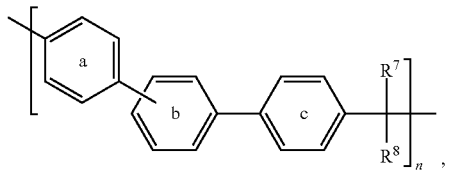

wherein:
each of $R^7$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein $R^7$ and $R^8$ can be taken together to form an optionally substituted cyclic group;

n is an integer of 1 or more;

each of ring a, ring b, and/or ring c can be optionally substituted; and wherein one or more of ring a, ring b, ring c, $R^7$, and $R^8$ can, independently, optionally comprise an ionizable moiety or an ionic moiety.

6. The composition of claim 5, wherein the electron-withdrawing moiety is an optionally substituted haloalkyl, cyano, phosphate, sulfate, sulfonic acid, sulfonyl, difluoroboranyl, borono, thiocyanato, or piperidinium.

7. The composition of claim 5, wherein the ionizable moiety or the ionic moiety comprises -$L^A$-$X^A$ or -$L^A$-($L^{A'}$-$X^A$)$_{L2}$ or -$L^A$-($X^A$-$L^{A'}$-$X^{A'}$)$_{L2}$ or -$L^A$-$X^A$-$L^{A'}$-$X^{A'}$ or -$L^A$-$X^A$-$L^{A'}$-$X^{A'}$-$L^{A''}$-$X^{A''}$, wherein:
each $L^A$, $L^{A'}$, and $L^{A''}$ is a linking moiety;
each $X^A$, $X^{A'}$, and $X^{A''}$ comprises, independently, an acidic moiety, a basic moiety, or a multi-ionic moiety; and
L2 is an integer of 1 or more.

8. The composition of claim 7, wherein each $L^A$, $L^{A'}$, and $L^{A''}$ comprises, independently, an optionally substituted alkylene, optionally substituted alkyleneoxy, optionally substituted heteroalkylene, optionally substituted arylene, and/or optionally substituted aryleneoxy.

9. The composition of claim 7, wherein each $X^A$, $X^{A'}$, and $X^{A''}$ comprises, independently, sulfo, sulfonate anion, sulfonium cation, carboxy, carboxylate anion, phosphono, phosphonate anion, phosphonium cation, phosphazenium cation, amino, ammonium cation, heterocyclic cation, piperidinium cation, azepanium cation, or a salt form thereof.

10. The composition of claim 1, wherein the optionally substituted rings a-c are substituted with one or more substituents; and wherein the substituent is selected from the group consisting of alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

11. The composition of claim 1, wherein the composition comprises a polymer or a copolymer.

12. The composition of claim 1, wherein the composition comprises a film, a membrane, or a cross-linked polymeric matrix.

13. An electrochemical cell comprising:
  an anode;
  a cathode; and
  a polymer electrolyte membrane disposed between the anode and the cathode, wherein the polymer electrolyte membrane comprises a composition of claim 1.

14. A method of making a polymer, the method comprising:
  providing one or more polymeric units in the presence of an interpenetrating agent and a Friedel-Crafts alkylation agent, wherein the interpenetrating agent comprises a core moiety Z and the Friedel-Crafts alkylation agent comprises a haloalkyl group and a reactive group, thereby forming an initial polymer having a reactive group; and
  substituting the reactive group with an ionic moiety, thereby providing an ionic polymer, wherein the ionic polymer comprises a composition of claim 1.

* * * * *